United States Patent
Panian et al.

(10) Patent No.: US 9,420,613 B2
(45) Date of Patent: Aug. 16, 2016

(54) CONFIGURABLE HOST INTERFACE USING MULTI-RADIO DEVICE AND ARCHITECTURE FOR WLAN OFFLOAD

(71) Applicant: Qualcomm Incorporated, San Diego, CA (US)

(72) Inventors: James Lionel Panian, San Marcos, CA (US); Richard Dominic Wietfeldt, San Diego, CA (US); Steven F Harris, La Jolla, CA (US); Gerardo Giaretta, San Diego, CA (US); Uppinder Singh Babbar, San Diego, CA (US); Sivaramakrishna Veerepalli, San Diego, CA (US); Marcello Vincenzo Lioy, Mercer Island, WA (US); Ajith Tom Payyappilly, San Diego, CA (US); Andrew M Davidson, Santa Clara, CA (US); Arnaud Meylan, San Diego, CA (US); Ramaswamy Venkateshwaran, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 13/830,336

(22) Filed: Mar. 14, 2013

(65) Prior Publication Data

US 2014/0010221 A1    Jan. 9, 2014

Related U.S. Application Data

(60) Provisional application No. 61/668,895, filed on Jul. 6, 2012, provisional application No. 61/673,136, filed on Jul. 18, 2012, provisional application No. 61/700,854, filed on Sep. 13, 2012.

(51) Int. Cl.
*H04W 76/02* (2009.01)
*H04W 4/00* (2009.01)

(52) U.S. Cl.
CPC .............. *H04W 76/02* (2013.01); *H04W 4/00* (2013.01); *H04W 76/022* (2013.01)

(58) Field of Classification Search
CPC ..................................................... H04W 76/02
See application file for complete search history.

(56) References Cited

U.S. PATENT DOCUMENTS

| 6,606,482 | B1 * | 8/2003 | Wheeler | ................. H04L 45/00 370/351 |
|---|---|---|---|---|
| 8,055,828 | B2 | 11/2011 | Conti et al. | |
| 2009/0303930 | A1 | 12/2009 | Ashley | |

(Continued)

FOREIGN PATENT DOCUMENTS

| WO | 2011022506 A1 | 2/2011 |
|---|---|---|
| WO | 2012061771 A1 | 5/2012 |

OTHER PUBLICATIONS

International Search Report and Written Opinion—PCT/US2013/049396—ISA/EPO—Jan. 23, 2014.

(Continued)

*Primary Examiner* — Charles C Jiang
*Assistant Examiner* — Thad Defauw

(57) ABSTRACT

A method, an apparatus, and a computer program product for wireless communication are provided. A multi-radio device controls wireless communications by identifying one or more connection points between radio(s) of the multi-radio device and an operating system executing on a host device, analyzing a policy relating to the multi-radio device, and exposing, to the operating system, a subset of the connection points based on the policy. A modem manages a connection to an applications processor (AP) by virtualizing physical communication interfaces at the modem, providing a single Internet protocol (IP) interface representing the virtualized physical communication interfaces to a high level operating system (HLOS) at the AP, detecting a physical communication interface connected to the modem, and determining whether to expose the detected physical communication interface to the HLOS as a standalone virtualized physical communication interface, or hide the detected physical communication interface as part of an existing virtualized physical communication interface.

59 Claims, 35 Drawing Sheets

(56) References Cited

U.S. PATENT DOCUMENTS

| | | | |
|---|---|---|---|
| 2009/0303932 A1* | 12/2009 | Tsirtsis | H04W 48/18 370/328 |
| 2011/0149764 A1* | 6/2011 | Wietfeldt | H04W 88/06 370/252 |
| 2012/0064945 A1* | 3/2012 | Kim | G06F 9/441 455/558 |
| 2012/0077483 A1 | 3/2012 | Abraham et al. | |
| 2012/0124229 A1 | 5/2012 | Sahu et al. | |
| 2012/0159218 A1 | 6/2012 | Vangala et al. | |
| 2012/0214527 A1* | 8/2012 | Meylan | H04L 69/32 455/509 |
| 2014/0101726 A1* | 4/2014 | Gupta et al. | 726/4 |

OTHER PUBLICATIONS

Peddemors A., et al., "An Extensible Network Resource Abstraction for Applications on Mobile Devices", 2nd International Conference on Communication Systems Software and Middleware, 2007, pp. 1-10.

Taiwan Search Report—TW102124231—TIPO—Mar. 4, 2015.

European Search Report—EP15187894—Search Authority—The Hague—Jan. 12, 2016.

European Search Report—EP15187896—Search Authority—The Hague—Jan. 12, 2016.

* cited by examiner

CONFIGURABLE HOST INTERFACE USING MULTI-RADIO DEVICE AND ARCHITECTURE FOR WLAN OFFLOAD

CROSS-REFERENCE TO RELATED APPLICATION(S)

This application claims the benefit of U.S. Provisional Application Ser. No. 61/668,985, entitled "CONFIGURABLE HOST INTERFACE USING A MULTI-RADIO DEVICE," filed on Jul. 6, 2012, U.S. Provisional Application Ser. No. 61/673,136, entitled "BACKWARD COMPATIBLE CONNECTIVITY FRAMEWORK FOR WLAN OFFLOAD," filed on Jul. 18, 2012, and U.S. Provisional Application Ser. No. 61/700,854 entitled "MODEM-CENTRIC ARCHITECTURE FOR WLAN OFFLOAD," filed on Sep. 13, 2012, which are expressly incorporated by reference herein in their entireties.

BACKGROUND

1. Field

The present disclosure relates generally to communication systems, and more particularly, to controlling wireless communications using a multi-radio device, a backward compatible connectivity framework for wireless local area network (WLAN) offload, and a modem-centric architecture for WLAN offload.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. Many wireless industries and research institutes are working on development of multi-radio antenna systems in space-limited mobile devices. The mobile device may be laptops, ultra mobile personal computers (UMPCs), personal digital assistants (PDAs), tablets, and/or cellular phones. In the near future, mobile devices may require multiple antennas to support communications using multiple wireless protocols. These include but are not limited to Wi-Fi, WiMAX, WWAN (Cellular), Digital TV, Ultra-Wideband (UMB), Blue Tooth (BT), near field communication (NFC) and Global Positions System (GPS). Depending on the usage model, some of the combinations of these radios may require simultaneous operation in the same device or in close proximity to other devices.

Currently, operating systems and/or connection manager applications are designed to interface to devices which implement a single radio. Such operating systems may unnecessarily require a discrete connection point for each radio of a multi-radio device. Connection points may be wired or wireless, such as Bluetooth. Examples of wired connection points include Mobile Broadband Interface Model (MBIM)/Universal Serial Bus (USB) for WWAN; Peripheral Component Interconnect Express (PCIe) for WLAN; Universal asynchronous receiver/transmitter (UART) for Bluetooth; and Network Interface Controller (NIC) for Ethernet. In addition, the operating system may choose to prioritize the flow of data over particular radio paths by hardcoded policy built into the operating system. Further, application programming interface (API) sets supported by a device are typically statically defined for all environments.

SUMMARY

The described features generally relate to one or more improved systems, methods, and/or apparatuses for controlling wireless communications using a multi-radio device. A connection point between one or more radios of the multi-radio device and an operating system executing on the host device may be identified. Based on a policy managed by the multi-radio device, a subset of the identified connection points may be exposed to the operating system. For example, a single radio device connection point may be exposed, or presented, to the operating system. A device class and a single IP address may be generated for the multi-radio device and presented to the operating system. Further, based on the policy, one or more radios of the multi-radio device may be selected to transmit data received from an application managed by the operating system. In addition, a driver interface and application programming interface (API) set may be exposed to the operating system based on the policy. Certain subsets of services provided by the exposed API set may be enabled based on conditions of the host device and the policy. As a result, the interface between the multi-radio device and the operating system may be dynamically configured by the multi-radio device based on policy and conditions of the host device.

In one example, a method for controlling wireless communications using a multi-radio device is described. One or more connection points between one or more radios of the multi-radio device and an operating system executing on a host device may be identified. A policy relating to the multi-radio device may be analyzed. A subset of the connection points may be exposed to the operating system executing on the host device based on the policy.

In one example, the connection point between the one or more radios of the multi-radio device and the operating system is identified through a controller of the radios. In one embodiment, conditions of the host device may be analyzed. An application programming interface (API) relating to a radio of the multi-radio device may be exposed to the operating system executing on the host device based on the conditions of the host device. In one configuration, a subset of services provided by the exposed API may be enabled based on the conditions of the host device.

In one example, a driver interface relating to one or more radios of the multi-radio device may be substantiated with the operating system based on the policy. The subset of connection points exposed to the operating system may be less than the number of possible connection points between each the one or more radios of the multi-radio device and the operating system.

In one embodiment, the multi-radio device may include a wireless wide area network (WWAN) radio and a wireless local area network (WLAN) radio. A device class may be generated for the multi-radio device based on the policy. The device class may be presented to the operating system.

In one example, the multi-radio device comprising WWAN and WLAN radios provides a single connection point (Mobile Broadband Interface Model (MBIM)/Universal Serial Bus (USB)) and device class (Mobile Broadband Device) to the operating system by default policy. The Mobile Network Operator (operator) provides additional policy for "carrier offload" where the multi-radio device attaches to a WLAN access point (communications interface) which meets the following criteria: 1) a carrier interface identified by a pre-configured list of SSIDs; and 2) a carrier interface identified by Hotspot 2.0.

The operating system manages communications over the communications interfaces (WWAN and WLAN), one of which is being hidden from the operating system (WLAN), over a single connection point (Mobile Broadband Interface Model (MBIM)/Universal Serial Bus (USB)), a single device class (Mobile Broadband Device), and a single IP address.

In one example, the multi-radio device comprising WWAN and WLAN radios provides a single connection point (Mobile Broadband Interface Model (MBIM)/Universal Serial Bus (USB)) and device class (Mobile Broadband Device) to the operating system by default policy. The Mobile Network Operator (operator) provides additional policy for "backwards compatibility" where a second connection point (PCIe) and a second device class (WLAN) are exposed to the operating system when the multi-radio device attaches to a WLAN access point (communications interface) which meets the following criteria: 1) a non-carrier interface; 2) an interface unknown to the modem; 3) a private wireless local area network (WLAN) interface; 4) a non-operator WLAN interface; or 5) a corporate WLAN interface.

The operating system manages communications over the second communications interface (WLAN) discretely through an additional connection point (Peripheral Component Interconnect Express (PCIe) for WLAN), an additional device class (WLAN), and an additional IP address.

In one configuration, transmission data may be received from the operating system or an application. A determination may be made as to which radio or radios of the multi-radio device to use to transmit the data based on the policy. Determining which radio to use may include determining a quality metric of the radios of the multi-radio device, and selecting the radio from the multi-radio device based on the quality metric of the radio. In one configuration, the subset of the connection points exposed to the operating system may be an empty set. In one embodiment, a plurality of operating systems on the mobile device may be identified. A subset of the connection points may be exposed based on the identified operating systems.

A mobile device configured to control wireless communications using a multi-radio device is also described. The mobile device may include a processor and memory in electronic communication with the processor. The device may further include instructions stored in the memory. The instructions may be executable by the processor to identify one or more connection points between one or more radios of the multi-radio device and an operating system executing on a host device. The instructions may also be executable by the processor to analyze a policy relating to the multi-radio device, and expose, to the operating system, a subset of the connection points based on the policy.

An apparatus configured for controlling wireless communications using a multi-radio device is also described. The apparatus may include means for identifying one or more connection points between one or more radios of the multi-radio device and an operating system executing on a host device. The apparatus may further include means for analyzing a policy relating to the multi-radio device, and means for exposing, to the operating system, a subset of the connection points based on the policy.

A computer program product for controlling wireless communications using a multi-radio device is also described. The computer program product may include a non-transitory computer-readable medium storing instructions executable by a processor to identify one or more connection points between one or more radios of the multi-radio device and an operating system executing on a host device. The instructions may be further executable by the processor to analyze a policy relating to the multi-radio device, and expose, to the operating system, a subset of the connection points based on the policy.

In an aspect of the disclosure, a method, a computer program product, and an apparatus are provided. The apparatus manages a connection between a modem and an applications processor (AP). The apparatus does so by abstracting or virtualizing a plurality of physical communication interfaces at the modem, providing a single Internet protocol (IP) interface representing the abstracted plurality of physical communication interfaces to a high level operating system (HLOS) at the AP, detecting a physical communication interface connected to the modem, and determining, based on a condition, whether to expose the detected physical communication interface to the HLOS as a standalone abstracted physical communication interface, or hide the detected physical communication interface from the HLOS as part of an existing abstracted physical communication interface.

In an aspect of the disclosure, a method, a computer program product, and an apparatus are provided for managing a connection to at least one wireless local area network (WLAN). The apparatus connects to the at least one WLAN via a high level operating system (HLOS) at an applications processor (AP) and connects to the at least one WLAN via a connectivity framework (CF) at a modem according to the HLOS.

The foregoing has outlined rather broadly the features and technical aspects of examples according to disclosure. Additional features will be described hereinafter. The conception and specific examples disclosed may be readily utilized as a basis for modifying or designing other structures for carrying out the same purposes of the present disclosure.

Such equivalent constructions do not depart from the spirit and scope of the appended claims. Features which are believed to be characteristic of the concepts disclosed herein, both as to their organization and method of operation, will be better understood from the following description when considered in connection with the accompanying figures. Each of the figures is provided for the purpose of illustration and description only and not as a definition of the limits of the claims.

DETAILED DESCRIPTION

Figure 1:
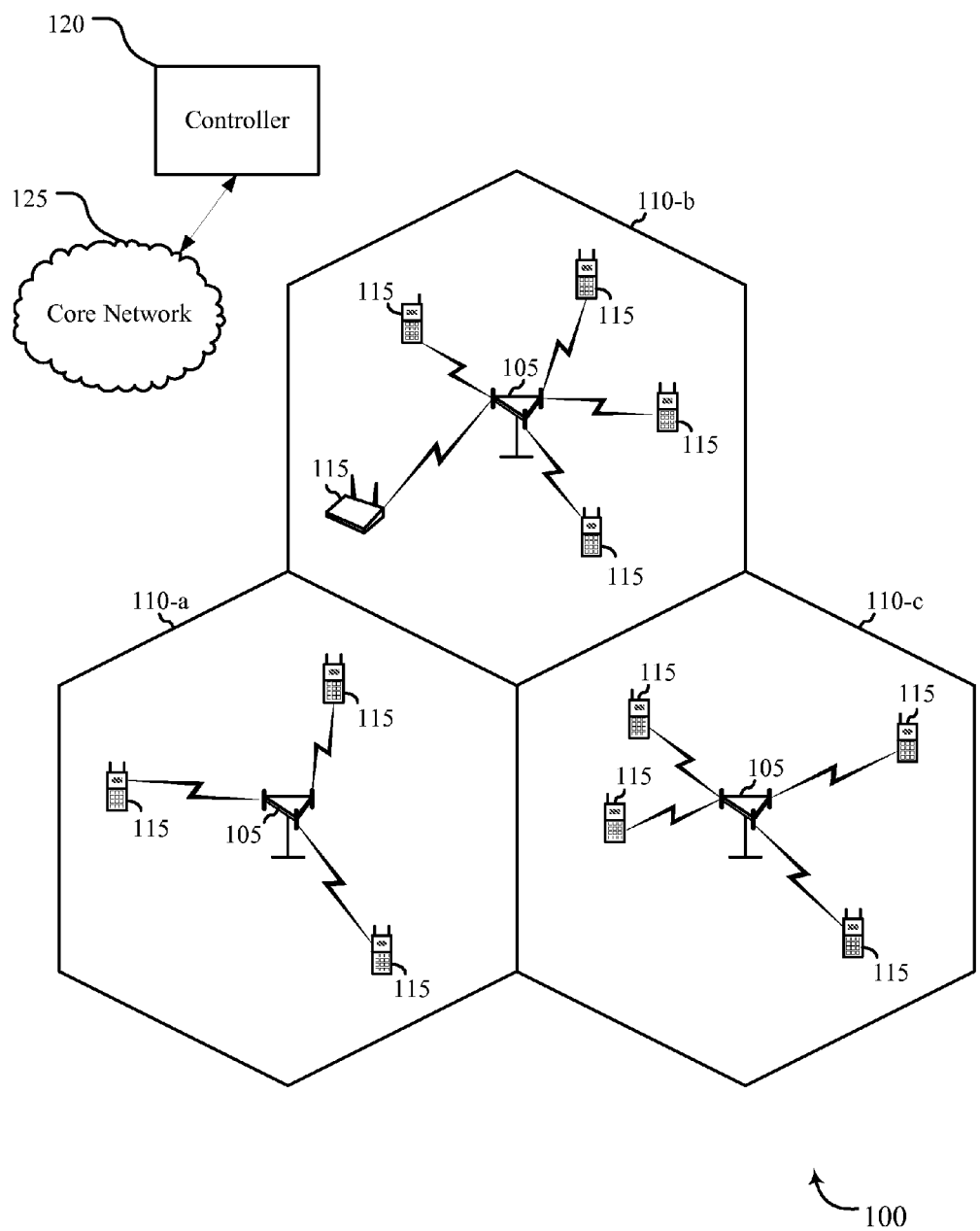
FIG. 1 shows a block diagram of a wireless communications system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Methods, systems, and devices are described to allow a multi-radio device to dynamically configure the interface with an operating system. The multi-radio device may maintain one or more policies relating to the interface configuration. In one example, one or more connections between one or more radios of a multi-radio device and the operating system may be identified. A policy engine may analyze the one or more policies and expose a subset of the connections to the operating system. As a result, the operating system may only be aware of the radios whose connections are exposed (even though additional radio connections to the operating system may exist). A single device class defining the multi-radio device may be generated and presented to the operating system. The engine may further expose an application programming interface (API) set and substantiate a driver interface with the operating system based on the one or more policies. In one example, the policy engine may enable a subset of the services provided by the exposed API set. As a result, the multi-radio device may impersonate a single radio connection and may present a single device class to the operating system while still being able to utilize any of the radios that are part of the multi-radio device. Further, the API set supported by a host device may be dynamically defined for various environments and conditions of the host device by enabling a subset of the services provided by the API set.

Referring first to FIG. 1, a block diagram illustrates an example of a wireless communications system 100. The system 100 includes base stations 105 (or cells), mobile devices 115, a base station controller 120, and a core network 125 (the controller 120 may be integrated into the core network 125). The system 100 may support operation on multiple carriers (waveform signals of different frequencies).

The base stations 105 may wirelessly communicate with the mobile devices 115 via a base station antenna (not shown). The base stations 105 may communicate with the mobile devices 115 under the control of the base station controller 120 via multiple carriers. Each of the base station 105 sites may provide communication coverage for a respective geographic area. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, micro, and/or pico base stations). There may be overlapping coverage areas for different technologies.

The mobile devices 115 may be dispersed throughout the coverage areas 110. The mobile devices 115 may be referred to as mobile stations, mobile devices, access terminals (ATs), user equipments (UEs), subscriber stations (SSs), or subscriber units. The mobile devices 115 may include cellular phones and wireless communications devices, but may also include personal digital assistants (PDAs), other handheld devices, netbooks, notebook computers, tablets, etc. In one embodiment, the mobile devices 115 may include a multi-radio device. The multi-radio device may allow the mobile devices 115 to support several different kinds of radio connections. Multi-radio devices may encompass several groups of wireless radio technologies such as, but not limited to, wireless wide-area network (WWAN) technologies, wireless local area network (WLAN) technologies, proximity solutions (e.g., Bluetooth, NFC, etc.), broadcast technologies (e.g., DVB-H), satellite technologies (e.g., GPS), etc. The multi-radio device enables a mobile device 115 to be connected to the appropriate radio technology based on the service being used by the device 115. In one configuration, the selection of which radio (of a multi-radio device) to use may be performed at the multi-radio device level (instead of by an operating system executing on the mobile device 115). As will be further described below, the selection of which radio to use may be based on policy maintained by the multi-radio device.

Figure 2:
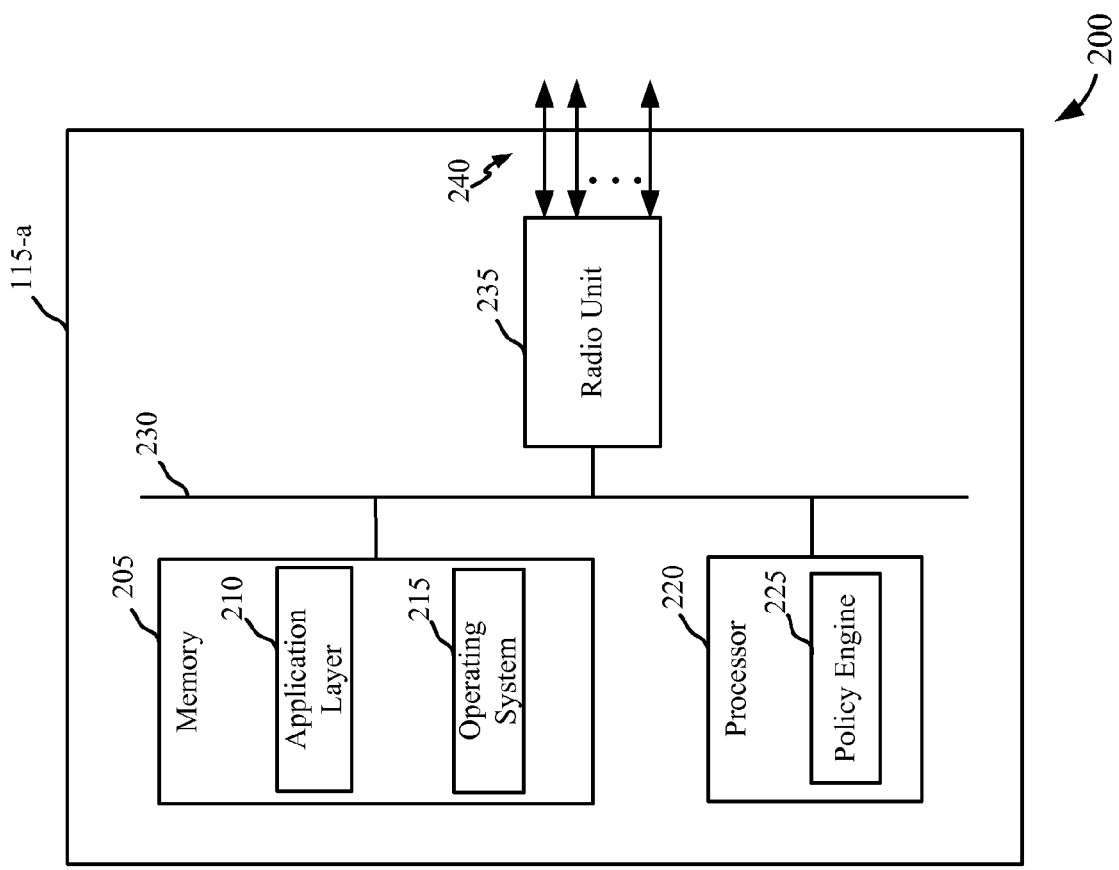
FIG. 2 is a block diagram illustrating an example mobile device.

FIG. 2 is a block diagram 200 illustrating an example mobile device 115-a. This may be the mobile device 115 of FIG. 1. The mobile device 115-a may have any of various configurations, such as personal computers (e.g., laptop computers, netbook computers, tablet computers, etc.), cellular telephones, personal digital assistants (PDAs), digital video recorders (DVRs), internet appliances, gaming consoles, e-readers, etc. The mobile device 115-a may have an internal power supply, such as a small battery, to facilitate mobile operation. The architecture of the device 115-a may include a memory 205, a processor 220, and a radio unit 235, which each may be in communication, directly or indirectly, with each other (e.g., via one or more buses 230).

The memory 205 may include random access memory (RAM), read-only memory (ROM), electrically erasable programmable read-only memory (EEPROM), or any other type of memory device that operates to allow information to be stored and retrieved at the device 115-a. The memory 205 may store an application layer 210 and an operating system 215. The operating system 215 may be a set of software that manages hardware resources on the mobile device 115-a and provides common services for applications that are part of the application layer 210. While FIG. 2 illustrates the memory 205 storing a single operating system 215, it is to be understood that multiple operating systems may be stored in the memory 205 of the device 115-a. Examples of the operating system 215 may include, but are not limited to, Microsoft Windows®, Linux, Unix, Windows XP®, Mac OS X®, iOS, Solaris, Android®, Windows 8®, Windows RT®, etc. The application layer 210 may include a group of protocols and methods for the Internet protocol suite (TCP/IP). In TCP/IP, the application layer 210 may include the protocols and methods associated with process-to-process communications across an Internet Protocol (IP) network.

The memory 205 may also store computer-readable, computer-executable software code containing instructions that are configured to, when executed, cause the processor 220 and/or a policy engine 225 to perform various functions described herein. Memory 205 may also store any of a number of other types of data including data generated by any of the processor 220, radio unit 235, application layer 210, operating system 215, and/or policy engine 225. Memory 205 may include a number of different configurations, including as random access memory, battery-backed memory, hard disk, magnetic tape, etc. Various features can also be implemented upon memory 205, such as compression and automatic back up.

In various implementations, the device 115-a may include a computer program product having one or more program instructions ("instructions") or sets of "codes" stored or embodied on a non-transitory computer-readable medium. When the codes are executed by at least one processor, for instance, processor 220 and/or policy engine 225, their execution may cause the processor 220 or policy engine 225 to control the device 115-a to provide the functions of dynamically configuring an interface between a multi-radio device and the operating system 215. For example, the non-transitory computer-readable medium may be a floppy disk, CDROM, memory card, FLASH memory device, RAM, ROM, or any other type of memory device or computer-readable medium that interfaces to the device 115-*a*. In another aspect, the sets of codes may be downloaded into the device 115-*a* from an external device or communication network resource. The sets of codes, when executed, operate to provide aspects of the dynamic interface configuration described herein.

The application layer 210 may include hardware and/or a processor executing software that may store and/or execute one or more applications on the device 115-*a*. In one implementation, the application layer 210 may allow applications to initiate networking function calls to request networking services, such as requesting connection to a radio within the radio unit 235 for the purpose of communicating with an external network or system.

The radio unit 235 may include hardware and/or a processor executing software that may provide a number of radios that may be used to interface the device 115-*a* with a number of external entities, such as external communication networks using a number of channels 240. For instance, radio unit 235 may provide radios to communicate using Cellular, Wi-Fi, Bluetooth, or any other technology to communicate with communication networks using the channels 240. The radio unit 235 may include a multi-radio device that includes multiple radios which may concurrently provide various network technologies to the device 115-*a* depending on the services required by the device 115-*a*. The processor 220 may include a policy engine 225. The policy engine 225 may be implemented as a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

In one configuration, the processor 220 and/or policy engine 225 may include a means for identifying one or more connection points between one or more radios of the multi-radio device within the radio unit 235 and the operating system 215 executing on mobile device 115-*a*. The connection points may be established via a radio interface layer (RIL), which is a layer in the operating system 215 that provides an interface to the radios of the multi-radio device within the radio unit 235. In one embodiment, the processor 220 and/or the policy engine 225 may include a means for analyzing a policy relating to the multi-radio device. Further, the processor 220 and/or the policy engine 225 may include a means for exposing, to the operating system 215, a subset of the connection points based on the analysis of the policy. Thus, the processor 220 and/or the policy engine 225 may include a means for selecting which radio connection point to expose to the operating system 215. For example, even though a plurality of radios within the radio unit 235 each establish a connection point with the operating system 215, the processor 220 and/or the policy engine 225 may select a single connection point to expose to the operating system 215. When a radio establishes a connection point, a signal may be transmitted to a driver interface on the operating system 215. The driver interface may use the signal to notify a corresponding API set on the operating system 215 that a particular radio is available. Upon receiving the signal, the application layer 210 and the operating system 215 may become aware of the availability of that particular radio. By exposing a subset of connection points to the operating system 215, certain connection points are hidden or otherwise obfuscated from the operating system 215. In one embodiment, when certain radios establish a connection point, a signal may not be sent to the driver interface and API set informing them of a connection with these radios. When a connection point is selected to be exposed to the operating system 215, a signal may be sent to a driver interface and API set to inform the operating system 215 and the application layer 210 that the particular radio associated with the selected connection point is available.

The processor 220 and/or the policy engine 225 may further include a means for generating a presenting to the operating system 215 a radio device class based on the exposed connection point. For example, the multi-radio device may include a WWAN radio and a WLAN radio. The device may expose only the WLAN radio connection point to the operating system. The processor 220 and/or the policy engine 225 may then generate a device class for the multi-radio device. In this example, the generated device class may be a WLAN client. This device class may be presented to the operating system 215. As a result, from the perspective of the operating system 215, the operating system 215 may be aware of a single connection point (instead of multiple connection points) between itself and the multi-radio device as well as a single device class even though additional radios may exist in the multi-radio device.

Further, the processor 220 and/or policy engine 225 may include means for selecting a radio of the multi-radio device within the radio unit 235 to use to transmit/receive data across one or more channels 240. In one configuration, the decisions of which radio connection point to expose to the operating system 215 and which radio to use to transmit/receive data may be based on one or more policies. The processor 220 and/or policy engine 225 may include means for analyzing the one or more policies and selecting the connection point to expose to the operating system 215 and selecting the radio to use to transmit/receive data based on the analysis. The decision of which radio to actually use to transmit/receive data may be based on network congestion, data size, signal strength, quality metrics, etc. Using the example above, even though the connection point for a WLAN radio has been exposed to the operating system 215 and the device class WLAN client has been presented to the operating system 215, the processor 220 and/or policy engine 225 may decide to use the WWAN radio to actually transmit/receive the data based on policy. As a result, the operating system 215 may not be responsible for making the decision of which radio to use for the transmission/reception of data. In another example, the decisions of which radio connection point to expose and which radios to use to transmit/receive data may be based on the type of operating system that is executing on the device 115-*a*. For instance, if the Linux® operating system is running on the device 115-*a*, the subset of connection points may be exposed to the operating system when the device 115-*a* is powered up to allow the operating system instant access to the connection points. In another example, if Windows® operating system is also executing on the device 115-*a*, the connection points may be exposed once the device 115-*a* has powered up and the Windows® operating system is up and running. Thus, the multi-radio device may adapt to multiple operating systems that may be running in the mobile device 115-*a*.

Thus, the device architecture 200 provides for the dynamic configuration of the interface between the operating system 215 and a multi-radio device within the radio unit 235. Exposing a single connection point to the operating system 215 (instead of multiple connection points), serves to increase the connectivity efficiency of the mobile device 115-*a* and one or more networks that provide various communication technologies. A more detailed description of the operation of the device 115-*a* to provide a dynamic configuration of the interface is provided below.

Figure 3:
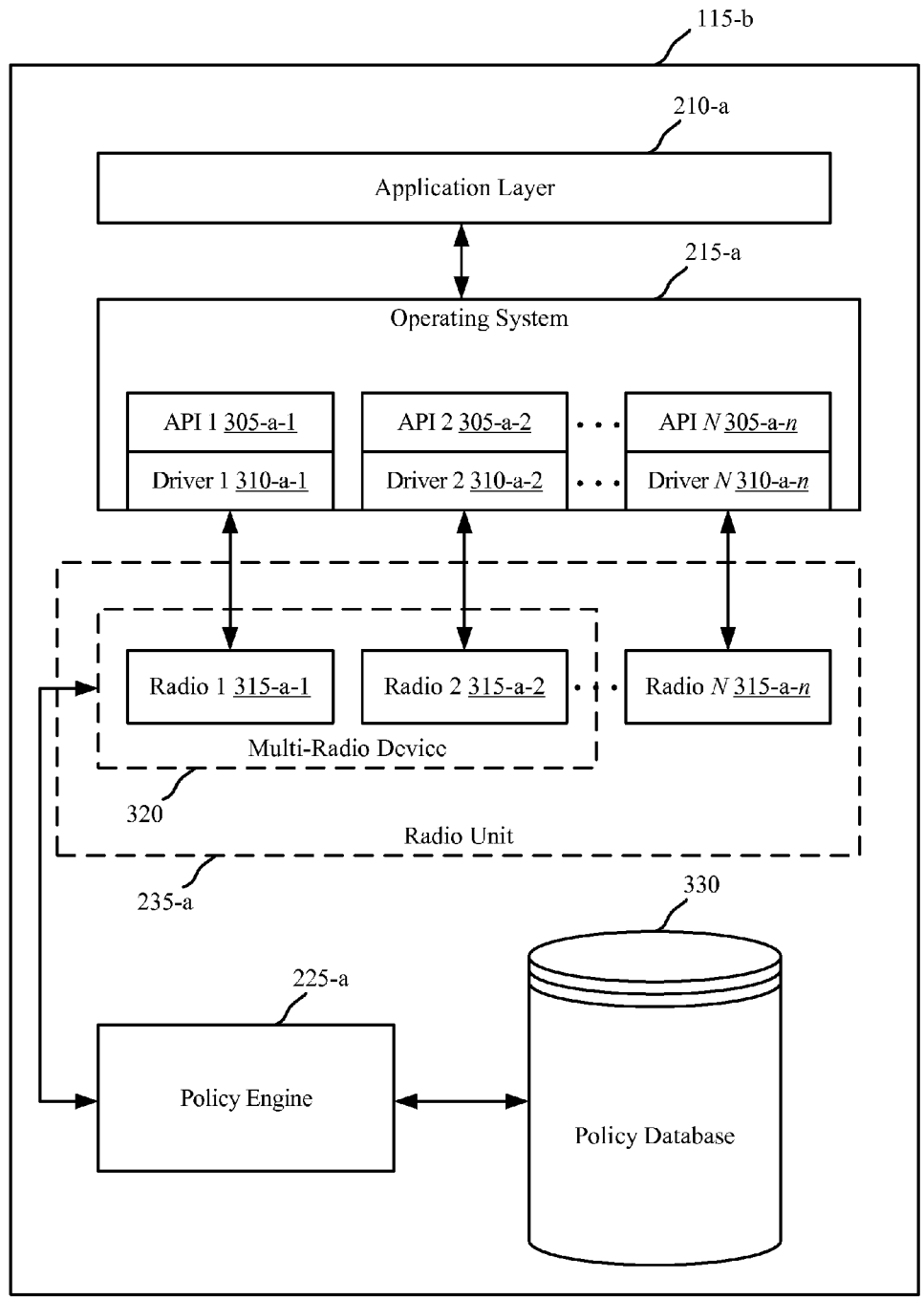
FIG. 3 shows a block diagram of an example mobile device providing a dynamic interface configuration between a multi-radio device and an operating system executing on the device.

FIG. 3 shows a block diagram 300 of an example mobile device 115-*b* providing a dynamic interface configuration between a multi-radio device and an operating system executing on the device 115-*b*. The device 115-*b* may be an example of the device 115 of FIG. 1 or 2. The device 115-*b* may include an application layer 210-*a*, an operating system 215-*a*, a radio unit 235-*a*, a policy engine 225-*a*, and a policy database 330.

In one configuration, the radio unit 235-*a* may include a number of radios 315. Two or more radios 315 may be grouped together to form a multi-radio device 320. The multi-radio device 320 may represent a single radio, even though it includes a number of radios. Thus, the multi-radio device 320 allows the mobile device 115-*b* to support several different types of radio connections. The multi-radio device 320 may include radio 1 315-*a*-1, which may support WWAN technologies and radio 2 315-*a*-2, which may support WLAN technologies. The radio unit 235-*a* may include additional radios (e.g., Radio N 315-*a*-*n*) that may not be considered part of the multi-radio device 320. An Ethernet modem may or may not be considered part of the multi-radio device 320. In one example, one or more radios 315 of the multi-radio device 320 may establish a connection point with the operating system 215-*a*. The one or more radios may plug into the operating system 215-*a* through a specific port. In one embodiment, the radios 315 in the multi-radio device 320 may share a port. For example, there may exist a single connection point between the multi-radio device 320 and the operating system 215-*a* even though the device 320 may include a number of radios. The connection points may represent an interface between the radios 315 and the operating system 215-*a*.

In one embodiment, the operating system 215-*a* may include a number of driver interfaces 310 and API sets 305 relating to each of the radios 315. Driver 1 310-*a*-1 may be a Mobile Broadband driver and API 1 305-*a*-1 may be a Mobile Broadband API set. Driver 2 310-*a*-2 may be a WLAN driver and API 2 305-*a*-2 may be a WLAN API set. Additional drivers and API sets may also exist on the operating system 215-*a*. An Ethernet driver and Ethernet API set may also exist. When a radio 315 establishes a connection point with the operating system 215-*a*, a signal may be sent through a driver 310 to a corresponding API set 305. Applicants in the application layer 210-*a* may become aware that a particular radio 315 is available when an API set 305 receives the signal from a driver 310.

The drivers 310 may be components of a driver layer of the RIL. The API sets 305 may be components of an API layer of the RIL. In one configuration, the drivers 310 may process certain commands and events. For example, the drivers 310 may process attention (AT) commands that are used to control the radios 315 to perform their specified functions. In one aspect, a driver 310 in the RIL driver layer may receive an API call from an API set 305 in the RIL API layer. The driver 310 may cause a radio 315 to perform the function defined by the API call.

In one embodiment, the mobile device 115-*b*, with a multi-radio device 320, may improve connectivity efficiencies by exposing a single connection point and a single device class to the operating system 215-*a* (even though a number of connection points may be established between the operating system 215-*a* and one or more radios of the multi-radio device 320). The device class for a WWAN radio (or modem) may be a Mobile Broadband device. The class for a WLAN radio (or modem) may be a WLAN client. The device class for an Ethernet modem may be a Network Interface Card (NIC). Additional device classes for radios may include, but is not limited to, WLAN base station, generic device, etc.

While a single connection point and device class may be exposed to the operating system 215-*a* to represent the multi-radio device 320, the connectivity efficiencies may be further realized by selecting one of any of the available radios 315 within the multi-radio device 320 to transmit/receive data. The data to be transmitted may be received from an application executing in an application layer 210-*a*. Similarly, data received by the selected radio 315 may be for an application in the layer 210-*a*. In one example, the operating system 215-*a* may provide the data to be transmitted. Further, the operating system 215-*a* may be the recipient of data received by a selected radio 315. The selection of which radio to use to transmit/receive the data may be performed by the policy engine 225 according to one or more policies in the database 330.

In one example, the multi-radio device 320 may enumerate a single network adapter (and single IP address) to support multiple radios (e.g., radio 1 315-*a*-1, radio 2 315-*a*-2, etc.). The decision as to which connection point to expose to the operating system 215-*a* and the decision as to which radio to use to transmit/receive data may be delegated to the multi-radio device 320, which may employ a router/gateway implementation based on policy rules. In one embodiment, the policy engine 225-*a* may be used to select which connection point to expose to the operating system 215-*a* and which radio to use for the transmission/reception of data. Although the policy engine 225-*a* is illustrated as being separate and distinct from the multi-radio device 320, the policy engine 225-*a* may be implemented as part of the device 320. In one example, the policy engine 225-*a* may select the connection point and radio based on one or more policies stored in the policy database 330. The database 330 may be maintained in the multi-radio device 320, in the mobile device 115-*b* (i.e., separate from the multi-radio device 320), or via a host application command.

The single device class assigned to the multi-radio device 320 and exposed to the operating system 215-*a* may allow the operating system 215-*a* to identify the type of radio interfacing with the operating system 215-*a*. As mentioned above, even though a number of radios within the multi-radio device 320 may establish a connection point with the operating system 215-*a*, the policy engine 225-*a* may generate and expose a single device class for the multi-radio device 320 (instead of exposing the operating system 215-*a* to a different device class for each radio that has established a connection point with the operating system 215-*a*). In one configuration, the single device class which is exposed to the operating system 215-*a* may also be programmed via policy rules maintained by the multi-radio device 320 and stored in the database 330 or maintained by a host application command. In one example, radio 1 315-*a*-1 may be a WWAN radio and radio 2 315-*a*-2 may be a WLAN radio. One or more radios 315 may establish a connection point. Based on policy, the policy engine may only expose the WLAN connection point to the operating system 215-*a*. As a result, from the perspective of the operating system 215-*a*, the operating system 215-*a* is only interfacing with a WLAN radio. The policy engine 225-*a* may also generate and expose a device class for the multi-radio device 225-*a* to the operating system 215-*a*. The device class may be WLAN client, WWAN client, Ethernet, and the like. The device class may be determined based on the type of radio whose connection is exposed to the operating system 215-*a*. If a connection point of a WLAN radio is exposed, the device class reported to the operating system 215-*a* may be WLAN client. However, the device class may not be linked to the radio whose connection point is exposed. Even though the connection point of a WLAN radio is exposed, the device class may be Ethernet, generic device, etc. The selection of the device class to present to the operating system 215-*a* may also be based on policy.

In one configuration, each radio 315 within the multi-radio device 320 may not be available at all times. The multi-radio device 320 may include a WWAN radio and a WLAN radio. The mobile device 115-*b*, however, may not possess an account to access a WWAN. When the mobile device 115-*b* is in a location where Wi-Fi is available, the WLAN radio may be activated, but the WWAN radio may not be activated because the mobile device 115-*b* is unable to access the WWAN. Policy may be used to identify which radios are available for use. The policy may include the time of day, the amount of data to transmit/receive, signal strength of a radio, the location of the mobile device 115-*b*, etc. In one embodiment, the policy may be programmed by the mobile network operator or the organization or individual who owns the mobile device 115-*b*. These policy rules may be maintained by the mobile device 115-*b*, the multi-radio device 320, or programmed via a host application command.

In one embodiment, an API set 305 supported by a radio 315 may be programmed via a policy to enable a subset of the services offered by the API to be available. The selection of the subset of services to enable may be based on certain characteristics or conditions of the host device (i.e., the mobile device 115-*b*). For example, a WWAN radio 315 in a host device, such as a smart phone, may offer an API set 305 for circuit-switched voice call management. The same WWAN radio, however, used in a data-only tablet may have the API services relating to circuit-switched voice call management disabled via policy since voice may not be a feature that mobile network operators choose to support for tablet devices. As a result, the services offered by a particular API set may not be statically defined for all environments. Instead, the services may be dynamically defined depending on conditions and characteristics of the host device (e.g., the mobile device 115-*b*).

Figure 4:
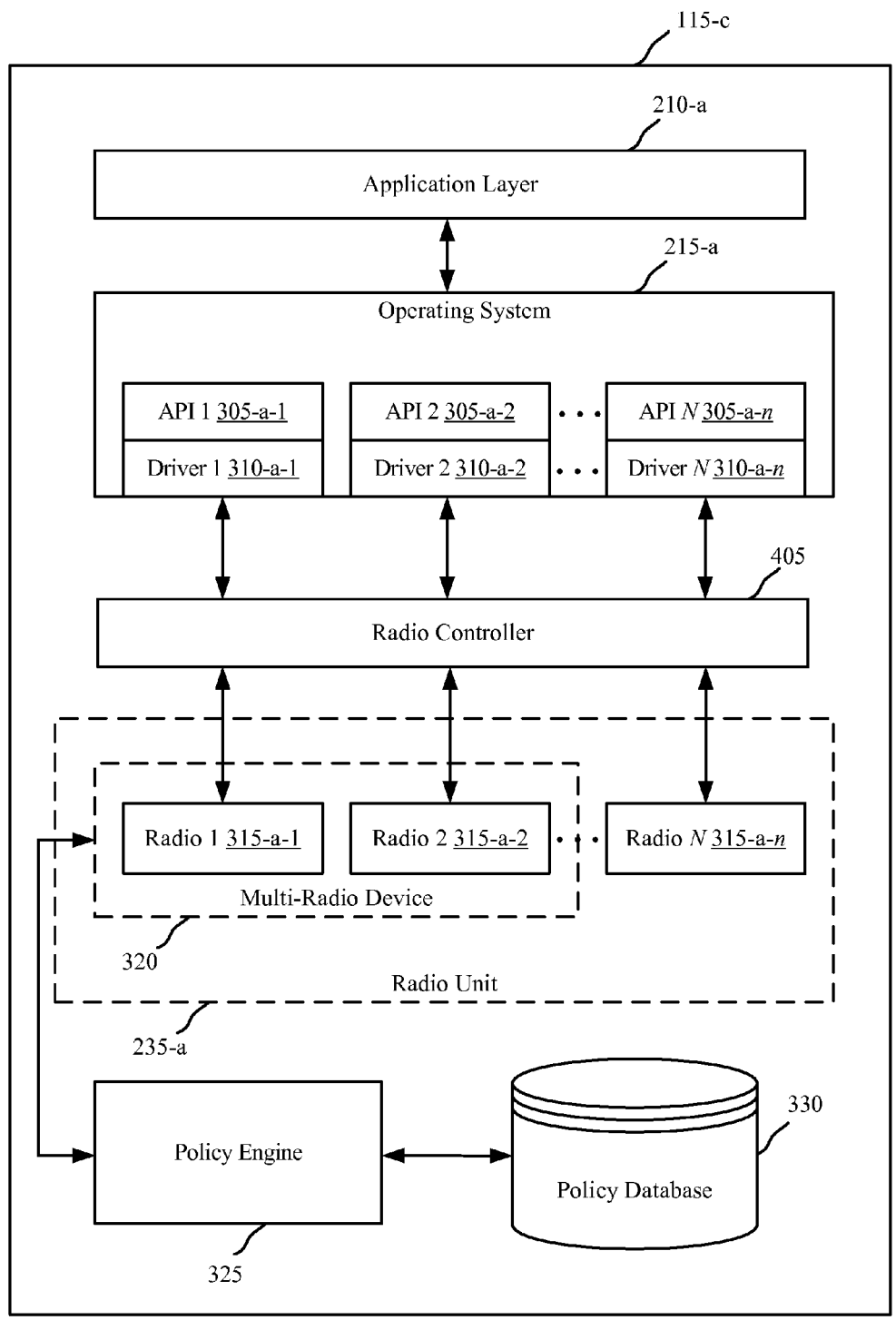
FIG. 4 shows a block diagram of another example mobile device providing a dynamic interface configuration between a multi-radio device and an operating system executing on the device.

FIG. 4 shows a block diagram 400 of another example mobile device 115-*c* providing a dynamic interface configuration between a multi-radio device and an operating system executing on the device 115-*c*. The device 115-*c* may be an example of the device 115 of FIG. 1, 2, or 3. The device 115-*c* may include an application layer 210-*a*, an operating system 215-*a*, a radio unit 235-*a*, a policy engine 225-*a*, and a policy database 330, as previously described. In addition, the mobile device 115-*c* may include a radio controller 405.

In one example, the radio controller 405 may manage the connection points between one or more radios 315 and the operating system 215-*a*. For example, the one or more radios 315 may establish a connection with the radio controller 405. The controller 405 may then establish one or more connection points with the operating system 215-*a*. The policy engine 225-*a* may cause the radio controller 405 to expose a single connection point to the operating system 215-*a*. As a result, a direct connection point between the operating system 215-*a* and a radio 315 may not exist. The radio controller 405 may be dispersed between the radios 315 and the operating system 215-*a*. In one embodiment, the various features and functions of the remaining components of the mobile device 115-*c* may perform in a manner similar to that described with respect to FIG. 3.

Figure 5:
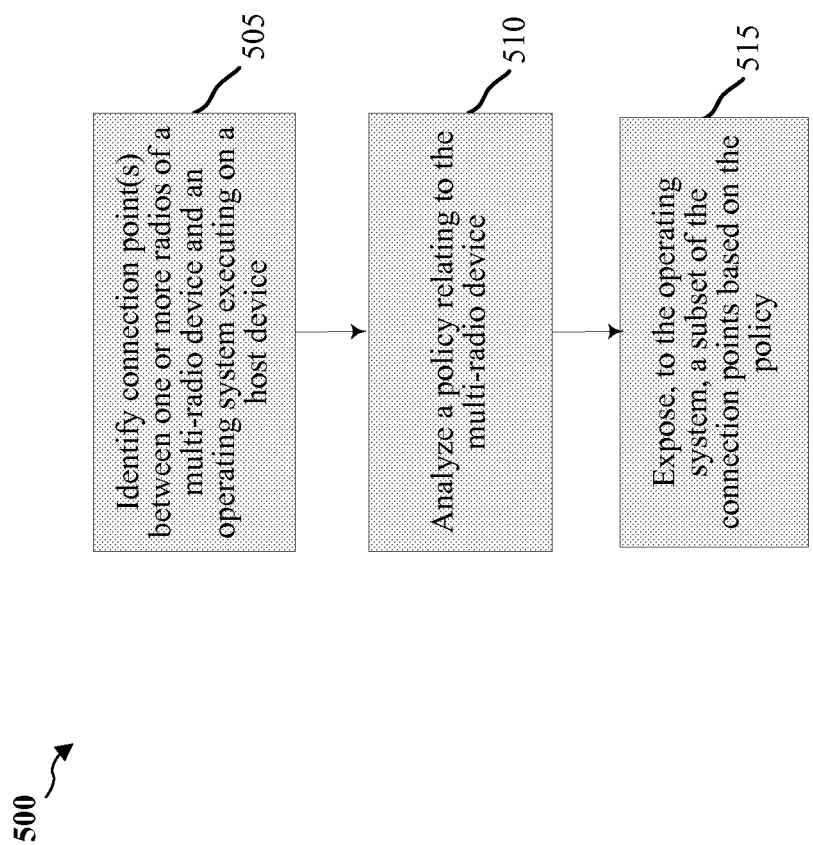
FIG. 5 is a flow chart illustrating one example of a method for dynamically configuring an interface between a multi-radio device and an operating system.

FIG. 5 is a flow chart illustrating one example of a method 500 for dynamically configuring an interface between a multi-radio device and an operating system. For clarity, the method 500 is described below with reference to the mobile device 115 shown in FIG. 1, 2, 3, or 4. In one implementation, the policy engine 225 may execute one or more sets of codes to control the functional elements of the mobile device 115 to perform the functions described below.

At block 505, one or more connection points may be identified between one or more radios 315 of a multi-radio device 320 and an operating system 215 executing on a host device (e.g., the mobile device 115). The identified connection points may be directly between the radio 315 and the operating system 215. In another example, the identified connection points may be established by a radio controller 405 that controls the radios 315.

At block 510, a policy relating to the multi-radio device may be analyzed. The policy may be maintained by the mobile device 115. In another example, the policy may be maintained via a host application command. The policy include rules relating to a time of day, signal strength, network congestion, delay, size of data to be transmitted/received, the number of established connection points, etc.

At block 515, a subset of the connection points may be exposed to the operating system 215 based on the policy. In one example, the subset of the connection points to expose may be a single connection point. In another example, the subset of the connection points to expose may be an empty set. For example, a radio device provided by a third party may be included within the operating system 215. The multi-radio device 320 may expose zero connection points to the operating system and instead, the multi-radio device 320 may serve as a base station or access point for the radio device included within the operating system 215. As another example, zero connections points may be exposed to the operating system if a user of the host device is not authorized to use the one or more radios 315. For instance, the user may not have a customer account with a mobile network operator. In one embodiment, the policy may prohibit the need to identify connection points and/or expose a subset of the identified connection points to the operating system.

Therefore, the method 500 may provide for efficient configurations of the interface between a multi-radio device and an operating system. It should be noted that the method 500 is just one implementation and that the operations of the method 500 may be rearranged or otherwise modified such that other implementations are possible.

Figure 6:
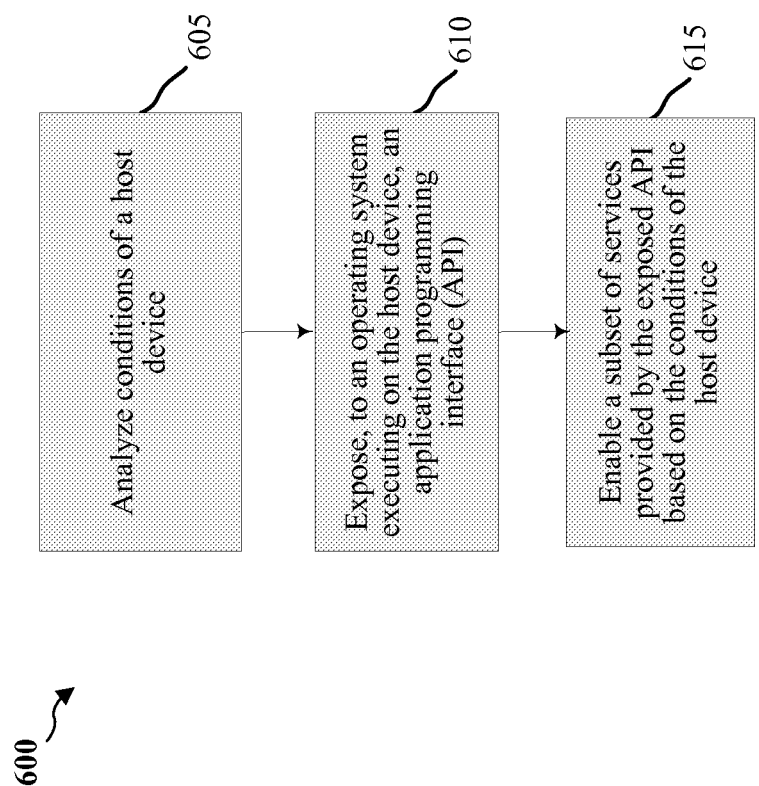
FIG. 6 is a flow chart illustrating one example of a method for dynamically enabling a subset of services of an API set.

FIG. 6 is a flow chart illustrating one example of a method 600 for dynamically enabling a subset of services of an API set 305. For clarity, the method 600 is described below with reference to the mobile device 115 shown in FIG. 1, 2, 3, or 4. In one implementation, the policy engine 225 may execute one or more sets of codes to control the functional elements of the mobile device 115 to perform the functions described below.

At block 605, conditions of a host device (e.g., the mobile device 115) may be analyzed. The analyzed conditions may include, but are not limited to, a battery level, radio coverage, capabilities of the host device, etc. At block 610, an API set 305 may be exposed to an operating system 215 executing on the host device. The API set 305 may be related to a radio 315 within the multi-radio device 320.

At block 615, a subset of services provided by the exposed API set 305 may be enabled based on the conditions of the host device. For example, the API set 305 may provide services relating to voice-call management and data management. The host device may be a device that does not transmit/receive voice calls. As a result, the voice-call management services provided by the API set 305 may not be enabled.

Therefore, the method 600 may provide for dynamic enablement of services provided by an API set based on conditions of the host device. It should be noted that the method 600 is just one implementation and that the operations of the method 600 may be rearranged or otherwise modified such that other implementations are possible.

Figure 7:
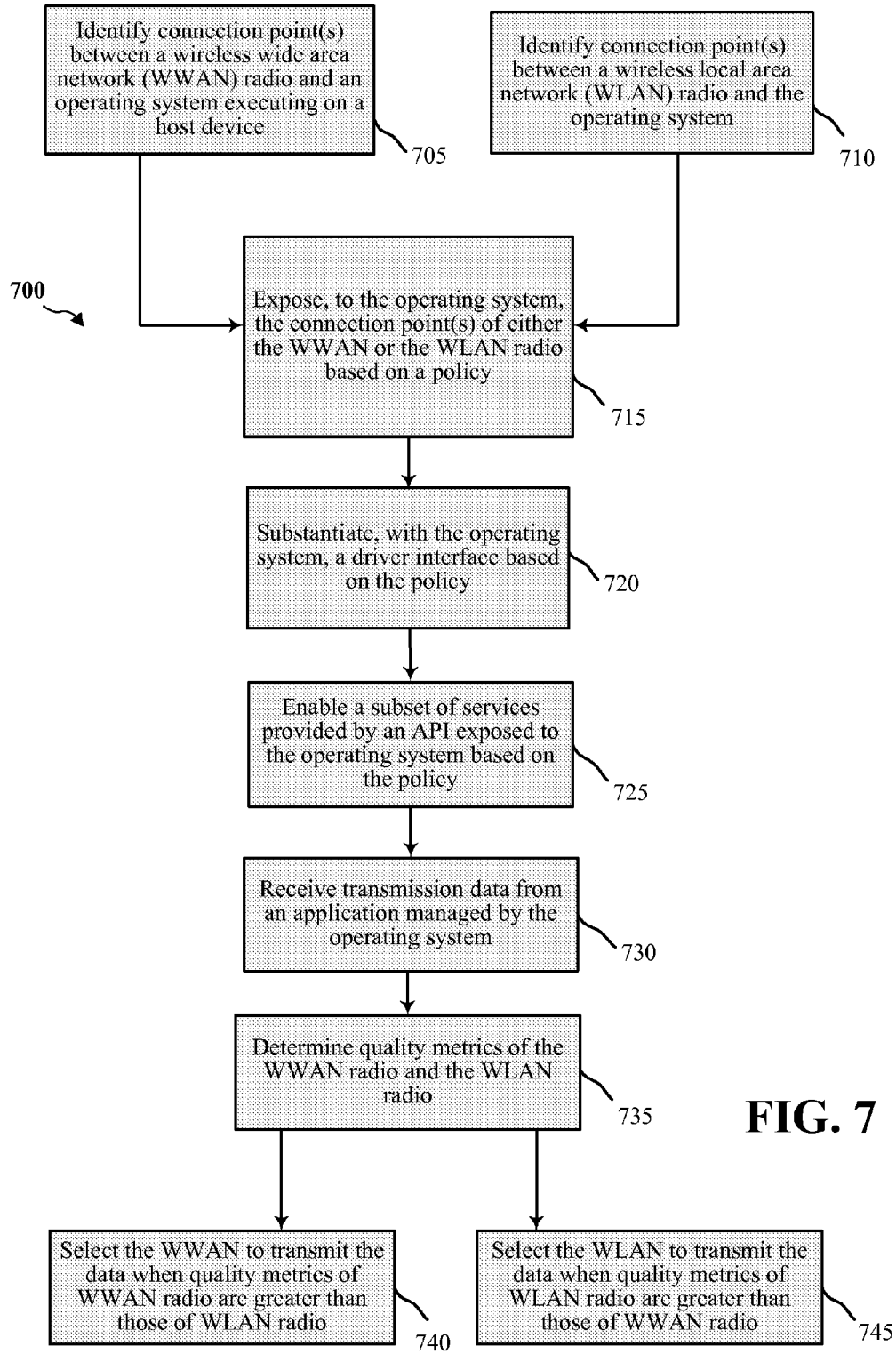
FIG. 7 is a flow chart illustrating one example of a method for dynamically configuring an interface between a multi-radio device and an operating system executing on a mobile device.

FIG. 7 is a flow chart illustrating one example of a method 700 for dynamically configuring an interface between a multi-radio device and an operating system executing on a mobile device 115. For clarity, the method 700 is described below with reference to the mobile device 115 shown in FIG. 1, 2, 3, or 4. In one implementation, the policy engine 225 may execute one or more sets of codes to control the functional elements of the mobile device 115 to perform the functions described below.

At block 705, one or more connection points may be identified between a WWAN radio and the operating system 215 executing on the mobile device 115. Similarly, at block 710, one or more connection points may be identified between a WLAN radio and the operating system 215. The WWAN radio and the WLAN radio may form a multi-radio device 320.

At block 715, the one or more connection points of either the WWAN radio or the WLAN radio may be exposed to the operating system 215 based on a policy. For example, the location of the mobile device 115 may determine which connection point is exposed to the operating system 215. In addition, the time of day, signal strength of the radios, congestion of a network, size of data to transmit/receive, the type of operating system executing on the device 115, etc. may be part of the policy to determine which connection point to expose to the operating system 215.

At block 720, a driver interface may be substantiated with the operating system. In one configuration, the driver that is substantiated may be determined based on policy. The substantiated driver may relate to the radio whose connection point is exposed to the operating system 215. Alternatively, the driver may not relate to the radio. For example, the connection point of the WLAN radio may be exposed to the operating system. The driver, however, that is substantiated with the operating system may be a WWAN/mobile broadband driver interface.

At block 725, a subset of services provided by an API set 305 exposed to the operating system 215 may be enabled. The selection of the subset of services to enable may be based on policy. For example, various conditions and characteristics of the mobile device 115 may determine which services of the API set to enable, as previously described.

At block 730, transmission data may be received from an application in the application layer 210 that may be managed by the operating system 215. At block 735, quality metrics of the WWAN radio and the WLAN radio may be determined. At block 740, the WWAN radio may be selected to transmit the data when the quality metrics of the WWAN radio are greater than those of the WLAN radio. At block 745, the WLAN may be selected to transmit the data when quality metrics of the WLAN radio are greater than those of the WWAN radio.

Therefore, the method 700 may provide for various dynamic configurations of the interface between the multi-radio device 320 and the operating system 215. It should be noted that the method 700 is just one implementation and that the operations of the method 700 may be rearranged or otherwise modified such that other implementations are possible.

Employing the techniques and structures disclosed herein, the configuration of the interface between a modem and an operating system may be performed by the multi-radio device 320 or via a host programming command instead of being performed by the operating system 215. As a result, the multi-radio device 320 may expose a connection point to the operating system 215 for a particular radio based on policy maintained by the multi-radio device 320. In addition, the multi-radio device may enable a subset of services provided by API sets based on policy, such as conditions of the mobile device 115. Further, the multi-radio device 320 may enumerate a single device class to the operating system 215, instead of numerous device classes for each radio. Performing the configuration changes at the multi-radio device 320 level using policies maintained by the device 320 improves the efficiency of the interface between the operating system 215 and the multi-radio device 320.

Figure 8:
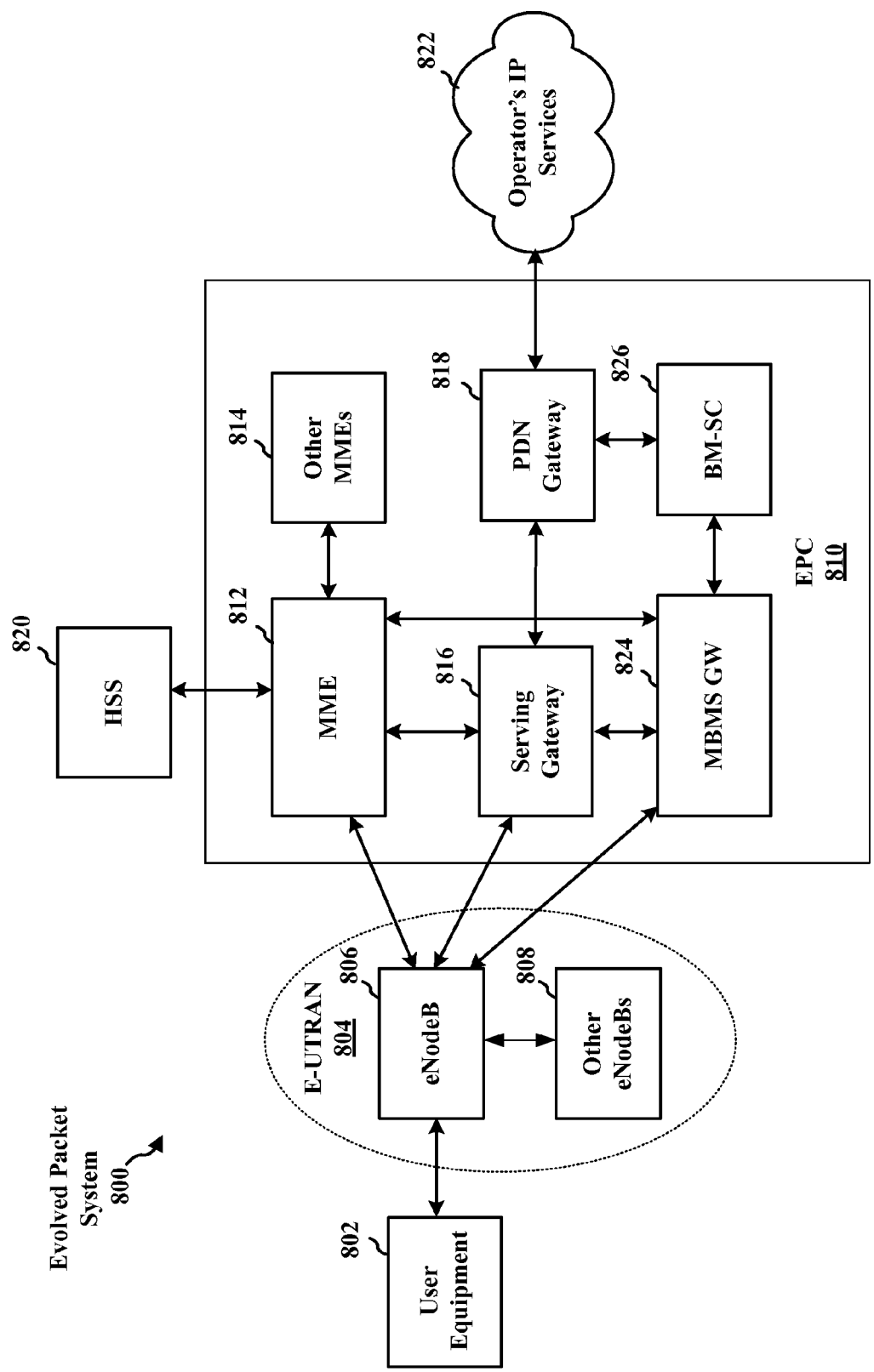
FIG. 8 is a diagram illustrating an example of a network architecture.

FIG. 8 is a diagram illustrating an LTE network architecture 800. The LTE network architecture 800 may be referred to as an Evolved Packet System (EPS) 800. The EPS 800 may include one or more user equipment (UE) 802, an Evolved UMTS Terrestrial Radio Access Network (E-UTRAN) 804, an Evolved Packet Core (EPC) 810, a Home Subscriber Server (HSS) 820, and an Operator's Internet Protocol (IP) Services 822. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 806 and other eNBs 808. The eNB 806 provides user and control planes protocol terminations toward the UE 802. The eNB 806 may be connected to the other eNBs 808 via a backhaul (e.g., an X2 interface). The eNB 806 may also be referred to as a base station, a Node B, an access point, a base transceiver station, a radio base station, a radio transceiver, a transceiver function, a basic service set (BSS), an extended service set (ESS), or some other suitable terminology. The eNB 806 provides an access point to the EPC 810 for a UE 802. Examples of UEs 802 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 802 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 806 is connected to the EPC 810. The EPC 810 includes a Mobility Management Entity (MME) 812, other MMEs 814, a Serving Gateway 816, a Multimedia Broadcast Multicast Service (MBMS) Gateway 824, a Broadcast Multicast Service Center (BM-SC) 826, and a Packet Data Network (PDN) Gateway 818. The MME 812 is the control node that processes the signaling between the UE 802 and the EPC 810. Generally, the MME 812 provides bearer and connection management. All user IP packets are transferred through the Serving Gateway 816, which itself is connected to the PDN Gateway 818. The PDN Gateway 818 provides UE IP address allocation as well as other functions. The PDN Gateway 818 is connected to the Operator's IP Services 822. The Operator's IP Services 822 may include the Internet, an intranet, an IP Multimedia Subsystem (IMS), and a PS Streaming Service (PSS). The BM-SC 826 may provide functions for MBMS user service provisioning and delivery. The BM-SC 826 may serve as an entry point for content provider MBMS transmission, may be used to authorize and initiate MBMS Bearer Services within a PLMN, and may be used to schedule and deliver MBMS transmissions. The MBMS Gateway 824 may be used to distribute MBMS traffic to the eNBs (e.g., 806, 808) belonging to a Multicast Broadcast Single Frequency Network (MBSFN) area broadcasting a particular service, and may be responsible for session management (start/stop) and for collecting eMBMS related charging information.

Figure 9:
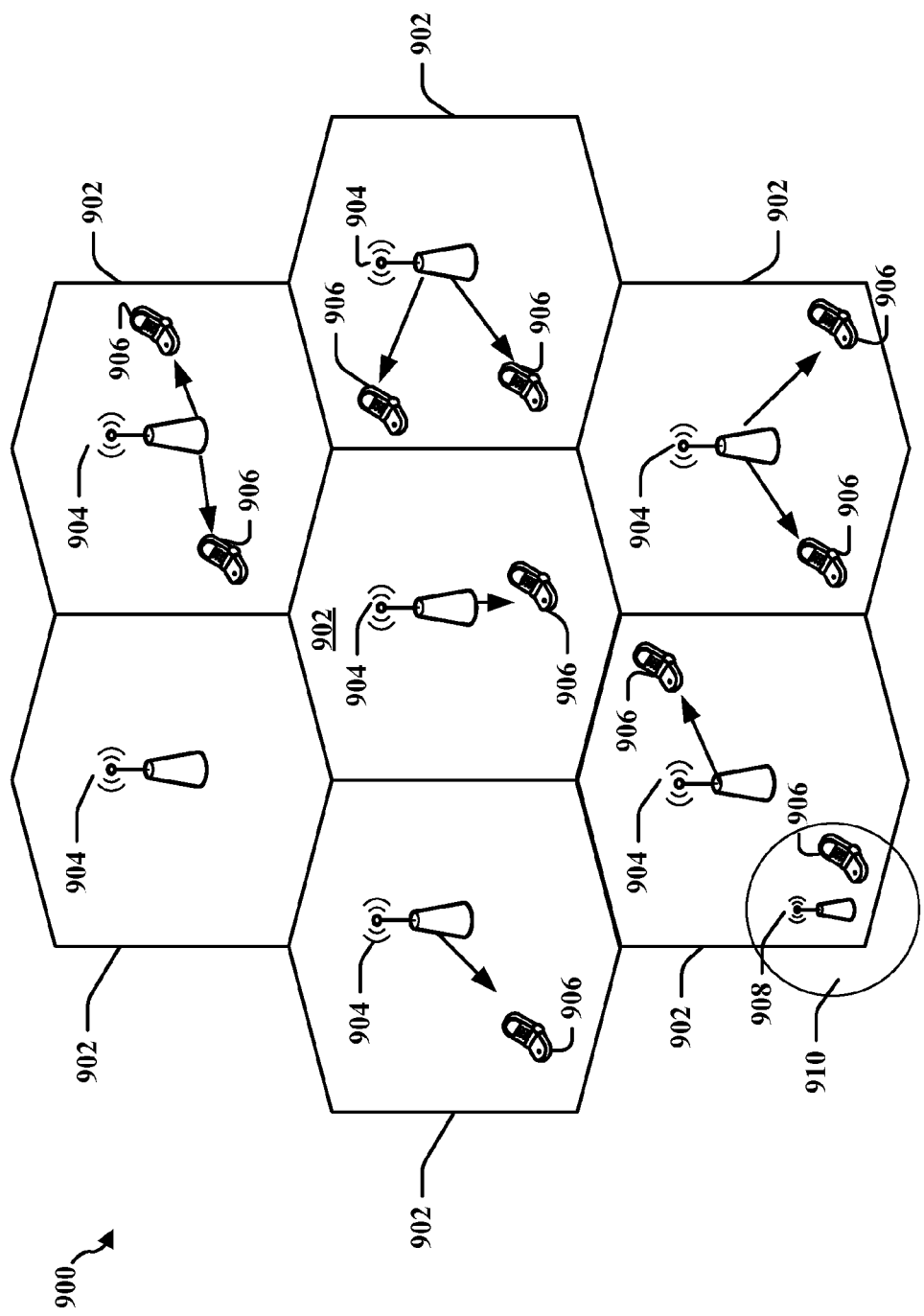
FIG. 9 is a diagram illustrating an example of an access network.

FIG. 9 is a diagram illustrating an example of an access network 900 in an LTE network architecture. In this example, the access network 900 is divided into a number of cellular regions (cells) 902. One or more lower power class eNBs 908 may have cellular regions 910 that overlap with one or more of the cells 902. The lower power class eNB 908 may be a femto cell (e.g., home eNB (HeNB)), pico cell, micro cell, or remote radio head (RRH). The macro eNBs 904 are each assigned to a respective cell 902 and are configured to provide an access point to the EPC 810 for all the UEs 906 in the cells 902. There is no centralized controller in this example of an access network 900, but a centralized controller may be used in alternative configurations. The eNBs 904 are responsible for all radio related functions including radio bearer control, admission control, mobility control, scheduling, security, and connectivity to the serving gateway 816.

The modulation and multiple access scheme employed by the access network 900 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 904 may have multiple antennas supporting MIMO technology. The use of MIMO technology enables the eNBs 904 to exploit the spatial domain to support spatial multiplexing, beamforming, and transmit diversity. Spatial multiplexing may be used to transmit different streams of data simultaneously on the same frequency. The data streams may be transmitted to a single UE 906 to increase the data rate or to multiple UEs 906 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 906 with different spatial signatures, which enables each of the UE(s) 906 to recover the one or more data streams destined for that UE 906. On the UL, each UE 906 transmits a spatially precoded data stream, which enables the eNB 904 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 10:
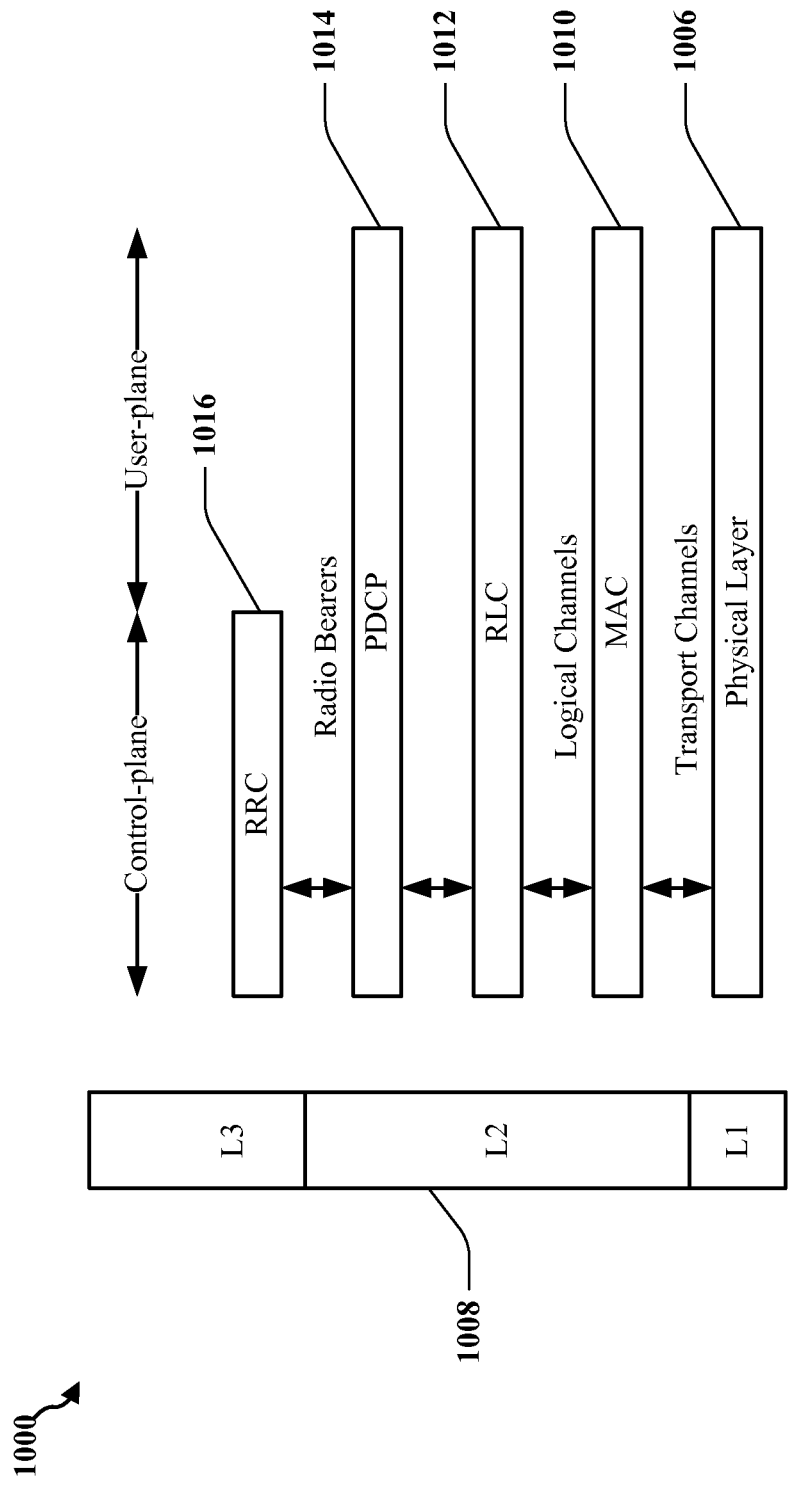
FIG. 10 is a diagram illustrating an example of a radio protocol architecture for the user and control planes.

FIG. 10 is a diagram 1000 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 1006. Layer 2 (L2 layer) 1008 is above the physical layer 1006 and is responsible for the link between the UE and eNB over the physical layer 1006.

In the user plane, the L2 layer 1008 includes a media access control (MAC) sublayer 1010, a radio link control (RLC) sublayer 1012, and a packet data convergence protocol (PDCP) 1014 sublayer, which are terminated at the eNB on the network side. Although not shown, the UE may have several upper layers above the L2 layer 1008 including a network layer (e.g., IP layer) that is terminated at the PDN gateway 818 on the network side, and an application layer that is terminated at the other end of the connection (e.g., far end UE, server, etc.).

The PDCP sublayer 1014 provides multiplexing between different radio bearers and logical channels. The PDCP sublayer 1014 also provides header compression for upper layer data packets to reduce radio transmission overhead, security by ciphering the data packets, and handover support for UEs between eNBs. The RLC sublayer 1012 provides segmentation and reassembly of upper layer data packets, retransmission of lost data packets, and reordering of data packets to compensate for out-of-order reception due to hybrid automatic repeat request (HARQ). The MAC sublayer 1010 provides multiplexing between logical and transport channels. The MAC sublayer 1010 is also responsible for allocating the various radio resources (e.g., resource blocks) in one cell among the UEs. The MAC sublayer 1010 is also responsible for HARQ operations.

In the control plane, the radio protocol architecture for the UE and eNB is substantially the same for the physical layer 1006 and the L2 layer 1008 with the exception that there is no header compression function for the control plane. The control plane also includes a radio resource control (RRC) sublayer 1016 in Layer 3 (L3 layer). The RRC sublayer 1016 is responsible for obtaining radio resources (i.e., radio bearers) and for configuring the lower layers using RRC signaling between the eNB and the UE.

Figure 11:
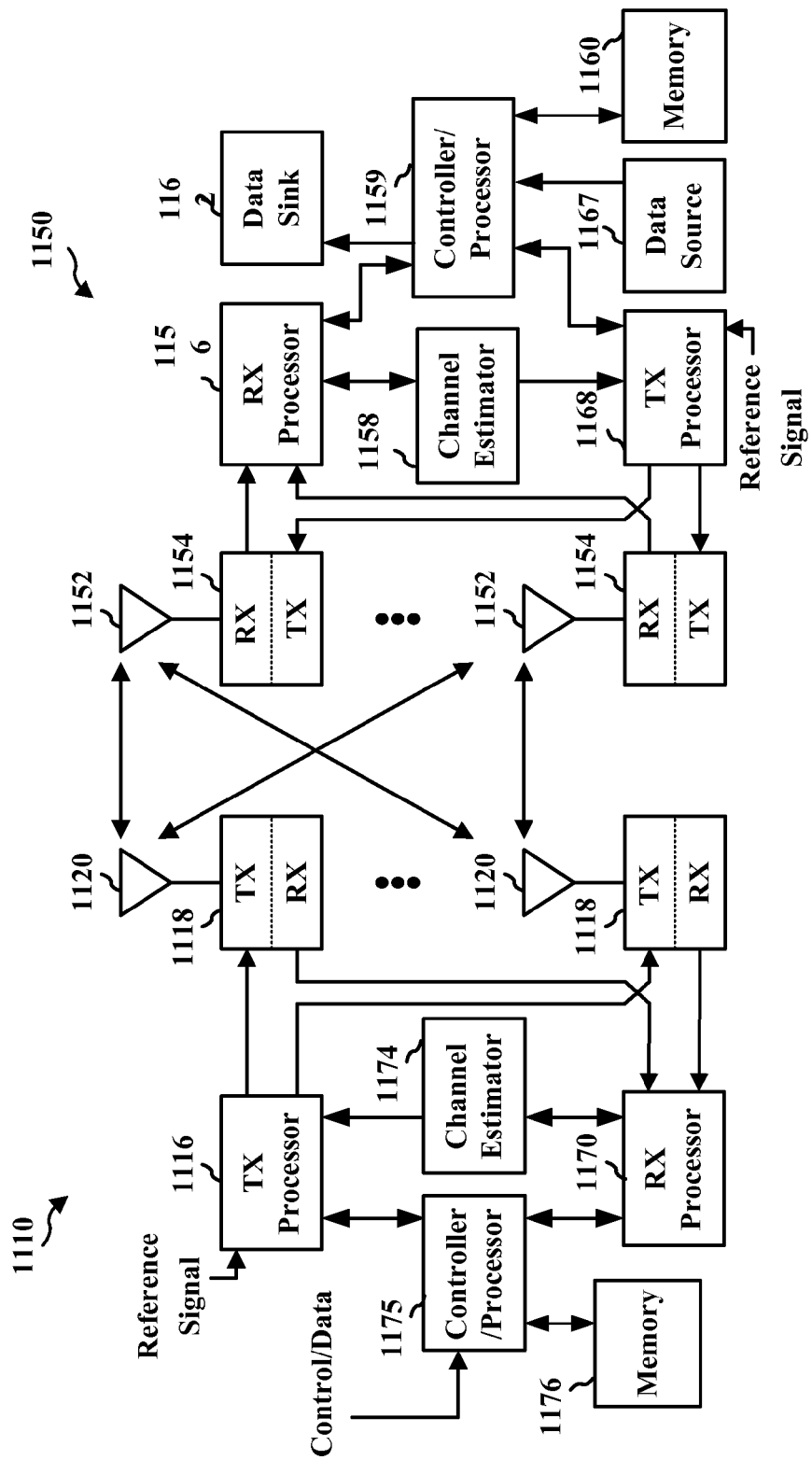
FIG. 11 is a diagram illustrating an example of an evolved Node B and user equipment in an access network.

FIG. 11 is a block diagram of an eNB 1110 in communication with a UE 1150 in an access network. In the DL, upper layer packets from the core network are provided to a controller/processor 1175. The controller/processor 1175 implements the functionality of the L2 layer. In the DL, the controller/processor 1175 provides header compression, ciphering, packet segmentation and reordering, multiplexing between logical and transport channels, and radio resource allocations to the UE 1150 based on various priority metrics. The controller/processor 1175 is also responsible for HARQ operations, retransmission of lost packets, and signaling to the UE 1150.

The transmit (TX) processor 1116 implements various signal processing functions for the L1 layer (i.e., physical layer). The signal processing functions includes coding and interleaving to facilitate forward error correction (FEC) at the UE 1150 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1174 may be used to determine the coding and modulation scheme, as well as for spatial processing. The channel estimate may be derived from a reference signal and/or channel condition feedback transmitted by the UE 1150. Each spatial stream is then provided to a different antenna 1120 via a separate transmitter 1118TX. Each transmitter 1118TX modulates an RF carrier with a respective spatial stream for transmission.

At the UE 1150, each receiver 1154RX receives a signal through its respective antenna 1152. Each receiver 1154RX recovers information modulated onto an RF carrier and provides the information to the receive (RX) processor 1156. The RX processor 1156 implements various signal processing functions of the L1 layer. The RX processor 1156 performs spatial processing on the information to recover any spatial streams destined for the UE 1150. If multiple spatial streams are destined for the UE 1150, they may be combined by the RX processor 1156 into a single OFDM symbol stream. The RX processor 1156 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 1110. These soft decisions may be based on channel estimates computed by the channel estimator 1158. The soft decisions are then decoded and deinterleaved to recover the data and control signals that were originally transmitted by the eNB 1110 on the physical channel. The data and control signals are then provided to the controller/processor 1159.

The controller/processor 1159 implements the L2 layer. The controller/processor can be associated with a memory 1160 that stores program codes and data. The memory 1160 may be referred to as a computer-readable medium. In the UL, the controller/processor 1159 provides demultiplexing between transport and logical channels, packet reassembly, deciphering, header decompression, control signal processing to recover upper layer packets from the core network. The upper layer packets are then provided to a data sink 1162, which represents all the protocol layers above the L2 layer. Various control signals may also be provided to the data sink 1162 for L3 processing. The controller/processor 1159 is also responsible for error detection using an acknowledgement (ACK) and/or negative acknowledgement (NACK) protocol to support HARQ operations.

In the UL, a data source 1167 is used to provide upper layer packets to the controller/processor 1159. The data source 1167 represents all protocol layers above the L2 layer. Similar to the functionality described in connection with the DL transmission by the eNB 1110, the controller/processor 1159 implements the L2 layer for the user plane and the control plane by providing header compression, ciphering, packet segmentation and reordering, and multiplexing between logical and transport channels based on radio resource allocations by the eNB 1110. The controller/processor 1159 is also responsible for HARQ operations, retransmission of lost packets, and signaling to the eNB 1110.

Channel estimates derived by a channel estimator 1158 from a reference signal or feedback transmitted by the eNB 1110 may be used by the TX processor 1168 to select the appropriate coding and modulation schemes, and to facilitate spatial processing. The spatial streams generated by the TX processor 1168 are provided to different antenna 1152 via separate transmitters 1154TX. Each transmitter 1154TX modulates an RF carrier with a respective spatial stream for transmission.

The UL transmission is processed at the eNB 1110 in a manner similar to that described in connection with the receiver function at the UE 1150. Each receiver 1118RX receives a signal through its respective antenna 1120. Each receiver 1118RX recovers information modulated onto an RF carrier and provides the information to a RX processor 1170. The RX processor 1170 may implement the L1 layer.

The controller/processor 1175 implements the L2 layer. The controller/processor 1175 can be associated with a memory 1176 that stores program codes and data. The memory 1176 may be referred to as a computer-readable medium. In the UL, the control/processor 1175 provides demultiplexing between transport and logical channels, packet reassembly, deciphering, header decompression, control signal processing to recover upper layer packets from the UE 1150. Upper layer packets from the controller/processor 1175 may be provided to the core network. The controller/processor 1175 is also responsible for error detection using an ACK and/or NACK protocol to support HARQ operations.

Cellular network operators deploy wireless local area network (WLAN) hotspots in order to use WLAN unlicensed spectrum to increase capacity of their network. Numerous access points may be deployed utilizing free spectrum (e.g., 100,000 access points may be deployed). Thus, devices should connect to these access points to offload data traffic from the cellular network. Currently, WLAN deployments are independent from operator cellular deployments. Moreover, only some deployments involve EAP-AKA authentication. Therefore, control of WLAN offload is left to the UE/HLOS.

However, it may be difficult for a device to seamlessly transition from the cellular network to a WLAN because cellular network chipsets are different from WLAN chipsets within the device. For example, a cellular network chipset may be exposed to the applications processor (operating system) in a different manner from a WLAN chipset. The device operating system may consider a cellular network pipe completely different pipe from a WLAN pipe. Accordingly, when an operator wishes to introduce a new feature with respect to WLAN offload, which by nature affects both the WLAN chipset and the cellular network chipset, separate codes need to be written for the WLAN chipset, the cellular network chipset, and the applications processor. Therefore, what is needed is an ecosystem that provides a more flexible architecture for easing an operator's ability to provide WLAN offload solutions. An operator may be interested in: 1) Boosting capacity by increasing the attach rate to operator deployed WLAN hotspots; and 2) Dynamic load sharing between licensed and unlicensed spectrum (e.g., based on load on each RAT). The second interest is desirable when most devices are able to find and connect to operator WLANs. An operator-owned WLAN may become seamless extensions of licensed spectrum. The present disclosure provides a device architecture for enabling and leveraging the above scenarios to gain control of overall connectivity management.

In an aspect, a WLAN interface at the modem should not be directly connected to the HLOS at the applications processor (AP). Rather, the WLAN interface should be more connected to the modem, or some entity in the modem, such that communication over the WLAN interface is controlled by the modem. For example, the modem may decide whether to send data traffic over a cellular network interface or over the WLAN interface. Thus, WLAN offload solutions may be confined to the modem and do not need to be exposed to the HLOS.

The modem may provide to the HLOS a single Internet protocol interface representing a number of abstracted physical communication interfaces (e.g., WLAN, LTE, 3G, etc.). The abstracted physical communication interfaces may be hidden from the HLOS. Moreover, the HLOS may not even need to know that it is connected to the WLAN, LTE, or 3G interfaces.

In an aspect, the abstraction of the physical communication interfaces should be done in a backward compatible manner. For example, an operating system (HLOS) and/or user may not care most of the time whether it is connected to a carrier network via a carrier LTE interface or a carrier WLAN interface because it will be billed (charged) in the same manner. However, the user will care if it is connected to its own WLAN interface (e.g., home Wi-Fi or corporate Wi-Fi). Thus, when the modem detects such an interface, the modem should expose the interface to the HLOS.

In an aspect, the WLAN interface may be exposed to the HLOS depending on a type of WLAN a device is connected to. The modem may include a filtering element to detect the type of WLAN. If the detected WLAN is a carrier WLAN, or if the WLAN has certain characteristics (e.g., includes service set identifier (SSID) in a preconfigured list), the modem does not expose the corresponding WLAN interface to the HLOS. As such, the modem internally manages communication over the WLAN (e.g., decision to send or not send traffic via WLAN, connect or not connect to WLAN, etc.).

If the modem detects a WLAN that it is unfamiliar with or a private WLAN, then the modem exposes the corresponding WLAN interface to the HLOS. As such, the HLOS manages communication over the WLAN, and therefore backward compatibility is maintained.

In general, the modem may provide a single IP interface representing a number of abstracted physical communication interfaces to the HLOS, wherein the abstracted physical communication interfaces are hidden from the HLOS. However, this is done in a backward compatible way to account for when the HLOS or user wishes to know that it is connected to its own WLAN interface, for example. Whether the WLAN interface is exposed to the HLOS may be dependent on a policy set by the operator. For example, when the device is connected to the operator's WLAN, the modem does not expose the WLAN interface to the HLOS, and when the device is connected to a WLAN interface other than the operator's WLAN interface, the modem exposes the WLAN interface to the HLOS.

Figure 12:
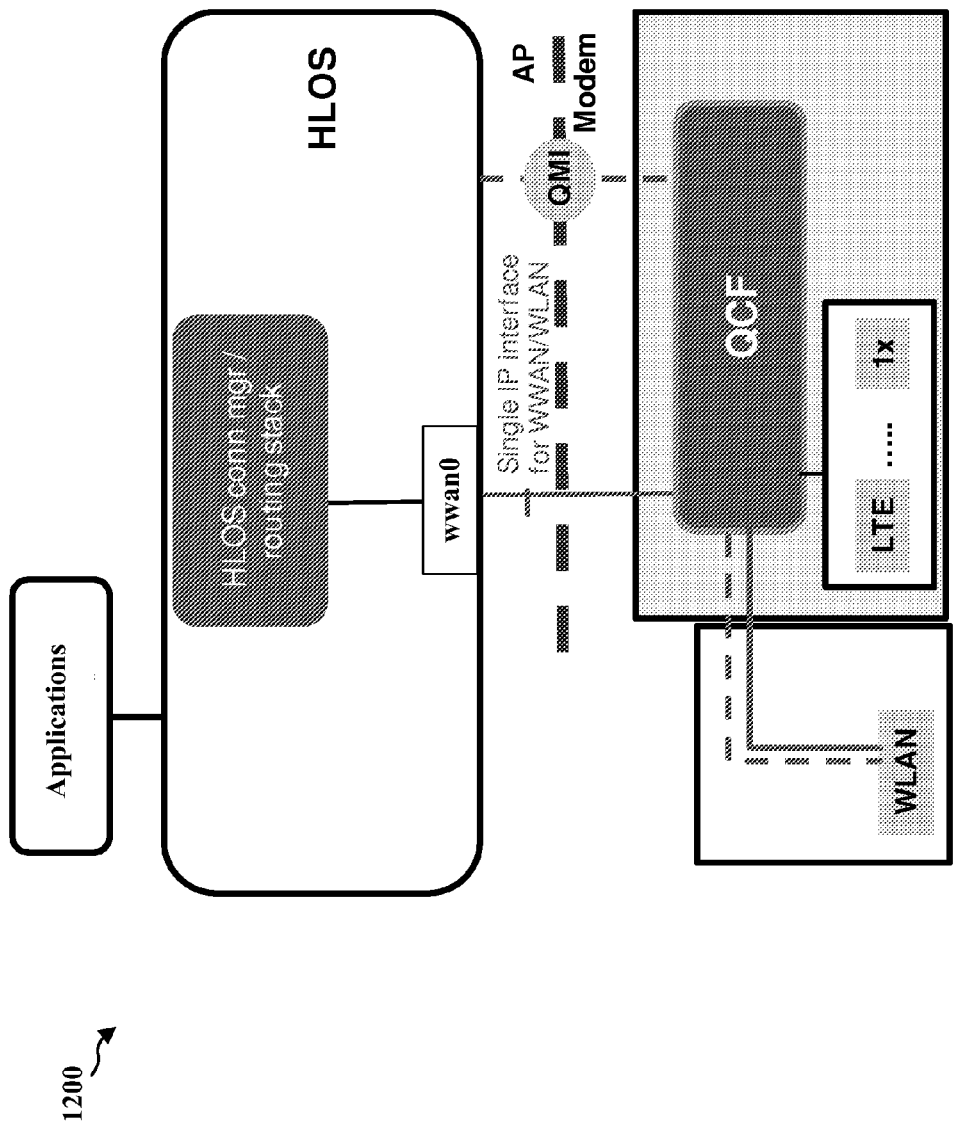
FIG. 12 is a diagram illustrating a device connectivity framework architecture.

FIG. 12 is a diagram 1200 illustrating a device connectivity framework architecture. In an aspect, a modem-centric framework is provided that exposes a communication interface at a modem to a high level operating system (HLOS) at an applications processor (AP) independent of the physical interface. The architecture may hide all radio access technology (RAT) interfaces, including a WLAN interface, from the HLOS, applications, and/or a user. The WLAN interface may be treated like a RAT interface. The architecture may implement carrier-grade WLAN integration into a cellular network. Moreover, the architecture may be implemented not only by a connectivity engine in the modem, but also by software partitioning between the modem, WLAN interface, and the HLOS.

In an aspect, a same physical interface will have different connectivity properties in a different configuration. For example, in a wireless wide area network (WWAN) APN concept, the WWAN is actually exposed as a set of network interfaces, one per APN. In another example, Wi-Fi can be used as: 1) a WWAN replacement (Internet APN); 2) a LAN (home network); a PAN (Wi-Fi Direct); or 4) a WWAN replacement (for other APNs with I-WLAN and similar solutions).

Each of these connectivity properties have different characteristics that should be reflected in the interface description: 1) Connection to different "networks"; 2) A file share that is advertised from a computer on a trusted home LAN interface should not be accessible when connecting to a hotspot or when a game is played on a Wi-Fi Direct connection; and 3) Protocols such as UPnP and Bonjour that are intended to operate on the LAN interface should not be used at a hotspot and should only be used in a PAN link if required by the application e.g., DLNA or AirPlay.

Applications are interested in connectivity properties rather than physical connectivity: 1) Reachability of destination; and 2) One-to-one mapping between interface type and respective connectivity properties is breaking.

Interface abstraction is the abstraction of interfaces which have the same connectivity properties. Homogeneous interfaces are interfaces with the same connectivity properties: destinations reachable, services offered, billing. Users/applications/HLOS do not care which physical layer (PHY) is used within a given virtual interface as long as underlying interfaces are homogeneous: applications do not break, user is not charged more.

The APN concept can be used to illustrate the model: 1) "Internet APN" provides access to Internet destinations (via WWAN or operator hotspots); 2) "IMS APN" provides access to IMS destinations (via WWAN or operator hotspots); 3) "PAN APN" provides access to proximity peers (via Wi-Fi Direct, LTE-Direct/Flashlinq); and 4) "Connected Home APN" provides access to a user's home network (via WWAN Femto LIPA connection or home WLAN). The model previously discussed (abstraction only for operator owned WLAN) is a simplification of the above for operator-defined APNs (Internet, IMS).

Figure 13:
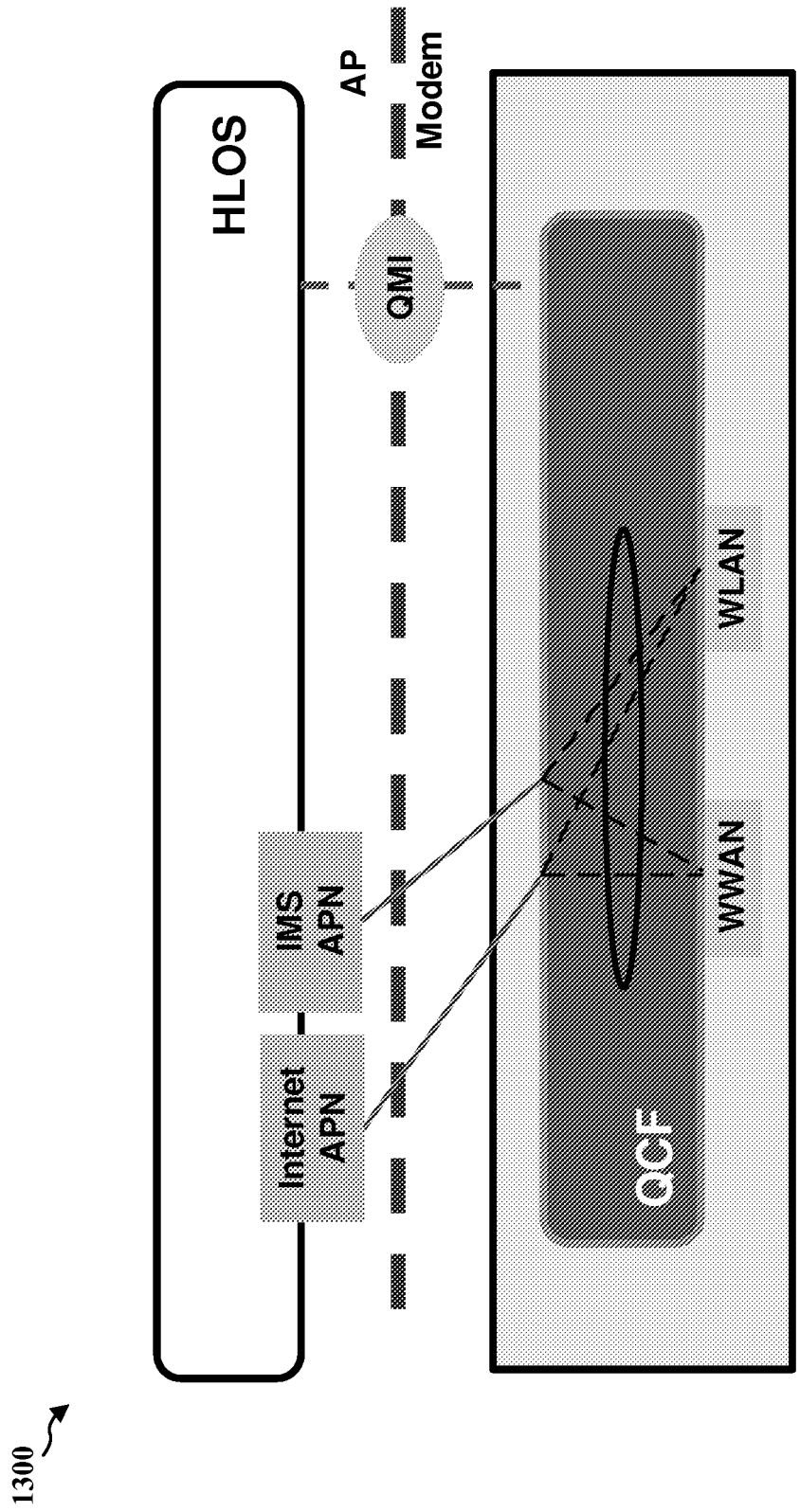
FIG. 13 is a diagram illustrating interface abstraction.

FIG. 13 is a diagram 1300 illustrating interface abstraction. Referring to FIG. 13, APN is used to illustrate the concept of connectivity to different "networks." An issue includes determining when interfaces are homogeneous. Another issue is related to billing. Other properties (e.g., connectivity to destination) can be discovered dynamically by a connectivity framework. Initially, this may be based on configuration (e.g., SSID-based).

Figure 14:
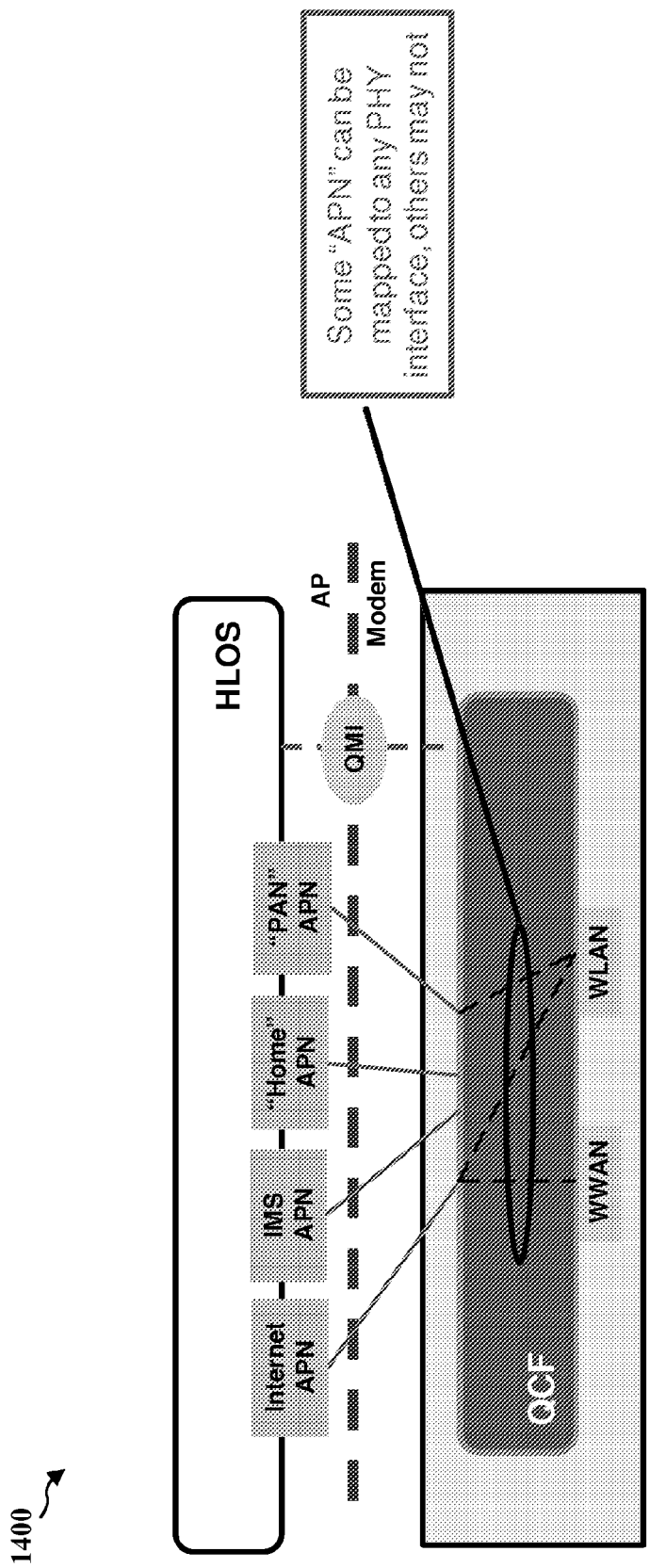
FIG. 14 is a diagram illustrating interface abstraction.

FIG. 14 is a diagram 1400 illustrating interface abstraction. Referring to FIG. 14, virtualization of different "networks" is based on "APN" concept (tags). How HLOS knows properties of each APN/tag is an issue. A programmable interface exposed to HLOS may be included. This abstraction leaves control to the HLOS/applications what APN is used. APN selection is responsibility of applications. This abstraction also provides control to connectivity framework on which PHY is used for any APN.

Figure 15:
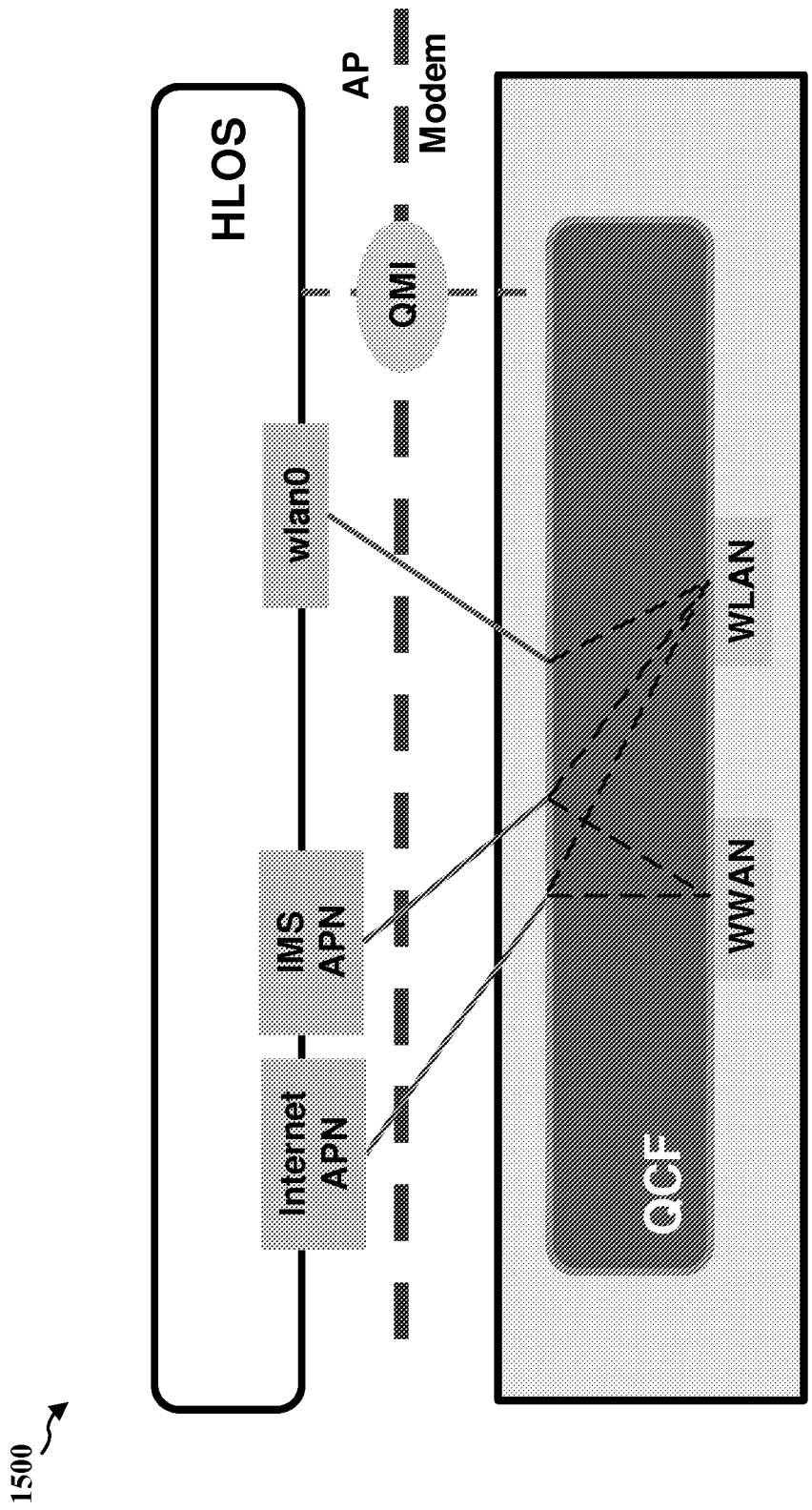
FIG. 15 is a diagram illustrating interface abstraction.

FIG. 15 is a diagram 1500 illustrating interface abstraction. Referring to FIG. 15, interface abstraction is introduced to the ecosystem. That is, wlan0 is exposed. The new architecture requires ecosystem buy-in. wlan0 is a special APN/interface for the WLANs which are not homogeneous to WWAN. Non-operator WLAN networks exist which are physically mapped to the actual WLAN interface. wlan0 may be enabled/disabled from the connectivity framework. When wlan0 is enabled, supplicant in HLOS starts and gets control of the WLAN interface. When wlan0 is disabled, supplicant in HLOS does not control WLAN interface.

Figure 16:
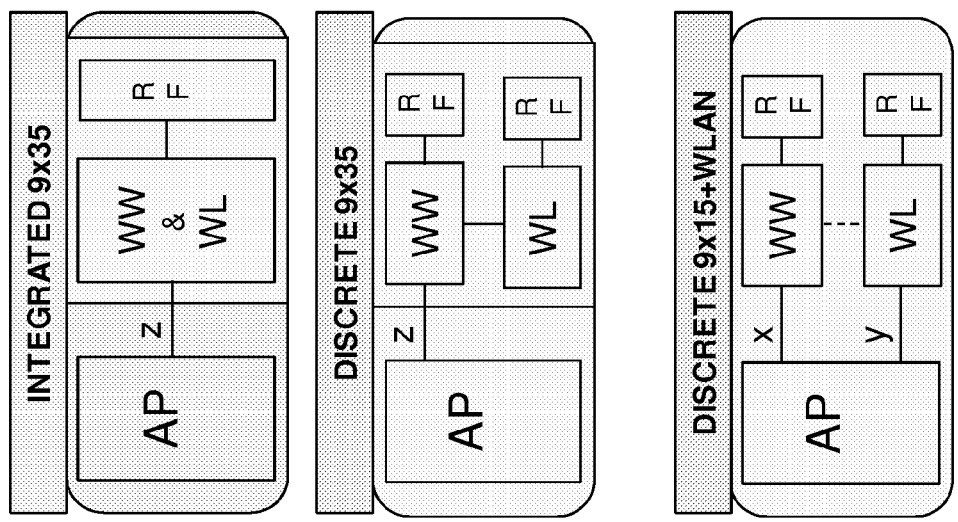
FIG. 16 is a diagram illustrating a relation to a hardware configuration.

FIG. 16 is a diagram 1600 illustrating a relation to a hardware configuration. Referring to FIG. 16, benefits persist with a discrete configuration as long as there is a high speed and low power interconnection.

Figure 17:
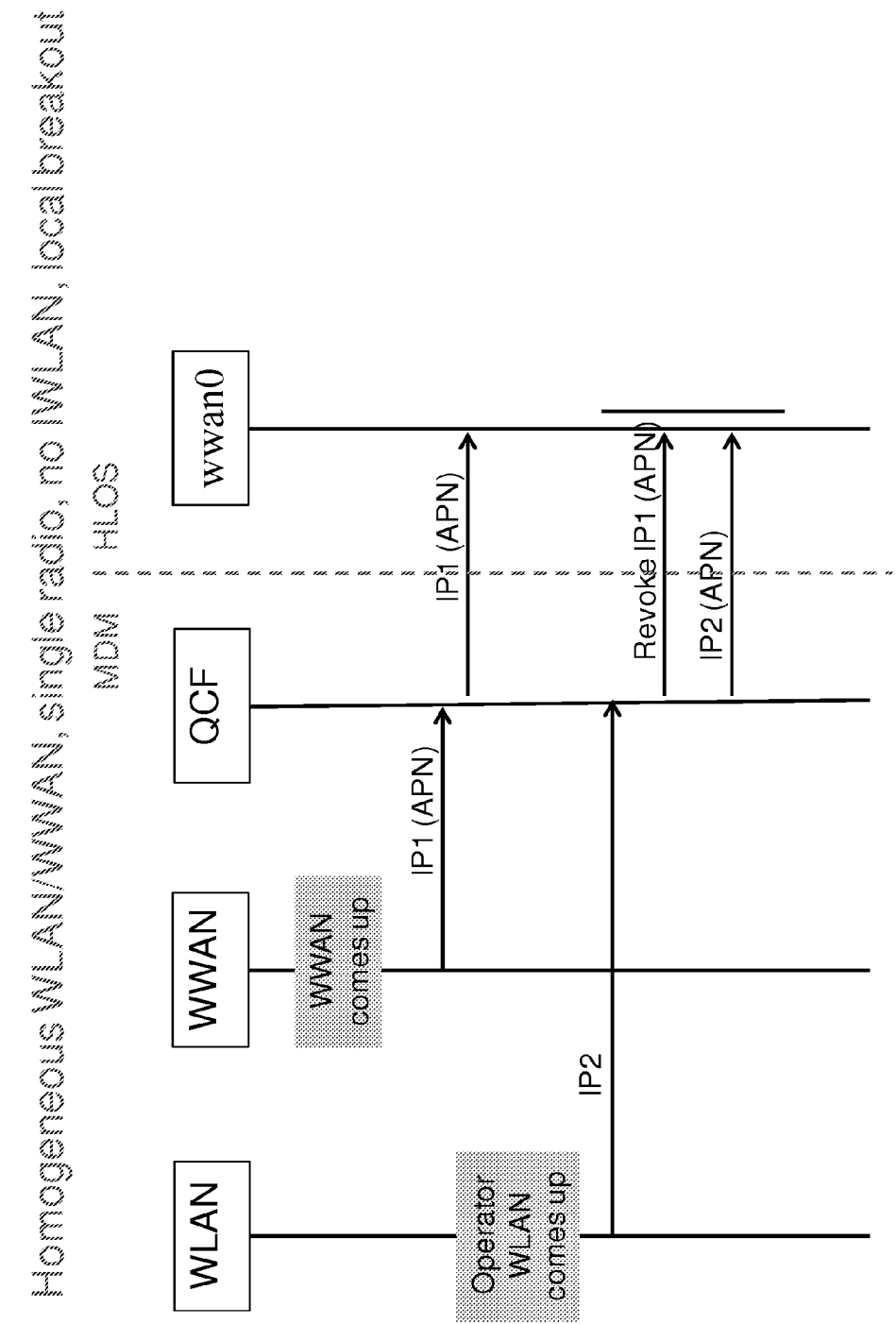
FIG. 17 is a diagram illustrating a call flow.

FIG. 17 is a diagram 1700 illustrating a call flow. Referring to FIG. 17, a homogeneous WLAN/WWAN, a single radio, no IWLAN, and a local breakout are depicted.

Figure 18:
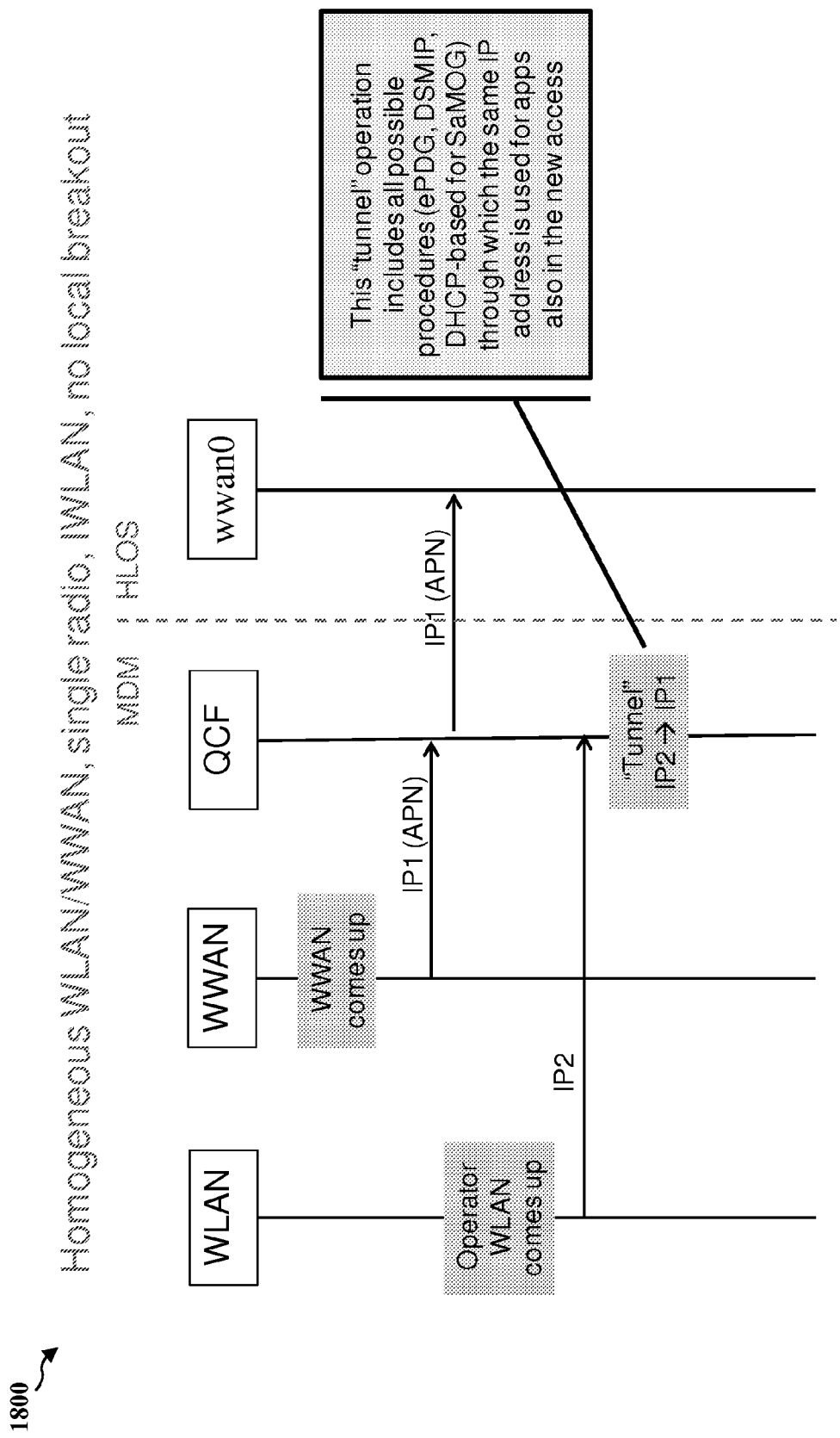
FIG. 18 is a diagram illustrating a call flow.

FIG. 18 is a diagram 1800 illustrating a call flow. Referring to FIG. 18, a homogeneous WLAN/WWAN, a single radio, an IWLAN, and no local breakout are depicted.

Figure 19:
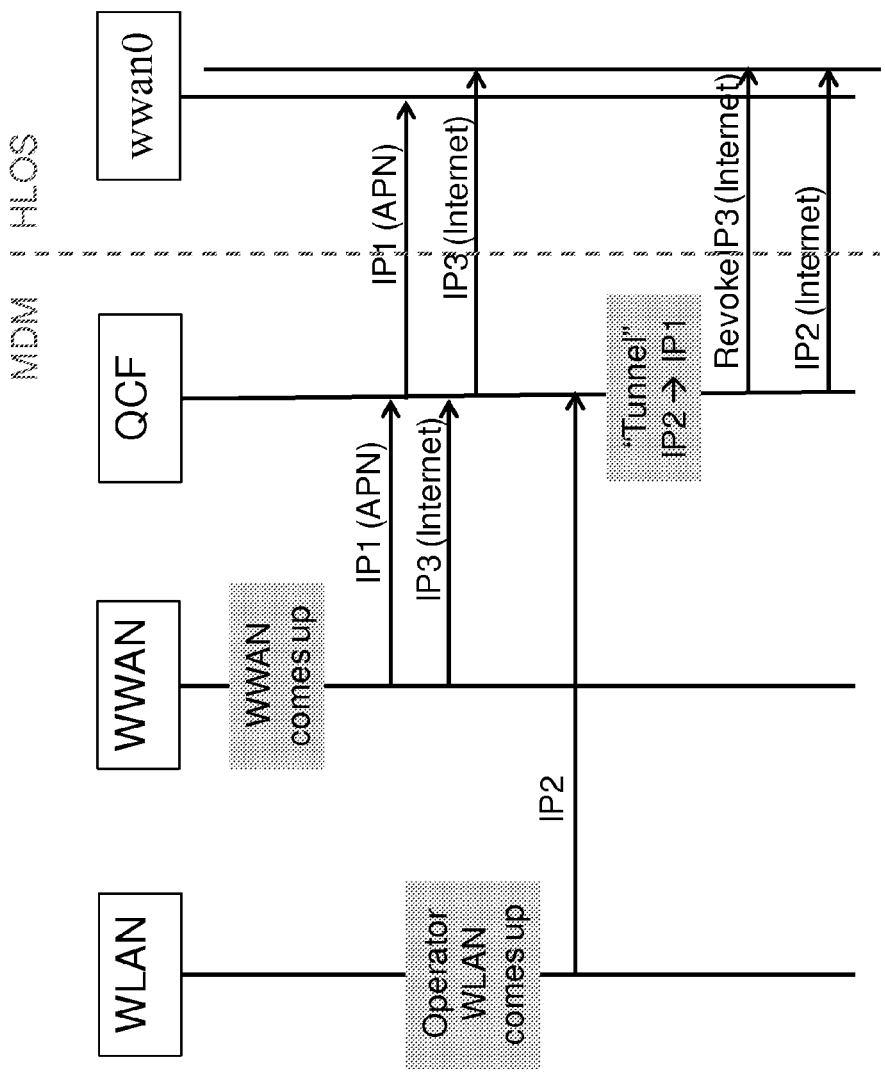
FIG. 19 is a diagram illustrating a call flow.

FIG. 19 is a diagram 1900 illustrating a call flow. Referring to FIG. 19, a homogeneous WLAN/WWAN, a single radio, an IWLAN for one APN, and a local breakout for an Internet APN are depicted.

Figure 20:
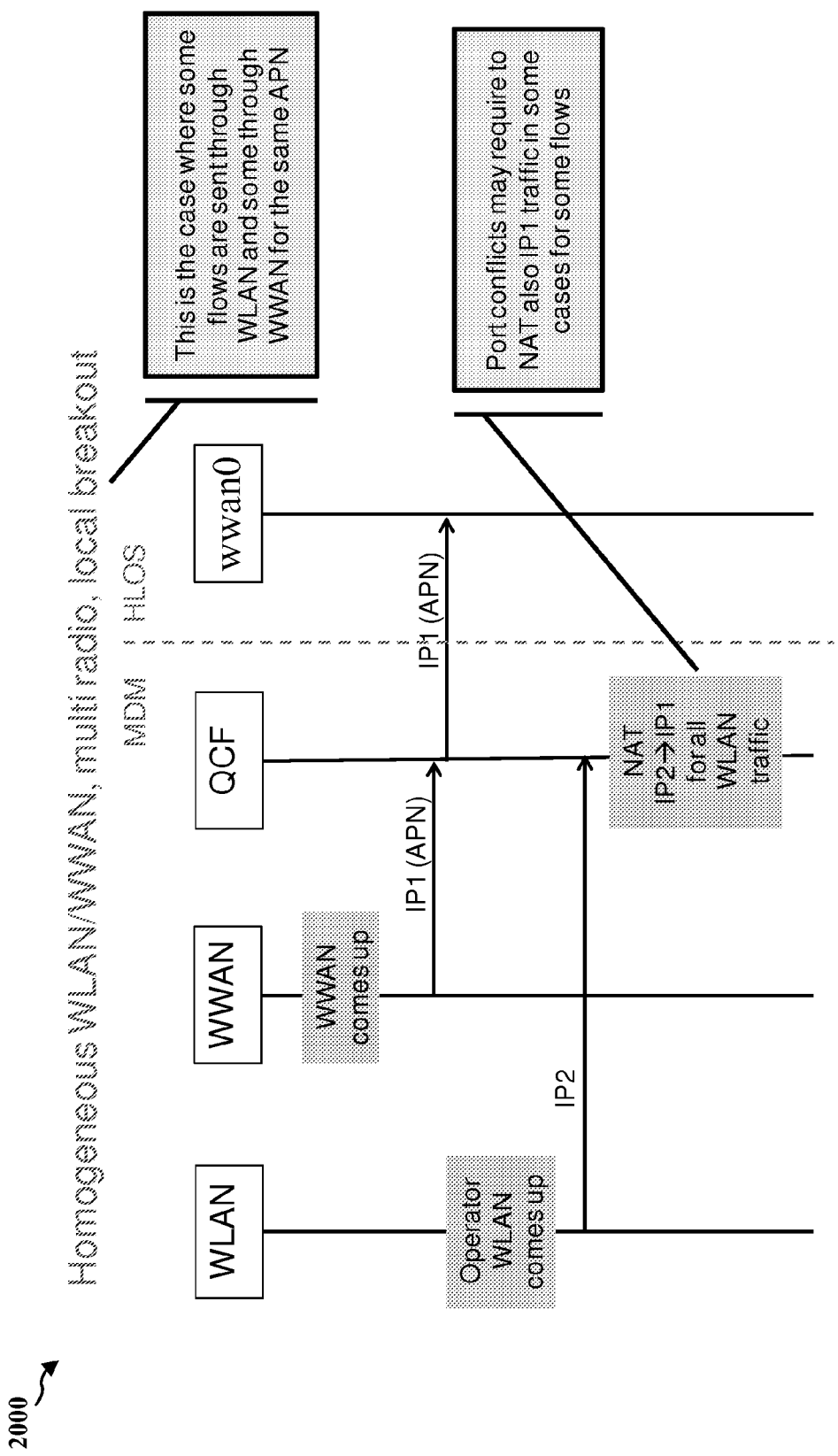
FIG. 20 is a diagram illustrating a call flow.

FIG. 20 is a diagram 2000 illustrating a call flow. Referring to FIG. 20, a homogeneous WLAN/WWAN, multiple radios, and no local breakout are depicted.

Figure 21:
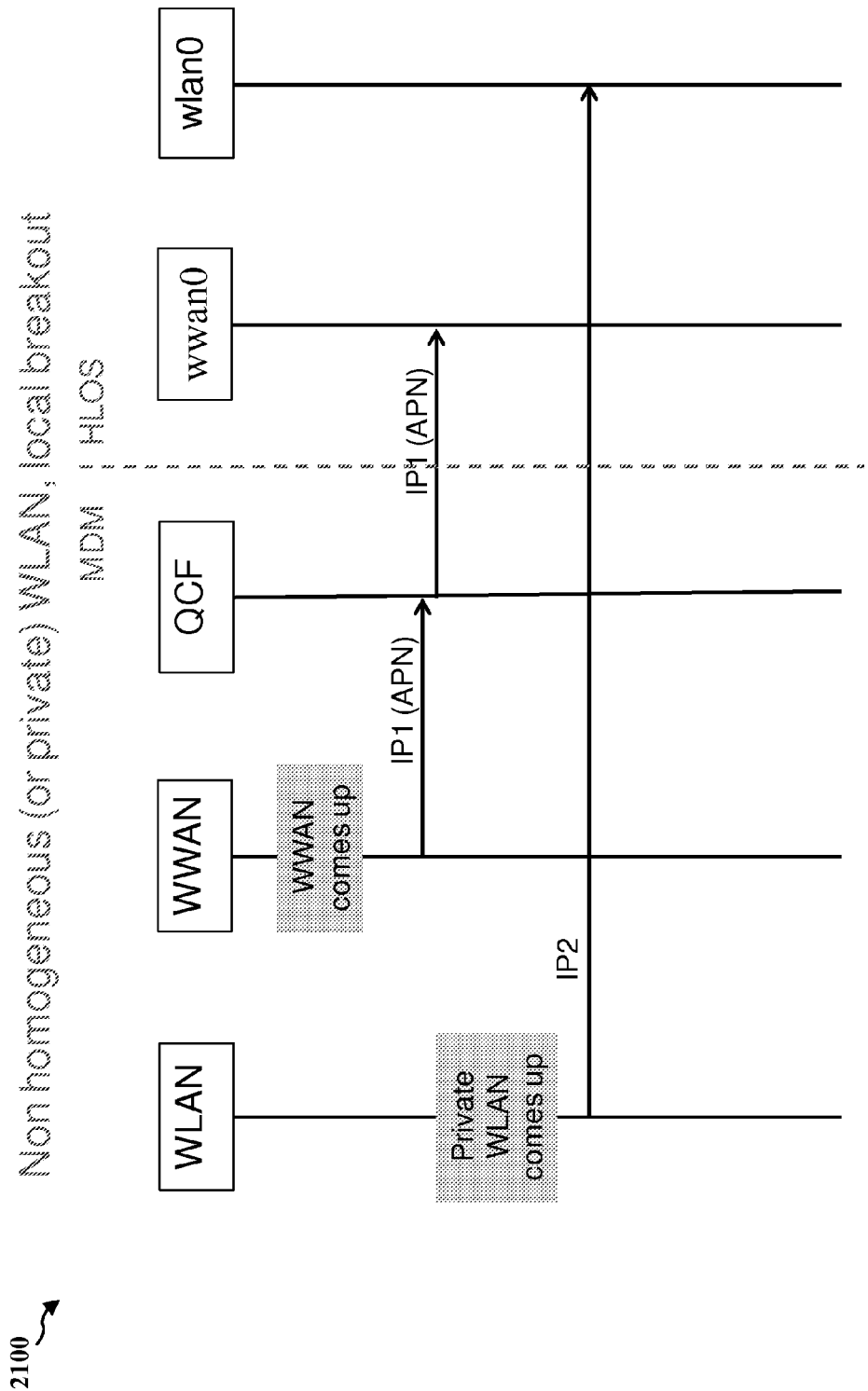
FIG. 21 is a diagram illustrating a call flow.

FIG. 21 is a diagram 2100 illustrating a call flow. Referring to FIG. 21, a non-homogeneous (or private) WLAN and a local breakout are depicted.

Figure 22:
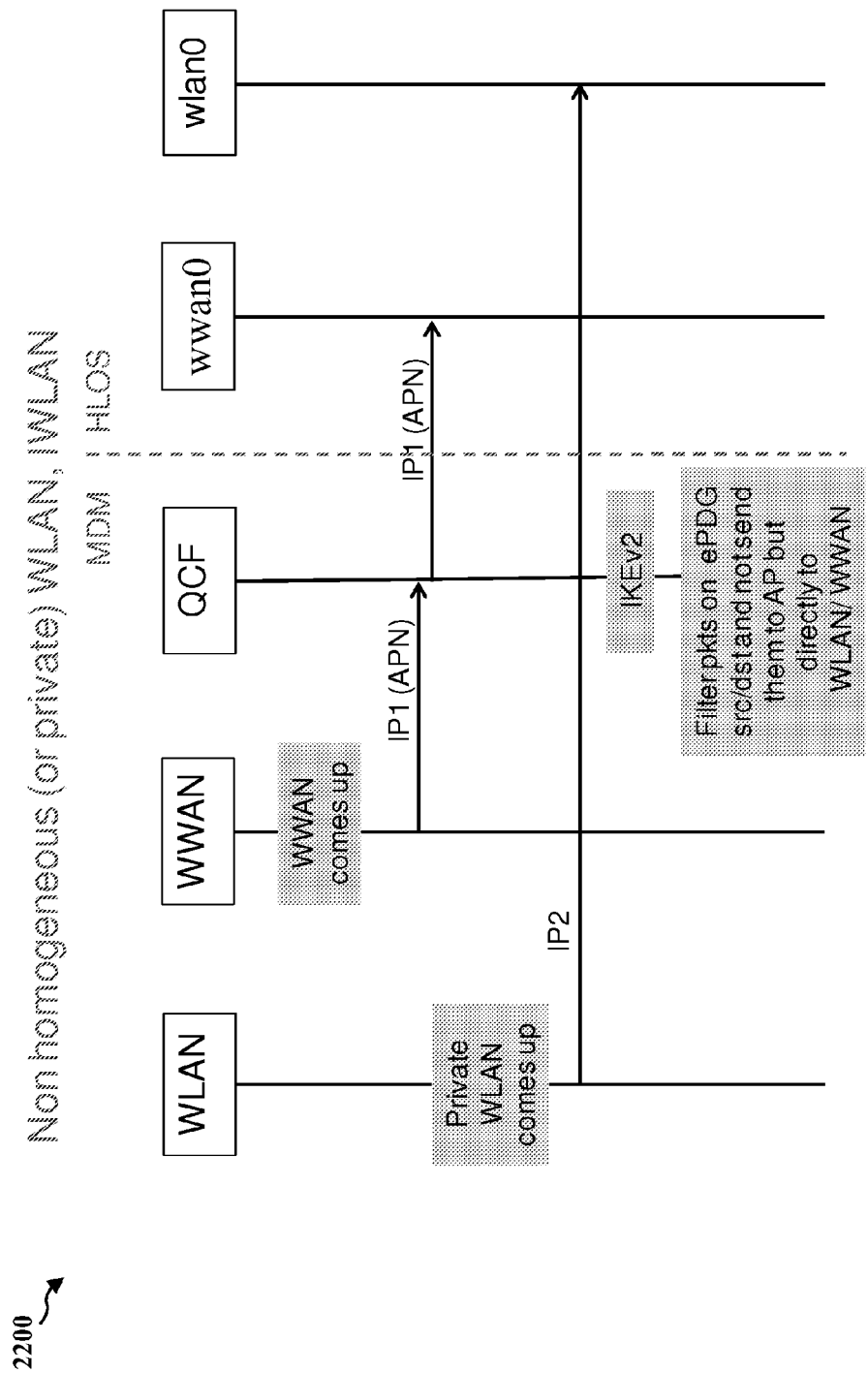
FIG. 22 is a diagram illustrating a call flow.

FIG. 22 is a diagram 2200 illustrating a call flow. Referring to FIG. 22, a non-homogeneous (or private) WLAN and an IWLAN are depicted.

Figure 23:
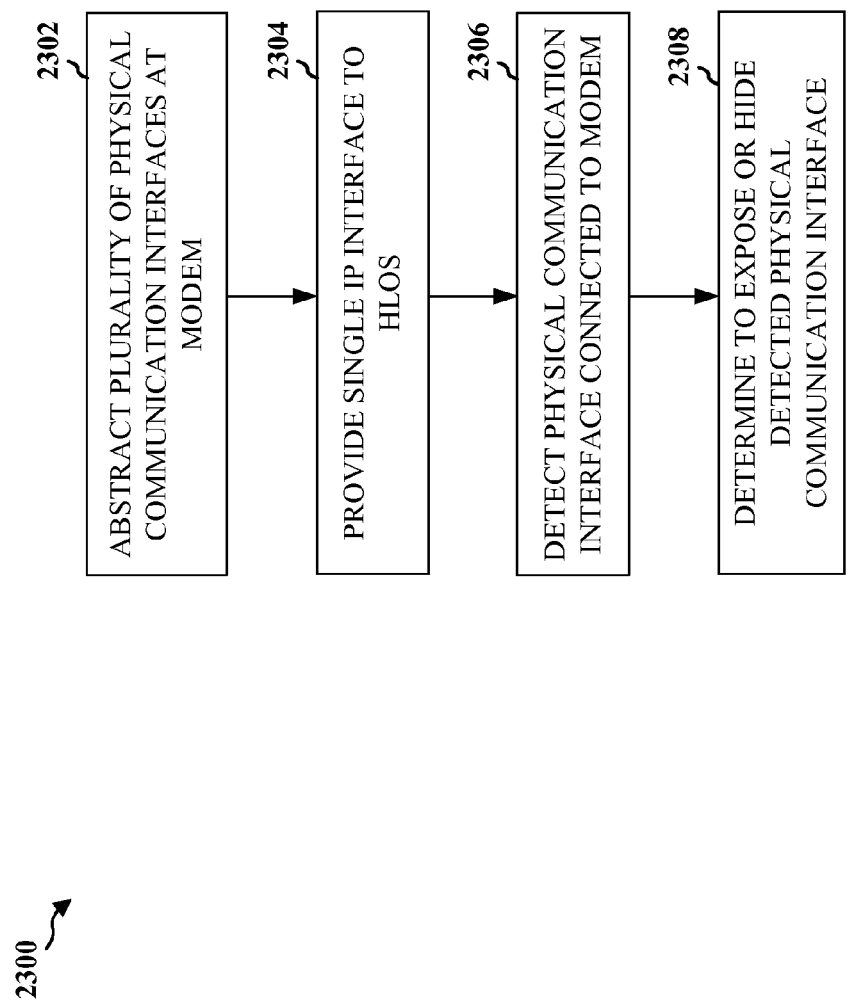
FIG. 23 is a flow chart of a method of managing a connection between a modem and an applications processor (AP).

FIG. 23 is a flow chart 2300 of a method of managing a connection between a modem and an applications processor (AP). The method may be performed by a device. At step 2302, the device abstracts or virtualizes a plurality of physical communication interfaces at the modem. At step 2304, the device provides a single Internet protocol (IP) interface representing the abstracted (virtualized) plurality of physical communication interfaces to a high level operating system (HLOS) at the AP.

At step 2306, the device detects a physical communication interface connected to the modem. And at step 2308, the device determines whether to expose the detected physical communication interface to the HLOS as a standalone abstracted (virtualized) physical communication interface, or hide the detected physical communication interface from the HLOS as part of an existing abstracted (virtualized) physical communication interface. The determination may be based on a condition set by operator policy. The modem manages communication over the detected communication interface hidden from the HLOS. The HLOS manages communication over the detected communication interface exposed to the HLOS.

The detected physical communication interface is determined to be hidden from the HLOS when the communication interface is a carrier interface, an operator wireless local area network (WLAN) interface, includes a service set identifier (SSID) of a pre-configured list, or supports automatic discovery and selection mechanisms specified by Wi-Fi Alliance (WFA) Hotspot 2.0. The detected physical communication interface is determined to be exposed to the HLOS when the communication interface is at least one of: a non-carrier interface, an interface unknown to the modem, a private wireless local area network (WLAN) interface, a non-operator WLAN interface, or a corporate WLAN interface.

Figure 24:
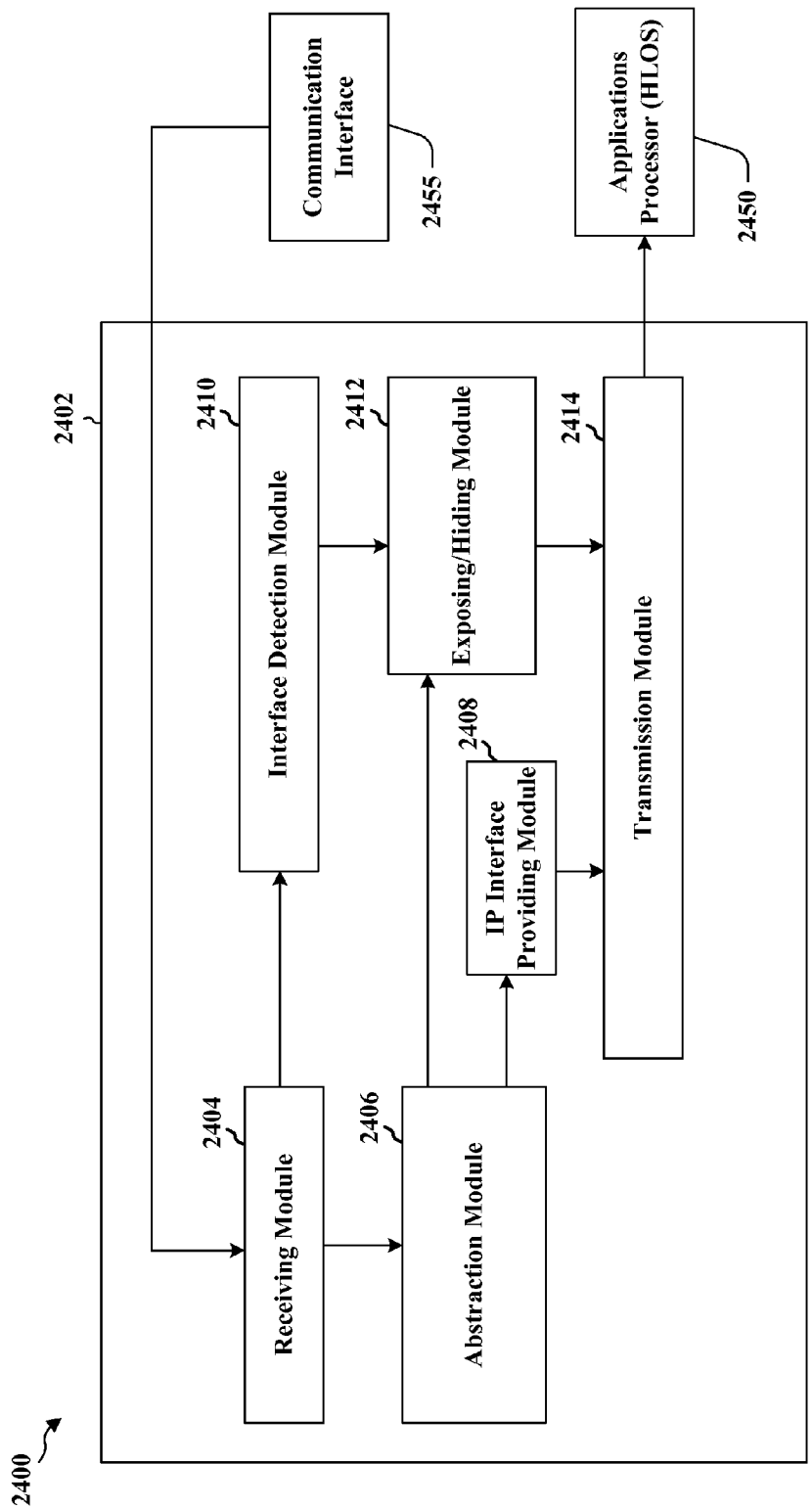
FIG. 24 is a conceptual data flow diagram illustrating the data flow between different modules/means/components in an exemplary apparatus.

FIG. 24 is a conceptual data flow diagram 2400 illustrating the data flow between different modules/means/components in an exemplary apparatus 2402. The apparatus may be a modem. The apparatus includes a receiving module 2404, an abstraction module 2406, an IP interface providing module 2408, an interface detection module 2410, an exposing/hiding module 2412, and a transmission module 2414.

The abstraction module 2406 abstracts or virtualizes a plurality of physical communication interfaces. The IP interface providing module 2408 provides a single Internet protocol (IP) interface representing the abstracted (virtualized) plurality of physical communication interfaces to a high level operating system (HLOS) at the applications processor (AP) 2450.

The interface detection module 2410 detects a physical communication interface 2455 connected to the modem. The exposing/hiding module 2412 determines whether to expose the detected physical communication interface to the HLOS as a standalone abstracted (virtualized) physical communication interface, or hide the detected physical communication interface from the HLOS as part of an existing abstracted (virtualized) physical communication interface. The determination may be based on a condition set by operator policy. The modem manages communication over the detected communication interface hidden from the HLOS. The HLOS manages communication over the detected communication interface exposed to the HLOS.

The detected physical communication interface is determined to be hidden from the HLOS when the communication interface is a carrier interface, an operator wireless local area network (WLAN) interface, includes a service set identifier (SSID) of a pre-configured list, or supports automatic discovery and selection mechanisms specified by Wi-Fi Alliance (WFA) Hotspot 2.0. The detected physical communication interface is determined to be exposed to the HLOS when the communication interface is at least one of: a non-carrier interface, an interface unknown to the modem, a private wireless local area network (WLAN) interface, a non-operator WLAN interface, or a corporate WLAN interface.

The apparatus may include additional modules that perform each of the steps of the algorithm in the aforementioned flow chart of FIG. 23. As such, each step in the aforementioned flow chart of FIG. 23 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 25:
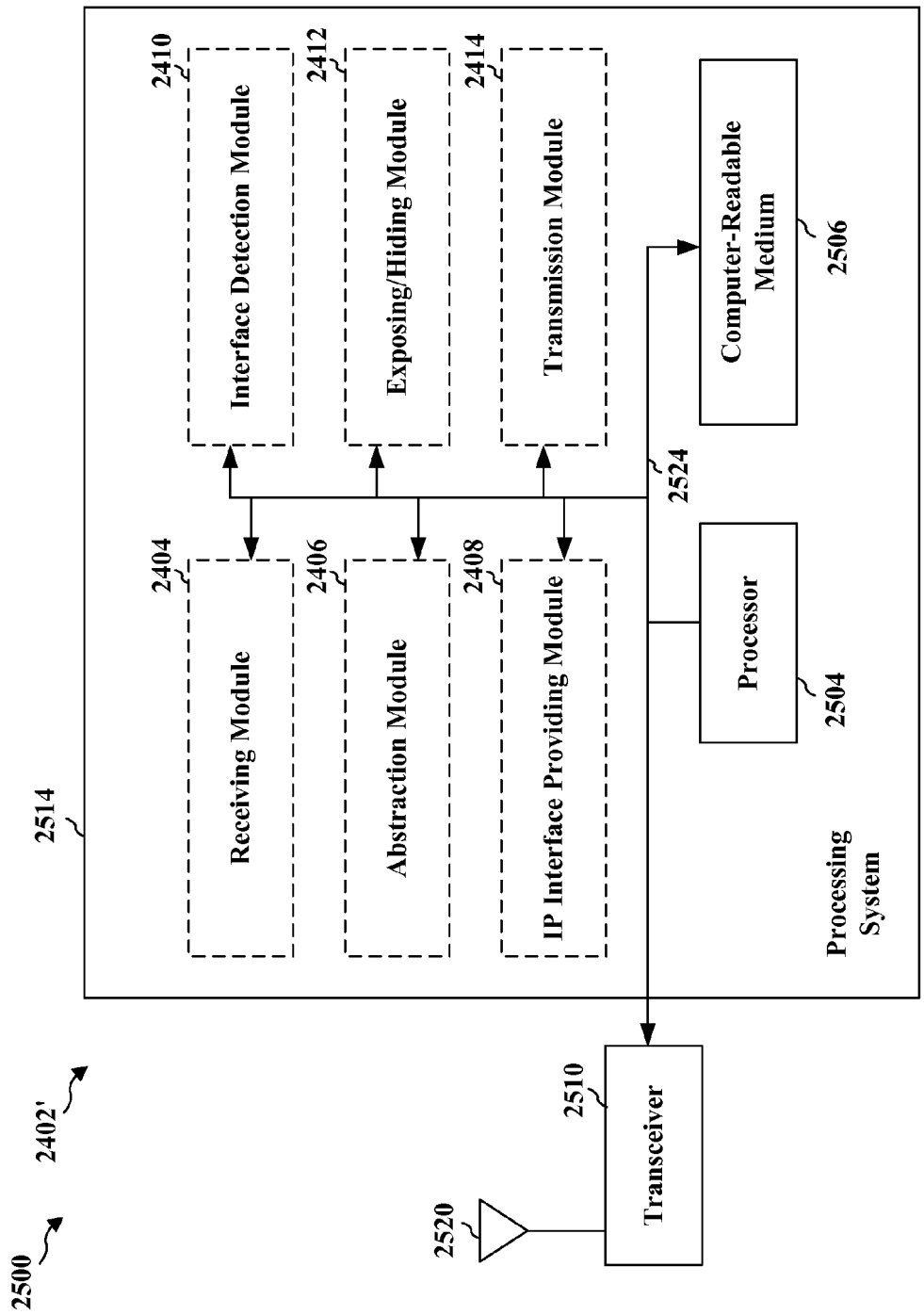
FIG. 25 is a diagram illustrating an example of a hardware implementation for an apparatus employing a processing system.

FIG. 25 is a diagram 2500 illustrating an example of a hardware implementation for an apparatus 2402' employing a processing system 2514. The processing system 2514 may be implemented with a bus architecture, represented generally by the bus 2524. The bus 2524 may include any number of interconnecting buses and bridges depending on the specific application of the processing system 2514 and the overall design constraints. The bus 2524 links together various circuits including one or more processors and/or hardware modules, represented by the processor 2504, the modules 2404, 2406, 2408, 2410, 2412, 2414, and the computer-readable medium 2506. The bus 2524 may also link various other circuits such as timing sources, peripherals, voltage regulators, and power management circuits, which are well known in the art, and therefore, will not be described any further.

The processing system 2514 may be coupled to a transceiver 2510. The transceiver 2510 is coupled to one or more antennas 2520. The transceiver 2510 provides a means for communicating with various other apparatus over a transmission medium. The processing system 2514 includes a processor 2504 coupled to a computer-readable medium 2506. The processor 2504 is responsible for general processing, including the execution of software stored on the computer-readable medium 2506. The software, when executed by the processor 2504, causes the processing system 2514 to perform the various functions described supra for any particular apparatus. The computer-readable medium 2506 may also be used for storing data that is manipulated by the processor 2504 when executing software. The processing system further includes at least one of the modules 2404, 2406, 2408, 2410, 2412, and 2414. The modules may be software modules running in the processor 2504, resident/stored in the computer readable medium 2506, one or more hardware modules coupled to the processor 2504, or some combination thereof. The processing system 2514 may be a component of the UE 1150 and may include the memory 1160 and/or at least one of the TX processor 1168, the RX processor 1156, and the controller/processor 1159.

In one configuration, the apparatus 2402/2402' for wireless communication includes means for abstracting or virtualizing a plurality of physical communication interfaces at the modem, means for providing a single Internet protocol (IP) interface representing the abstracted (virtualized) plurality of physical communication interfaces to a high level operating system (HLOS) at the AP, means for detecting a physical communication interface connected to the modem, and means for determining, based on a condition, whether to expose the detected physical communication interface to the HLOS as a standalone abstracted (virtualized) physical communication interface, or hide the detected physical communication interface from the HLOS as part of an existing abstracted (virtualized) physical communication interface.

The aforementioned means may be one or more of the aforementioned modules of the apparatus 2402 and/or the processing system 2514 of the apparatus 2402' configured to perform the functions recited by the aforementioned means. As described supra, the processing system 2514 may include the TX Processor 1168, the RX Processor 1156, and the controller/processor 1159. As such, in one configuration, the aforementioned means may be the TX Processor 1168, the RX Processor 1156, and the controller/processor 1159 configured to perform the functions recited by the aforementioned means.

The present disclosure further provides for a modem-centric architecture for wireless local area network (WLAN) offload operations. In an aspect, architecture is provided that enables WLAN offload procedures entirely in a modem under the supervision and control of a high level operation system (HLOS). The architecture may include two independent supplicants/drivers. This allows a WLAN driver/chipset to take independent commands to scan from two sources. This further allows optimizations related to caching the results of the scan. The WLAN driver/chipset may arbitrate requests and preempt one of two concurrent requests.

The present disclosure also provides for: 1) a definition of an application programming interface (API) from the HLOS to the framework used by the HLOS to configure the framework and indicate which WLAN the framework should manage; 2) a capability of the framework to automatically identify carrier Wi-Fi deployments; and 3) a capability of duplicating an IP context in the HLOS and modem so that the modem can operate on WLANs managed by the HLOS, e.g., for I-WLAN purposes.

Cellular network operators deploy wireless local area network (WLAN) hotspots in order to use WLAN unlicensed spectrum to increase capacity of their network. Numerous access points may be deployed utilizing free spectrum (e.g., 100,000 access points may be deployed). Thus, devices should connect to these access points to offload data traffic from the cellular network. Currently, WLAN deployments are independent from operator cellular deployments. Moreover, only some deployments involve Extensible Authentication Protocol Method for Authentication and Key Agreement (EAP-AKA) authentication. Therefore, control of WLAN offload is left to the UE/HLOS.

However, it may be difficult for a device to seamlessly transition from the cellular network to a WLAN because cellular network chipsets are different from WLAN chipsets within the device. For example, a cellular network chipset may be exposed to the applications processor (operating system) in a different manner from a WLAN chipset. The device operating system may consider a cellular network pipe completely different pipe from a WLAN pipe. Accordingly, when an operator wishes to introduce a new feature with respect to WLAN offload, which by nature affects both the WLAN chipset and the cellular network chipset, separate codes need to be written for the WLAN chipset, the cellular network chipset, and the applications processor. Therefore, what is needed is an ecosystem that provides a more flexible architecture for easing an operator's ability to provide WLAN offload solutions. An operator may be interested in: 1) Boosting capacity by increasing the attach rate to operator deployed WLAN hotspots; and 2) Dynamic load sharing between licensed and unlicensed spectrum (e.g., based on load on each RAT). The second interest is desirable when most devices are able to find and connect to operator WLANs. An operator-owned WLAN may become seamless extensions of licensed spectrum. The present disclosure provides a device architecture for enabling and leveraging the above scenarios to gain control of overall connectivity management.

In an aspect, a WLAN interface at the modem should not be directly connected to the HLOS at the applications processor (AP). Rather, the WLAN interface should be more connected to the modem, or some entity in the modem, such that communication over the WLAN interface is controlled by the modem. For example, the modem may decide whether to send data traffic over a cellular network interface or over the WLAN interface. Thus, WLAN offload solutions may be confined to the modem and do not need to be exposed to the HLOS.

The modem may provide to the HLOS a single Internet protocol interface representing a number of abstracted physical communication interfaces (e.g., WLAN, LTE, 3G, etc.). The abstracted physical communication interfaces may be hidden from the HLOS. Moreover, the HLOS may not even need to know that it is connected to the WLAN, LTE, or 3G interfaces.

In an aspect, the abstraction of the physical communication interfaces should be done in a backward compatible manner. For example, an operating system (HLOS) and/or user may not care most of the time whether it is connected to a carrier network via a carrier LTE interface or a carrier WLAN interface because it will be billed (charged) in the same manner. However, the user will care if it is connected to its own WLAN interface (e.g., home Wi-Fi or corporate Wi-Fi). Thus, when the modem detects such an interface, the modem should expose the interface to the HLOS.

In an aspect, the WLAN interface may be exposed to the HLOS depending on a type of WLAN a device is connected to. The modem may include a filtering element to detect the type of WLAN. If the detected WLAN is a carrier WLAN, or if the WLAN has certain characteristics (e.g., includes service set identifier (SSID) in a preconfigured list), the modem does not expose the corresponding WLAN interface to the HLOS. As such, the modem internally manages communication over the WLAN (e.g., decision to send or not send traffic via WLAN, connect or not connect to WLAN, etc.).

If the modem detects a WLAN that it is unfamiliar with or a private WLAN, then the modem exposes the corresponding WLAN interface to the HLOS. As such, the HLOS manages communication over the WLAN, and therefore backward compatibility is maintained.

In general, the modem may provide a single IP interface representing a number of abstracted physical communication interfaces to the HLOS, wherein the abstracted physical communication interfaces are hidden from the HLOS. However, this is done in a backward compatible way to account for when the HLOS or user wishes to know that it is connected to its own WLAN interface, for example. Whether the WLAN interface is exposed to the HLOS may be dependent on a policy set by the operator. For example, when the device is connected to the operator's WLAN, the modem does not expose the WLAN interface to the HLOS, and when the device is connected to a WLAN interface other than the operator's WLAN interface, the modem exposes the WLAN interface to the HLOS.

In an aspect, a modem-centric architecture for WLAN offload operations is provided such that the HLOS can discover and connect to any WLAN using current procedures. Here, the API is unmodified for these procedures. In addition, the HLOS may instruct the modem to autonomously connect to specific WLANs (e.g., carrier WLANs). This may me done via a new API or via configuration.

A connectivity framework (CF or QCF in the figures) may discover and connect to any WLAN indicated in an HLOS policy and an operator policy. For these WLAN connections, the connectivity framework controls routing between a wireless wide area network (WWAN) and WLANs. Moreover, HLOS connection requests may have priority over connectivity framework connection requests.

Figure 26:
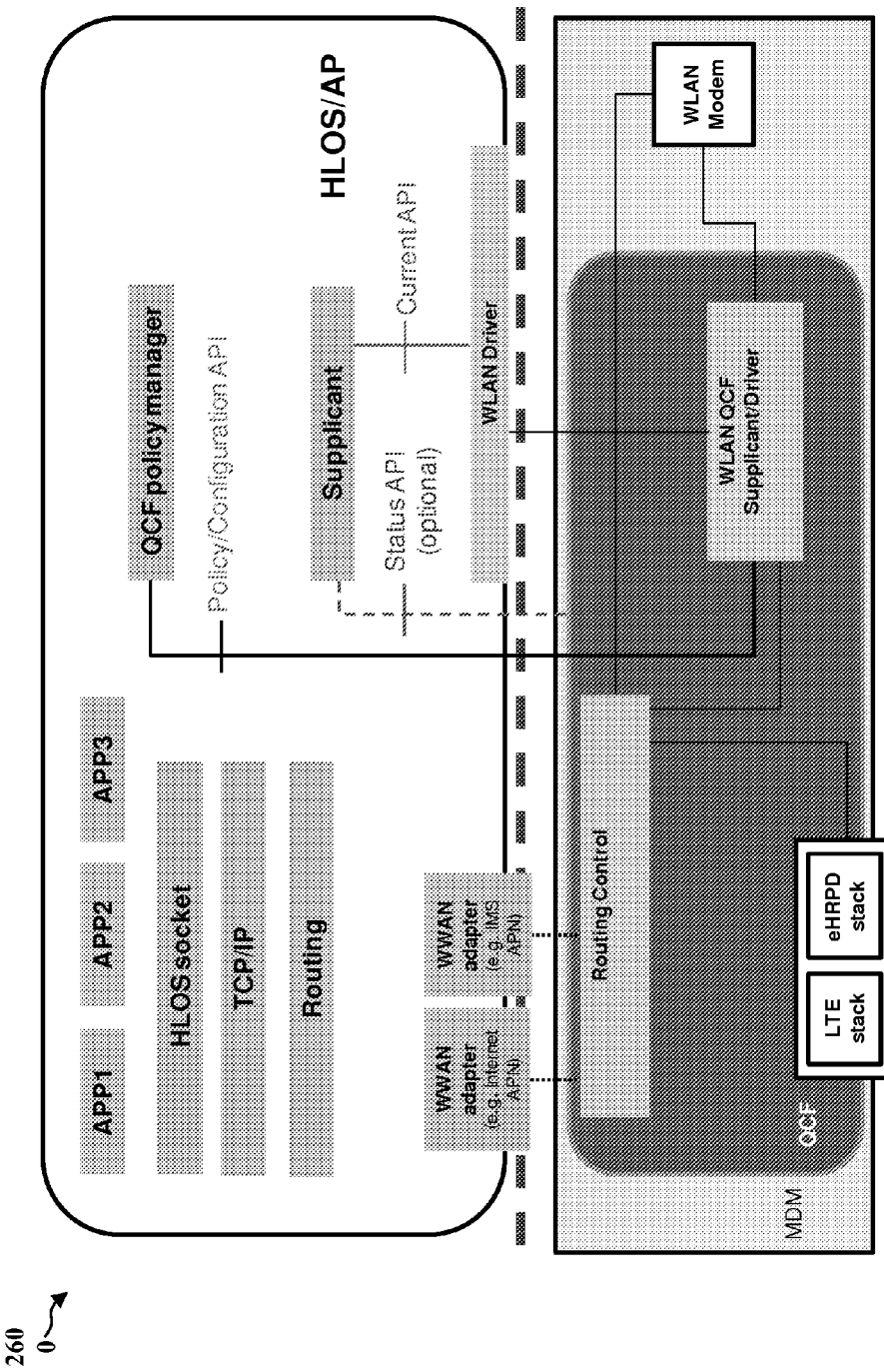
FIG. 26 is a diagram illustrating a high level connectivity framework architecture.

FIG. 26 is a diagram 2600 illustrating a high level connectivity framework architecture. Referring to FIG. 5, a control path is depicted.

Figure 27:
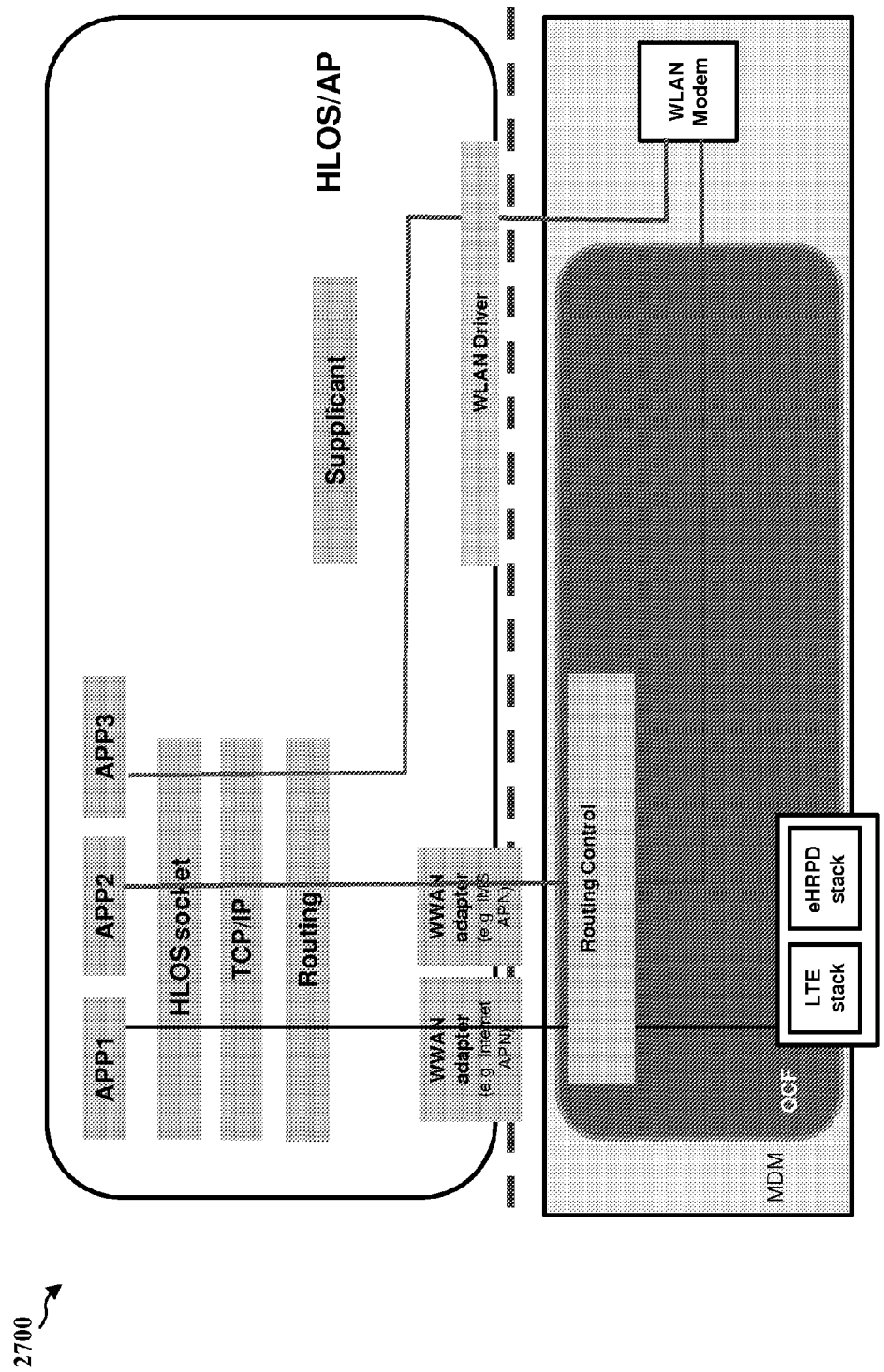
FIG. 27 is a diagram illustrating a high level connectivity framework architecture.

FIG. 27 is a diagram 2700 illustrating a high level connectivity framework architecture. Referring to FIG. 27, a data path is depicted.

In an aspect, a modem-centric framework is provided that exposes a communication interface at a modem to a high level operating system (HLOS) at an applications processor (AP) independent of the physical interface. The architecture may hide all radio access technology (RAT) interfaces, including a WLAN interface, from the HLOS, applications, and/or a user. The WLAN interface may be treated like a RAT interface. The architecture may implement carrier-grade WLAN integration into a cellular network. Moreover, the architecture may be implemented not only by a connectivity engine in the modem, but also by software partitioning between the modem, WLAN interface, and the HLOS.

In an aspect, a same physical interface will have different connectivity properties in a different configuration. For example, in a wireless wide area network (WWAN) access point name (APN) concept, the WWAN is actually exposed as a set of network interfaces, one per APN. In another example, Wi-Fi can be used as: 1) a WWAN replacement (Internet APN); 2) a LAN (home network); a PAN (Wi-Fi Direct); or 4) a WWAN replacement (for other APNs with I-WLAN and similar solutions).

Each of these connectivity properties have different characteristics that should be reflected in the interface description: 1) Connection to different "networks"; 2) A file share that is advertised from a computer on a trusted home LAN interface should not be accessible when connecting to a hotspot or when a game is played on a Wi-Fi Direct connection; and 3) Protocols such as UPnP and Bonjour that are intended to operate on the LAN interface should not be used at a hotspot and should only be used in a PAN link if required by the application e.g., DLNA or AirPlay.

Applications are interested in connectivity properties rather than physical connectivity: 1) Reachability of destination; and 2) One-to-one mapping between interface type and respective connectivity properties is breaking.

Interface abstraction is the abstraction of interfaces which have the same connectivity properties. Homogeneous interfaces are interfaces with the same connectivity properties: destinations reachable, services offered, billing. Users/applications/HLOS do not care which physical layer (PHY) is used within a given virtual interface as long as underlying interfaces are homogeneous: applications do not break, user is not charged more.

The APN concept can be used to illustrate the model: 1) "Internet APN" provides access to Internet destinations (via WWAN or operator hotspots); 2) "IMS APN" provides access to IMS destinations (via WWAN or operator hotspots); 3) "PAN APN" provides access to proximity peers (via Wi-Fi Direct, LTE-Direct/Flashlinq); and 4) "Connected Home APN" provides access to a user's home network (via WWAN Femto LIPA connection or home WLAN). The model previously discussed (abstraction only for operator owned WLAN) is a simplification of the above for operator-defined APNs (Internet, IMS).

Regarding HLOS functionality and API under the modem-centric architecture of the present disclosure, for standard procedures (WLAN scanning, association, authentication), there is no change to the API between the HLOS supplicant and driver. The HLOS WLAN driver exposes the same API now exposed now by the driver.

Moreover, the HLOS has a new API to indicate to the connectivity framework which WLANs it can connect to. In one option, pre-configured SSIDs may be provided. In a second option, a carrier WLAN may be auto-discovered. In a third option, a detailed description of WLAN characteristics may be provided. The HLOS also has a new optional API which can be used to provide to the HLOS supplicant a status of the connectivity framework supplicant and vice versa.

Regarding the connectivity framework supplicant and WLAN driver under the modem-centric architecture of the present disclosure, results of any scanning procedure are provided to both supplicants. Furthermore, an association request from the HLOS takes precedence over an association request from the connectivity framework.

Regarding interface abstraction under the modem-centric architecture of the present disclosure, when the connectivity framework connects to a WLAN, the HLOS WLAN IP interface is in a DOWN state. The connectivity framework controls the routing between the WWAN and these WLANs. Moreover, the connectivity framework can provide the WLAN as a current radio access technology (RAT) for an adapter of a given APN. The principles described above ensure the connectivity framework implements all the technologies required by carrier Wi-Fi under the control/supervision of the HLOS.

Under a connectivity framework API and policy, the connectivity framework is allowed to connect to WLAN networks based on policy from the HLOS. For example, the connectivity framework may never connect to the WLAN, i.e., there is no running connectivity framework CM/Supplicant. In another example, the connectivity framework may connect to a subset of WLANs. In a further example, the connectivity framework may connect to all WLANs, i.e., there is no running HLOS CM/Supplicant.

Moreover, under the connectivity framework API and policy, the HLOS has an API to indicate to the connectivity framework which WLANs it can connect to. Options include: 1) Pre-configured SSIDs; 2) Auto-discovery of carrier WLAN; and 3) Detailed description of WLAN characteristics For auto-discovery mechanisms, a carrier WLAN can be identified as follows: 1) EAP-AKA support discovered via Hotspot 2.0; 2) Support of specific values in HS2.0 ANQP fields (e.g., 3GPP Operator Container); and 3) SSID present in ANDSF policy.

Figure 28:
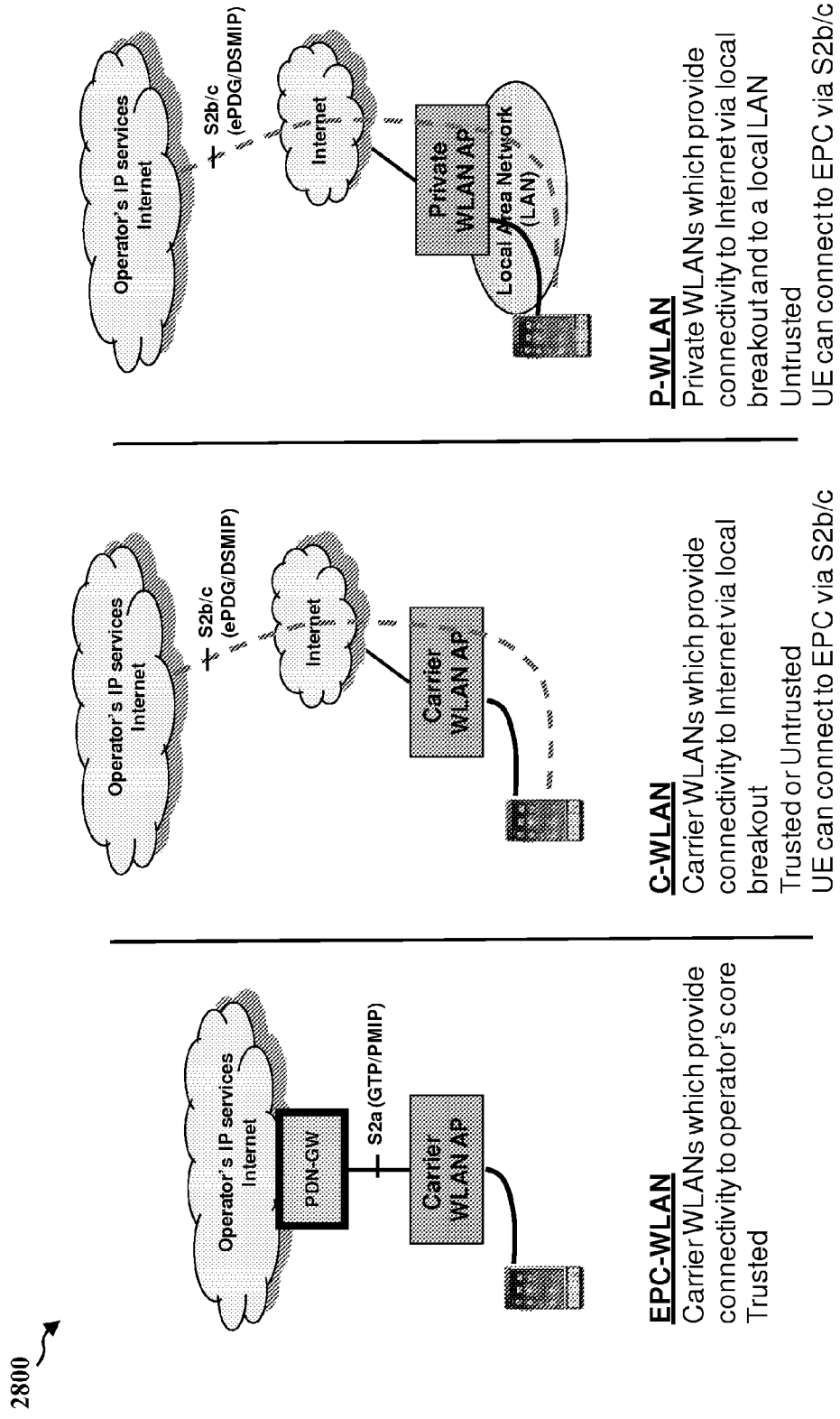
FIG. 28 is a diagram illustrating WLAN categories.
Figure 29:
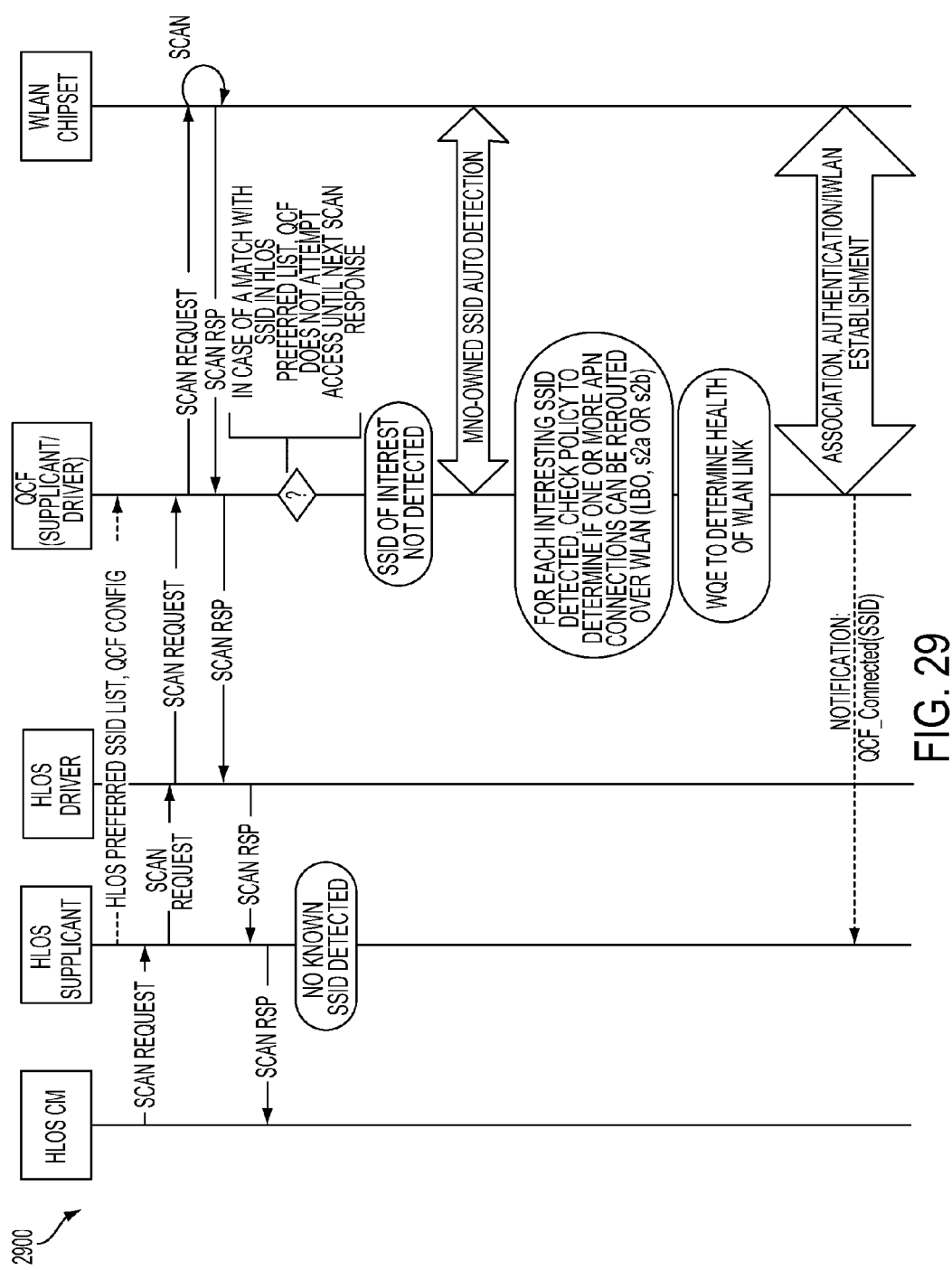
FIGS. 29-32 are diagrams illustrating call flows in accordance with various aspects of the present disclosure.
Figure 30:
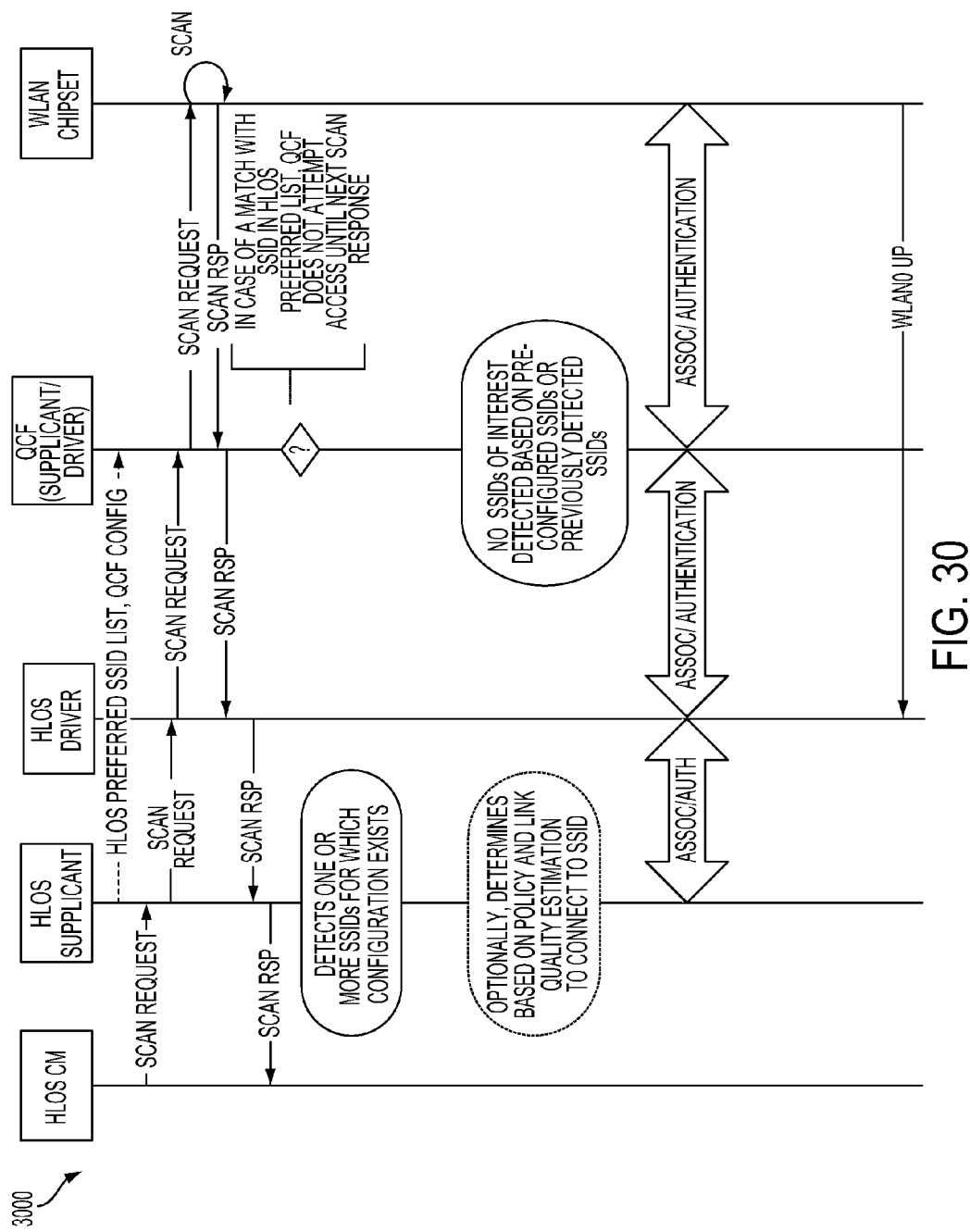
Figure 31:
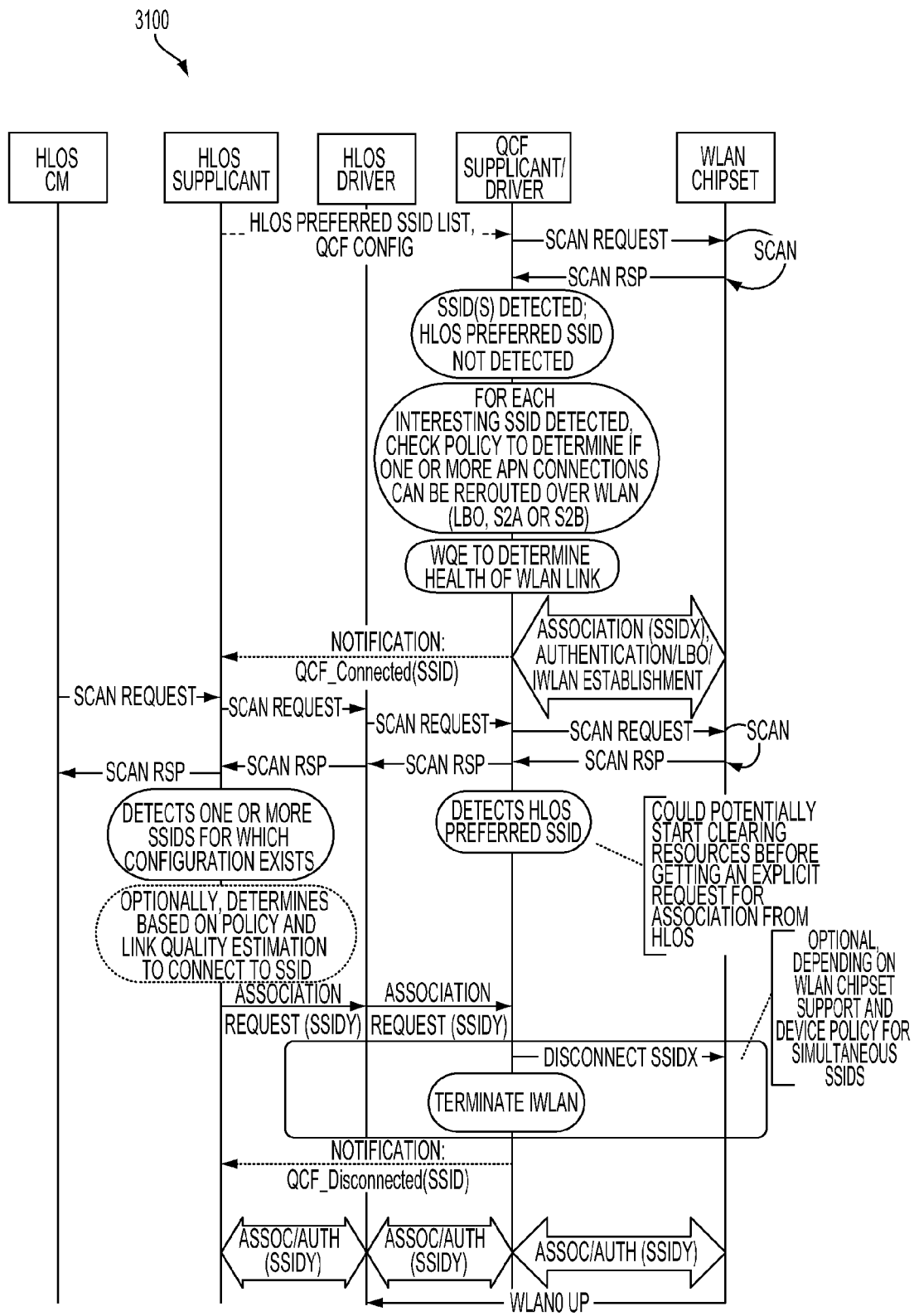
Figure 32:
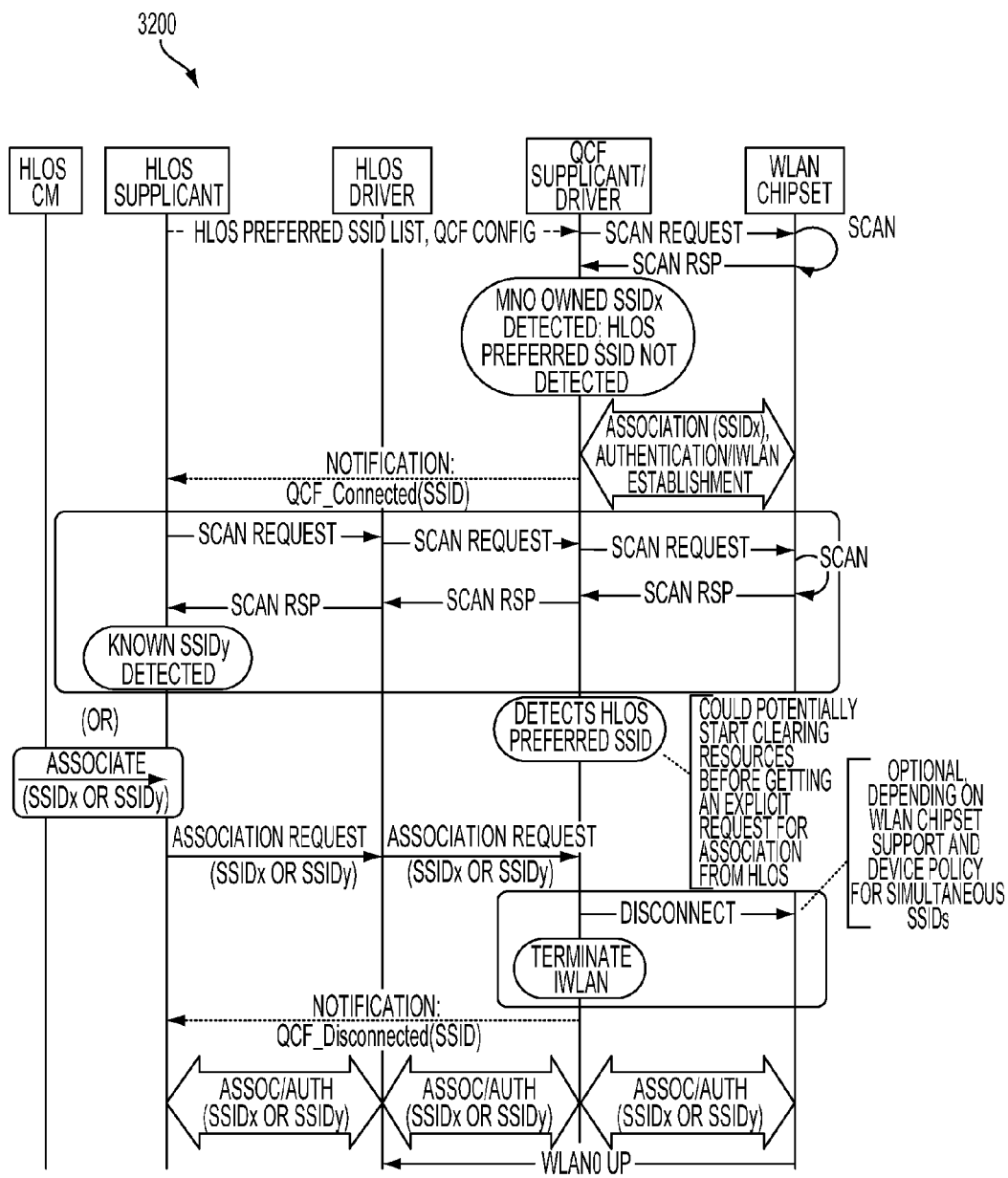

FIG. 28 is a diagram 2800 illustrating WLAN categories. In an aspect, an EPC-WLAN and a C-WLAN may be considered as just another radio access technology (RAT). Currently, applications may "prefer" WLAN for two possible reasons. First, services available on WLAN are not available on an Internet APN (WWAN). For example, these services may include local (LAN) music streaming, local (LAN) content, and some Internet services. Second, WLAN may provide inexpensive connectivity, and therefore, more data can be communicated.

WWAN, EPC-WLAN and C-WLAN are homogeneous interfaces. Homogeneous interfaces are interfaces that have the same connectivity properties: e.g., destinations are reachable, similar services offered, billing is similar, etc. If billing is not homogeneous, it may be assumed that a user has the option of delegating operator connection selection to a device. For example the user may enable "Select always best operator connection" in a settings menu of the device. For C-WLAN, Internet APN is provided via local breakout, but Internet Connectivity is still provided by the operator.

The connectivity framework can hide from HLOS interfaces which are homogeneous. The HLOS can still overwrite connectivity framework decisions. The HLOS can still be notified about connectivity properties.

In an example of a first use case, a connectivity framework (CF)-controlled connection to EPC-WLAN with a single packet data network (PDN) may be provided. A UE is connected to one PDN over LTE. In this context, it does not matter which APN. The CF scans, discovers, associates, authenticates with an EPC-WLAN. The CF identifies the EPC-WLAN based policy (e.g., ANDSF, Hotspot 2.0, others).

Moreover, the CF decides to route the PDN connection over the EPC-WLAN. The decision is based on ANDSF policies and estimation of the quality of the EPC-WLAN connection. Depending on the solution (Rel-11, Rel-11+, Rel-12), this may imply a change of IP address.

The entire procedure of the first use case is hidden from the HLOS. The HLOS does not know the UE is connected to the WLAN. The CF may provide an indication that it is connected to a carrier grade WLAN for user interface (UI) purposes, but there is no WLAN adapter exposed. The HLOS does not know traffic is routed over the WLAN. The HLOS may experience a change of IP address for a respective WWAN adapter. The HLOS may "see" the existence of EPC-WLAN APs in scan results or this may be hidden by the driver/chipset.

In an example of a second use case, a CF-controlled connection to EPC-WLAN with multiple PDNs may be provided. The UE is connected to multiple PDNs over LTE. IMS and Internet APNs are assumed for the sake of description. The CF scans, discovers, associates, and authenticates with an EPC-WLAN. The CF identifies the EPC-WLAN based policy (e.g. ANDSF, Hotspot 2.0, others).

Moreover, the CF decides to route one or both PDN connections over the EPC-WLAN. The decision is based on ANDSF policies and estimation of the quality of the EPC-WLAN connection. Depending on the solution (Rel-11, Rel-11+, Rel-12), this may imply a change of IP address. If the EPC-WLAN is a SaMOG Rel-11 WLAN, only one PDN can be moved (decided by the network). The UE is configured on which PDN is moved.

The entire procedure of the second use case is hidden from the HLOS. The HLOS does not know the UE is connected to the WLAN. The CF may provide an indication that it is connected to a carrier grade WLAN for UI purposes, but there is no WLAN adapter exposed. The HLOS does not know traffic is routed over the WLAN. The HLOS may experience a change of IP address for the respective WWAN adapter. The HLOS may "see" the existence of EPC-WLAN APs in scan results or this may be hidden by the driver/chipset.

In an example of a third use case, a CF-controlled connection to C-WLAN with Internet PDN may be provided. The UE is connected to the Internet PDN over LTE. The CF scans, discovers, associates, and authenticates with an C-WLAN. The CF identifies the C-WLAN based policy (e.g. ANDSF, Hotspot 2.0, others).

The CF decides to route Internet traffic over the C-WLAN. The decision is based on ANDSF policies and estimation of the quality of the EPC-WLAN connection.

The entire procedure of the third use case is hidden from the HLOS. The HLOS does not know the UE is connected to the WLAN. The CF may provide an indication that it is connected to a carrier grade WLAN for UI purpose but there is no WLAN adapter exposed. The HLOS does not know traffic is routed over the WLAN. The HLOS will experience a change of IP address for the respective WWAN adapter. The HLOS may "see" the existence of EPC-WLAN APs in scan results or this may be hidden by the driver/chipset.

In an example of a fourth use case, a CF-controlled connection to C-WLAN with multiple PDNs may be provided. The UE is connected to multiple PDNs over LTE. Internet and IMS APNs are assumed for the sake of description. The CF scans, discovers, associates, and authenticates with a C-WLAN. The CF identifies the C-WLAN based policy (e.g. ANDSF, Hotspot 2.0, others).

The QCF decides to route Internet traffic and optionally the IMS APN over the C-WLAN. The decision is based on ANDSF policies and estimation of the quality of the EPC-WLAN connection. For the IMS APN, the UE will perform additional procedures to connect to the EPC. SaMOG Rel-12, ePDG, and DSMIP are considered.

The entire procedure of the fourth use case is hidden from the HLOS. The HLOS does not know the UE is connected to the WLAN. The CF may provide an indication that it is connected to a carrier grade WLAN for UI purpose but there is no WLAN adapter exposed. The HLOS does not know traffic is routed over the WLAN. The HLOS will experience a change of IP address for the Internet WWAN adapter (not for the IMS adapter). The HLOS may "see" the existence of EPC-WLAN APs in scan results or this may be hidden by the driver/chipset.

In an example of a fifth use case, an HLOS-controlled connection to P-WLAN may be provided. The UE is connected to Internet APN over LTE. The HLOS scans, discovers, associates, and authenticates with a P-WLAN. This may be triggered by a user manually or can be one of the preferred networks.

The HLOS decides to route Internet traffic over the P-WLAN. The HLOS may implement HLOS-specific mechanisms to make this decision ("CnE-like"). The CF has no decision role in this procedure. Depending on the software solution, the CF may have some functionality in the fifth use case, but the HLOS is the master.

In an example of a sixth use case, an HLOS-controlled connection to P-WLAN and additional PDN connections may be provided. The UE is connected to multiple PDNs over LTE. Internet and IMS APNs are assumed for the sake of description. The HLOS scans, discovers, associates, and authenticates with a P-WLAN. This may be triggered by the user manually or can be one of the preferred networks.

The HLOS decides to route Internet traffic over the P-WLAN. The HLOS may implement HLOS-specific mechanisms to make this decision ("CnE-like"). The CF has no decision role in selecting where Internet traffic is routed. Depending on the software solution, the CF may have some functionality in the sixth use case, but the HLOS is the master.

The device (UE) may decide to also route IMS APN via P-WLAN using ePDG. This should be a CF functionality. However, from a software architecture in this case we would go back to the Dime architecture where wlan0 is exposed to the HLOS and an ePDG connection goes over it.

In an example of a seventh use case, an HLOS-controlled connection to P-WLAN when the CF is camped on EPC-WLAN/C-WLAN may be provided. The UE is connected to EPC-WLAN (or C-WLAN), but the HLOS is not aware of this. The HLOS scans, discovers, associates, and authenticates with a P-WLAN. This can be triggered by the user manually or can be one of the preferred networks.

The HLOS decides to route Internet traffic over the P-WLAN. The HLOS may implement HLOS-specific mechanisms to make this decision ("CnE-like")

The CF/WLAN chipset will enforce the HLOS decision by disconnecting from the EPC-WLAN (or C-WLAN). Internet traffic will flow through the P-WLAN per the HLOS instructions. Additional PDNs which were active through the EPC-WLAN (e.g., via SaMOG Rel-12 solution) are either sent back over LTE or over P-WLAN/ePDG.

In an example of an eighth use case, an HLOS-controlled connection to C-WLAN when CF is camped on C-WLAN may be provided. The UE is connected to C-WLAN, but the HLOS is not aware of this. The HLOS scans and discovers C-WLAN. This can be triggered by the user manually or can be one of the preferred networks. The HLOS does not know that the CF is connected to the C-WLAN.

The HLOS decides to connect to the C-WLAN and route Internet traffic over it. Accordingly, the CF delegates control back to the HLOS. For example, the CF may disassociate from the C-WLAN and exposing it as a wlan0. Optimization may be thought of by re-using the same WLAN association (i.e., without re-associating). In an aspect, the eighth use case may not apply if the solution implies that the CF filters out some WLAN APs from scan results in the HLOS.

FIGS. 29 to 32 are diagrams 2900 to 3200, respectively, illustrating call flows in accordance with various aspects of the present disclosure.

Figure 33:
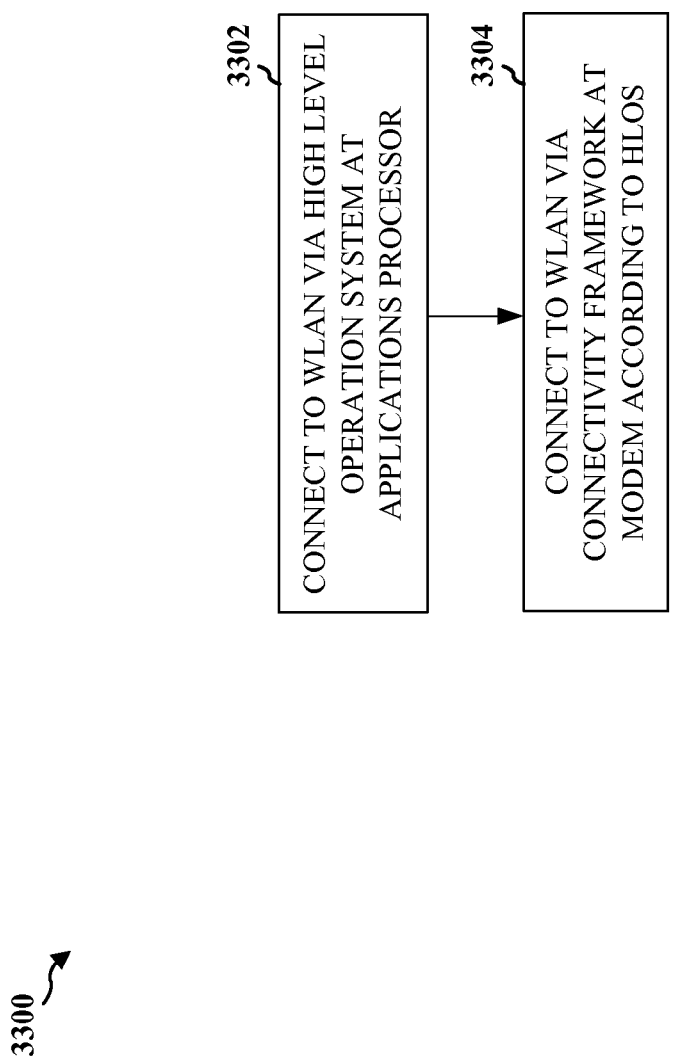
FIG. 33 is a flow chart of a method of managing a connection to at least one wireless local area network (WLAN) at user equipment (UE).

FIG. 33 is a flow chart 3300 of a method of managing a connection to at least one wireless local area network (WLAN) at user equipment (UE). The method may be performed by a UE. At step 3302, the UE connects to the at least one WLAN via a high level operating system (HLOS) at an applications processor (AP). At step 3304, the UE connects to the at least one WLAN via a connectivity framework (CF) at a modem according to the HLOS.

The HLOS may connect to the at least one WLAN via a first supplicant (or driver) at the AP. The CF may connect to the at least one WLAN via a second supplicant (or driver) at the modem. The HLOS may indicate to the CF to which WLANs the CF can connect.

The CF may be allowed to connect to WLANs based on a policy from the HLOS. For example, the WLANs the CF is allowed to connect to include WLANs having a service set identifier (SSID) in a preconfigured list, a carrier WLAN automatically discovered by the CF, and/or WLANs having characteristics described by the policy.

The CF may automatically discover a carrier WLAN. For example, the CF may automatically discover the carrier WLAN via Extensible Authentication Protocol Method for Authentication and Key Agreement (EAP-AKA) support discovered via Hotspot 2.0, support of specific values in HS2.0 ANQP fields, and/or a service set identifier (SSID) is present in ANDSF policy.

In an aspect, the UE is connected to a single packet data network. Hence, the CF may connect with an evolved packet core (EPC)-WLAN and rout a PDN connection over the EPC-WLAN. Here, the CF connecting with the EPC-WLAN and routing the PDN connection is hidden from the HLOS.

In another aspect, the UE is connected to a plurality of packet data networks (PDNs). Hence, the CF connects with an evolved packet core (EPC)-WLAN and routs at least one of a plurality of PDN connections over the EPC-WLAN. Here, the CF connecting with the EPC-WLAN and routing the at least one PDN connection is hidden from the HLOS.

In a further aspect, the UE is connected to an Internet packet data network (PDN). Hence, the CF connects with a carrier WLAN (C-WLAN) and routs the Internet traffic over the C-WLAN. Here, the CF connecting with the C-WLAN and routing the Internet traffic is hidden from the HLOS.

In another aspect, the UE is connected to a plurality of packet data networks (PDNs). Hence, the CF connects with a carrier WLAN (C-WLAN) and routs Internet traffic and optionally an Internet Protocol Multimedia Subsystem (IMS) access point name (APN) over the C-WLAN. Here, the CF connecting with the C-WLAN and routing the Internet traffic and optionally the IMS APN is hidden from the HLOS.

In a further aspect, the UE is connected to an Internet access point name (APN). Hence, the HLOS connects with a private WLAN (P-WLAN) and routs Internet traffic over the P-WLAN. Here, the CF makes no decision regarding the HLOS connecting with the P-WLAN and routing the Internet traffic.

In another aspect, the UE is connected to a plurality of packet data networks (PDNs). Hence, the HLOS connects with a private WLAN (P-WLAN) and routs Internet traffic over the P-WLAN. Here, the CF makes no decision regarding the HLOS connecting with the P-WLAN and routing the Internet traffic. However, the CF may rout an Internet Protocol Multimedia Subsystem (IMS) access point name (APN) via the P-WLAN.

In a further aspect, unknown to the HLOS, the CF is connected to an evolved packet core (EPC)-WLAN or a carrier WLAN (C-WLAN). The HLOS connects with a private WLAN (P-WLAN) and routs Internet traffic over the P-WLAN. The CF enforces the HLOS connecting and routing by disconnecting from the EPC-WLAN or C-WLAN.

In another aspect, unknown to the HLOS, the CF is connected to a carrier WLAN (C-WLAN). The HLOS discovers the C-WLAN, connects to the C-WLAN, and routs Internet traffic over the C-WLAN. The CF, previously connected to the C-WLAN, delegates control back to the HLOS.

Figure 34:
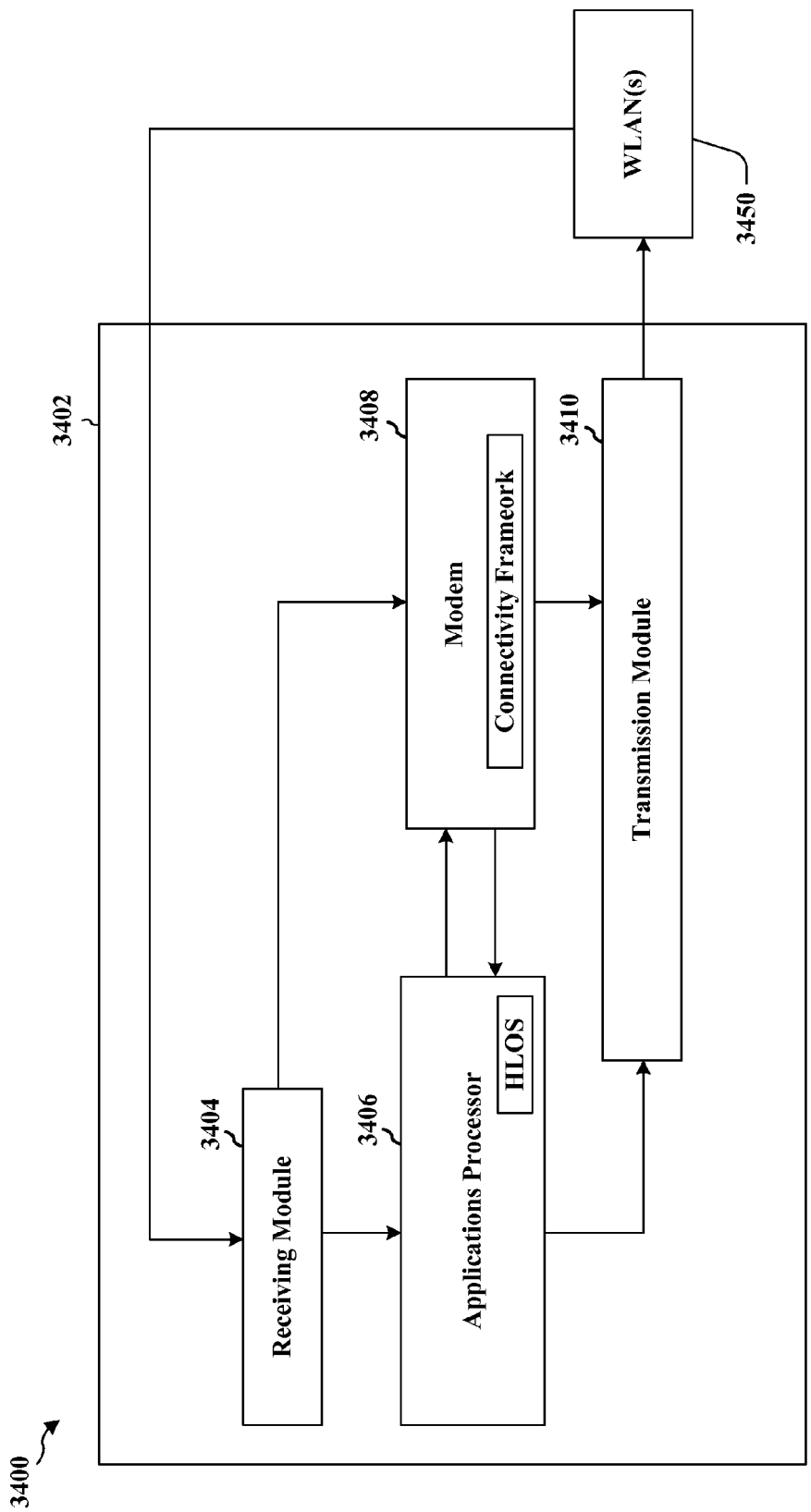
FIG. 34 is a conceptual data flow diagram illustrating the data flow between different modules/means/components in an exemplary apparatus.

FIG. 34 is a conceptual data flow diagram 3400 illustrating the data flow between different modules/means/components in an exemplary apparatus 3402 managing a connection to at least one wireless local area network (WLAN) 3450. The apparatus 3402 may be a UE. The apparatus includes a receiving module 3404, an applications processor (AP) 3406 including the HLOS, a modem 3408 including the connectivity framework (CF), and a transmission module 3410.

The AP 3406 connects to the at least one WLAN 3450 via a high level operating system (HLOS). The modem 3408 connects to the at least one WLAN 3450 via a connectivity framework (CF) according to the HLOS.

The HLOS may connect to the at least one WLAN 3450 via a first supplicant (or driver) at the AP 3406. The CF may connect to the at least one WLAN via a second supplicant (or driver) at the modem 3408. The HLOS may indicate to the CF to which WLANs 3450 the CF can connect.

The CF may be allowed to connect to WLANs 3450 based on a policy from the HLOS. For example, the WLANs 3450 the CF is allowed to connect to include WLANs having a service set identifier (SSID) in a preconfigured list, a carrier WLAN automatically discovered by the CF, and/or WLANs having characteristics described by the policy.

The CF may automatically discover a carrier WLAN. For example, the CF may automatically discover the carrier WLAN via Extensible Authentication Protocol Method for Authentication and Key Agreement (EAP-AKA) support discovered via Hotspot 2.0, support of specific values in HS2.0 ANQP fields, and/or a service set identifier (SSID) is present in ANDSF policy.

In an aspect, the apparatus 3402 is connected to a single packet data network. Hence, the CF may connect with an evolved packet core (EPC)-WLAN and rout a PDN connection over the EPC-WLAN. Here, the CF connecting with the EPC-WLAN and routing the PDN connection is hidden from the HLOS.

In another aspect, the apparatus 3402 is connected to a plurality of packet data networks (PDNs). Hence, the CF connects with an evolved packet core (EPC)-WLAN and routs at least one of a plurality of PDN connections over the EPC-WLAN. Here, the CF connecting with the EPC-WLAN and routing the at least one PDN connection is hidden from the HLOS.

In a further aspect, the apparatus 3402 is connected to an Internet packet data network (PDN). Hence, the CF connects with a carrier WLAN (C-WLAN) and routs the Internet traffic over the C-WLAN. Here, the CF connecting with the C-WLAN and routing the Internet traffic is hidden from the HLOS.

In another aspect, the apparatus 3402 is connected to a plurality of packet data networks (PDNs). Hence, the CF connects with a carrier WLAN (C-WLAN) and routs Internet traffic and optionally an Internet Protocol Multimedia Subsystem (IMS) access point name (APN) over the C-WLAN. Here, the CF connecting with the C-WLAN and routing the Internet traffic and optionally the IMS APN is hidden from the HLOS.

In a further aspect, the apparatus 3402 is connected to an Internet access point name (APN). Hence, the HLOS connects with a private WLAN (P-WLAN) and routs Internet traffic over the P-WLAN. Here, the CF makes no decision regarding the HLOS connecting with the P-WLAN and routing the Internet traffic.

In another aspect, the apparatus 3402 is connected to a plurality of packet data networks (PDNs). Hence, the HLOS connects with a private WLAN (P-WLAN) and routs Internet traffic over the P-WLAN. Here, the CF makes no decision regarding the HLOS connecting with the P-WLAN and routing the Internet traffic. However, the CF may rout an Internet Protocol Multimedia Subsystem (IMS) access point name (APN) via the P-WLAN.

In a further aspect, unknown to the HLOS, the CF is connected to an evolved packet core (EPC)-WLAN or a carrier WLAN (C-WLAN). The HLOS connects with a private WLAN (P-WLAN) and routs Internet traffic over the P-WLAN. The CF enforces the HLOS connecting and routing by disconnecting from the EPC-WLAN or C-WLAN.

In another aspect, unknown to the HLOS, the CF is connected to a carrier WLAN (C-WLAN). The HLOS discovers the C-WLAN, connects to the C-WLAN, and routs Internet traffic over the C-WLAN. The CF, previously connected to the C-WLAN, delegates control back to the HLOS.

The apparatus may include additional modules that perform each of the steps of the algorithm in the aforementioned flow charts of FIGS. 29-33. As such, each step in the aforementioned flow chart of FIGS. 29-33 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 35:
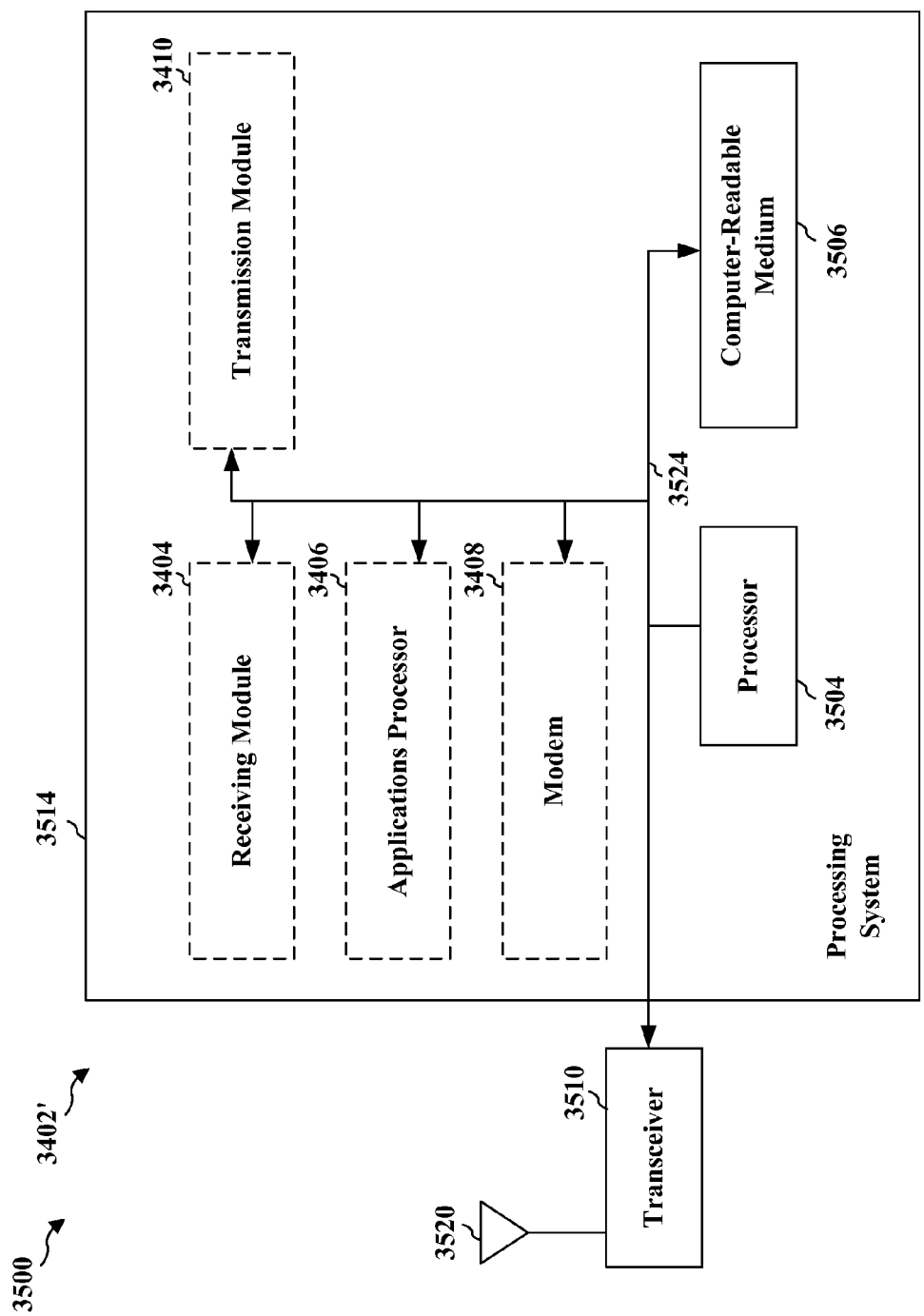
FIG. 35 is a diagram illustrating an example of a hardware implementation for an apparatus employing a processing system.

FIG. 35 is a diagram 3500 illustrating an example of a hardware implementation for an apparatus 3402' employing a processing system 3514. The processing system 3514 may be implemented with a bus architecture, represented generally by the bus 3524. The bus 3524 may include any number of interconnecting buses and bridges depending on the specific application of the processing system 3514 and the overall design constraints. The bus 3524 links together various circuits including one or more processors and/or hardware modules, represented by the processor 3504, the modules 3404, 3406, 3408, 3410, and the computer-readable medium 3506. The bus 3524 may also link various other circuits such as timing sources, peripherals, voltage regulators, and power management circuits, which are well known in the art, and therefore, will not be described any further.

The processing system 3514 may be coupled to a transceiver 3510. The transceiver 3510 is coupled to one or more antennas 3520. The transceiver 3510 provides a means for communicating with various other apparatus over a transmission medium. The processing system 3514 includes a processor 3504 coupled to a computer-readable medium 3506. The processor 3504 is responsible for general processing, including the execution of software stored on the computer-readable medium 3506. The software, when executed by the processor 3504, causes the processing system 3514 to perform the various functions described supra for any particular apparatus. The computer-readable medium 3506 may also be used for storing data that is manipulated by the processor 3504 when executing software. The processing system further includes at least one of the modules 3404, 3406, 3408, and 3410. The modules may be software modules running in the processor 3504, resident/stored in the computer readable medium 3506, one or more hardware modules coupled to the processor 3504, or some combination thereof. The processing system 3514 may be a component of the UE 1150 and may include the memory 1160 and/or at least one of the TX processor 1168, the RX processor 1156, and the controller/processor 1159.

In one configuration, the apparatus 3402/3402' for wireless communication includes means for connecting to the at least one WLAN via a high level operating system (HLOS) at an applications processor (AP), and means connecting to the at least one WLAN via a connectivity framework (CF) at a modem according to the HLOS.

The aforementioned means may be one or more of the aforementioned modules of the apparatus 3402 and/or the processing system 3514 of the apparatus 3402' configured to perform the functions recited by the aforementioned means. As described supra, the processing system 3514 may include the TX Processor 1168, the RX Processor 1156, and the controller/processor 1159. As such, in one configuration, the aforementioned means may be the TX Processor 1168, the RX Processor 1156, and the controller/processor 1159 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for controlling wireless communications using a multi-radio device, comprising:
   identifying one or more connection points between one or more radios of the multi-radio device and an operating system executing on a host device;
   analyzing a policy relating to the multi-radio device;
   exposing, to the operating system, a subset of the one or more connection points based on the policy; and
   hiding, from the operating system executing on the host device, a different subset of the one or more connection points based on the policy.

2. The method of claim 1, wherein the one or more connection points between the one or more radios of the multi-radio device and the operating system is identified through a controller of the one or more radios.

3. The method of claim 1, further comprising:
   analyzing conditions of the host device; and
   exposing, to the operating system, an application programming interface (API) relating to a radio of the multi-radio device based on the conditions of the host device.

4. The method of claim 3, further comprising:
   enabling a subset of services provided by the exposed API based on the conditions of the host device.

5. The method of claim 1, further comprising:
   substantiating, with the operating system, a driver interface relating to the one or more radios of the multi-radio device based on the policy.

6. The method of claim 1, wherein the subset of the one or more connection points exposed to the operating system is less than a number of the identified one or more connection points between the one or more radios of the multi-radio device and the operating system.

7. The method of claim 1, wherein the multi-radio device comprises a wireless wide area network (WWAN) radio and a wireless local area network (WLAN) radio.

8. The method of claim 1, further comprising:
   generating a device class for the multi-radio device based on the policy; and
   presenting the device class to the operating system.

9. The method of claim 1, further comprising:
   receiving transmission data from the operating system or an application; and
   determining which radio or radios of the multi-radio device to use to transmit the data based on the policy.

10. The method of claim 1, wherein determining which radio to use further comprises:
    determining a quality metric of the one or more radios of the multi-radio device; and
    selecting at least one radio from the multi-radio device based on the quality metric of the at least one radio.

11. The method of claim 1, wherein the subset of the one or more connection points exposed to the operating system is an empty set.

12. The method of claim 1, further comprising:
    identifying a plurality of operating systems executing on the host device; and
    exposing another subset of the one or more connection points based on the identified operating systems.

13. A mobile device configured to control wireless communications using a multi-radio device, comprising:
    a processor;
    memory in electronic communication with the processor; and
    instructions stored in the memory, the instructions being executable by the processor to:
    identify one or more connection points between one or more radios of the multi-radio device and an operating system executing on a host device;
    analyze a policy relating to the multi-radio device;
    expose, to the operating system, a subset of the one or more connection points based on the policy; and
    hide, from the operating system executing on the host device, a different subset of the one or more connection points based on the policy.

14. The mobile device of claim 13, wherein the processor is further configured to:
identify the one or more connection points between the one or more radios of the multi-radio device and the operating system through a controller of the one or more radios.

15. The mobile device of claim 13, wherein the processor is further to:
analyze conditions of the host device; and
expose, to the operating system, an application programming interface (API) relating to a radio of the multi-radio device based on the conditions of the host device.

16. The mobile device of claim 15, wherein the processor is further configured to:
enable a subset of services provided by the exposed API based on the conditions of the host device.

17. The mobile device of claim 13, wherein the processor is further configured to:
substantiate, with the operating system, a driver interface relating to the one or more radios of the multi-radio device based on the policy.

18. The mobile device of claim 13, wherein the subset of the one or more connection points exposed to the operating system is less than a number of the identified one or more connection points between the one or more radios of the multi-radio device and the operating system.

19. The mobile device of claim 13, wherein the multi-radio device comprises a wireless wide area network (WWAN) radio and a wireless local area network (WLAN) radio.

20. The mobile device of claim 13, wherein the processor is further configured to:
generate a device class for the multi-radio device based on the policy; and
present the device class to the operating system.

21. The mobile device of claim 13, wherein the processor is further configured to:
receive transmission data from the operating system or an application; and
determine which radio or radios of the multi-radio device to use to transmit the data based on the policy.

22. The mobile device of claim 13, wherein the processor is further configured to:
determine a quality metric of the one or more radios of the multi-radio device; and
select at least one radio from the multi-radio device based on the quality metric of the at least one radio.

23. The mobile device of claim 13, wherein the subset of the one or more connection points exposed to the operating system is an empty set.

24. The mobile device of claim 13, wherein the processor is further configured to:
identify a plurality of operating systems executing on the host device; and
expose another subset of the one or more connection points based on the identified operating systems.

25. A computer program product for controlling wireless communications using a multi-radio device, the computer program product comprising a non-transitory computer-readable medium storing instructions executable by a processor to:
identify one or more connection points between one or more radios of the multi-radio device and an operating system executing on a host device;
analyze a policy relating to the multi-radio device;
expose, to the operating system, a subset of the one or more connection points based on the policy; and
hide, from the operating system executing on the host device, a different subset of the one or more connection points based on the policy.

26. The computer program product of claim 25, wherein the one or more connection points between the one or more radios of the multi-radio device and the operating system is identified through a controller of the one or more radios.

27. The computer program product of claim 25, wherein the processor is further configured to execute the instructions to:
analyze conditions of the host device; and
expose, to the operating system, an application programming interface (API) relating to a radio of the multi-radio device based on the conditions of the host device.

28. The computer program product of claim 27, wherein the processor is further configured to execute the instructions to:
enable a subset of services provided by the exposed API based on the conditions of the host device.

29. The computer program product of claim 25, wherein the processor is further configured to execute the instructions to:
substantiate, with the operating system, a driver interface relating to the one or more radios of the multi-radio device based on the policy.

30. The computer program product of claim 25, wherein the subset of the one or more connection points exposed to the operating system is less than a number of the identified one or more connection points between the one or more radios of the multi-radio device and the operating system.

31. The computer program product of claim 25, wherein the multi-radio device comprises a wireless wide area network (WWAN) radio and a wireless local area network (WLAN) radio.

32. A method of managing a connection between a modem and an applications processor (AP), comprising:
virtualizing a plurality of physical communication interfaces at the modem;
providing a single Internet protocol (IP) interface representing the virtualized plurality of physical communication interfaces to a high level operating system (HLOS) at the AP;
detecting a physical communication interface connected to the modem; and
determining, based on a condition, whether to expose the detected physical communication interface to the HLOS as a standalone virtualized physical communication interface, or hide the detected physical communication interface from the HLOS as part of an existing virtualized physical communication interface.

33. The method of claim 32, wherein the detected physical communication interface is determined to be hidden from the HLOS when the detected physical communication interface is at least one of (1) a carrier interface, (2) an operator wireless local area network (WLAN) interface, (3) includes a service set identifier (SSID) of a pre-configured list, or (4) supports automatic discovery and selection mechanisms specified by Wi-Fi Alliance (WFA) Hotspot 2.0.

34. The method of claim 32, wherein the detected physical communication interface is determined to be exposed to the HLOS when the detected physical communication interface is at least one of:
a non-carrier interface;
an interface unknown to the modem;
a private wireless local area network (WLAN) interface;
a non-operator WLAN interface; or
a corporate WLAN interface.

35. The method of claim 32, wherein the condition is set by operator policy.

36. The method of claim 32, wherein the modem manages communication over the detected physical communication interface hidden from the HLOS.

37. The method of claim 32, wherein the HLOS manages communication over the detected physical communication interface exposed to the HLOS.

38. An apparatus for managing a connection between a modem and an applications processor (AP), comprising:
a processor;
memory in electronic communication with the processor; and
instructions stored in the memory, the instructions being executable by the processor to:
virtualize a plurality of physical communication interfaces at the modem;
provide a single Internet protocol (IP) interface representing the virtualized plurality of physical communication interfaces to a high level operating system (HLOS) at the AP;
detect a physical communication interface connected to the modem; and
determine, based on a condition, whether to expose the detected physical communication interface to the HLOS as a standalone virtualized physical communication interface, or hide the detected physical communication interface from the HLOS as part of an existing virtualized physical communication interface.

39. The apparatus of claim 38, wherein the detected physical communication interface is determined to be hidden from the HLOS when the detected physical communication interface is at least one of (1) a carrier interface, (2) an operator wireless local area network (WLAN) interface, (3) includes a service set identifier (SSID) of a pre-configured list, or (4) supports automatic discovery and selection mechanisms specified by Wi-Fi Alliance (WFA) Hotspot 2.0.

40. The apparatus of claim 38, wherein the detected physical communication interface is determined to be exposed to the HLOS when the detected physical communication interface is at least one of:
a non-carrier interface;
an interface unknown to the modem;
a private wireless local area network (WLAN) interface;
a non-operator WLAN interface; or
a corporate WLAN interface.

41. A computer program product for managing a connection between a modem and an applications processor (AP), comprising:
a non-transitory computer-readable medium comprising code for:
virtualizing a plurality of physical communication interfaces at the modem;
providing a single Internet protocol (IP) interface representing the virtualized plurality of physical communication interfaces to a high level operating system (HLOS) at the AP;
detecting a physical communication interface connected to the modem; and
determining, based on a condition, whether to expose the detected physical communication interface to the HLOS as a standalone virtualized physical communication interface, or hide the detected physical communication interface from the HLOS as part of an existing virtualized physical communication interface.

42. A method of managing a connection to at least one wireless local area network (WLAN) at a user equipment (UE), comprising:
connecting to the at least one WLAN via a high level operating system (HLOS) at an applications processor (AP); and
connecting to the at least one WLAN via a connectivity framework (CF) at a modem according to the HLOS, wherein the at least one WLAN comprises at least one carrier WLAN (C-WLAN) and wherein the CF, previously connected to the C-WLAN, delegates control back to the HLOS.

43. The method of claim 42, wherein the HLOS connects to the at least one WLAN via a first supplicant at the AP, and the CF connects to the at least one WLAN via a second supplicant at the modem.

44. The method of claim 42, wherein the HLOS indicates to the CF to which WLANs the CF can connect.

45. The method of claim 42, wherein the CF is allowed to connect to WLANs based on a policy from the HLOS.

46. The method of claim 45, wherein the WLANs the CF is allowed to connect to include at least one of:
WLANs having a service set identifier (SSID) in a preconfigured list;
a carrier WLAN automatically discovered by the CF; or
WLANs having characteristics described by the policy.

47. The method of claim 42, wherein the CF automatically discovers a carrier WLAN.

48. The method of claim 47, wherein the CF automatically discovers the carrier WLAN via at least one of:
Extensible Authentication Protocol Method for Authentication and Key Agreement (EAP-AKA) support discovered via Hotspot 2.0;
support of specific values in HS2.0 ANQP fields; or
a service set identifier (SSID) is present in ANDSF policy.

49. The method of claim 42, wherein the UE is connected to a single packet data network, the method further comprising:
the CF connecting with an evolved packet core (EPC)-WLAN; and
the CF routing a PDN connection over the EPC-WLAN, wherein the CF connecting with the EPC-WLAN and routing the PDN connection is hidden from the HLOS.

50. The method of claim 42, wherein the UE is connected to a plurality of packet data networks (PDNs), the method further comprising:
the CF connecting with an evolved packet core (EPC)-WLAN; and
the CF routing at least one of a plurality of PDN connections over the EPC-WLAN,
wherein the CF connecting with the EPC-WLAN and routing the at least one of the plurality of PDN connections is hidden from the HLOS.

51. The method of claim 42, wherein the UE is connected to an Internet packet data network (PDN), the method further comprising:
the CF connecting with a carrier WLAN (C-WLAN); and
the CF routing Internet traffic over the C-WLAN, wherein the CF connecting with the C-WLAN and routing the Internet traffic is hidden from the HLOS.

52. The method of claim 42, wherein the UE is connected to a plurality of packet data networks (PDNs), the method further comprising:
the CF connecting with a carrier WLAN (C-WLAN); and
the CF routing Internet traffic and optionally an Internet Protocol Multimedia Subsystem (IMS) access point name (APN) over the C-WLAN, wherein the CF connecting with the C-WLAN and routing the Internet traffic and optionally the IMS APN is hidden from the HLOS.

53. The method of claim 42, wherein the UE is connected to an Internet access point name (APN), the method further comprising:
the HLOS connecting with a private WLAN (P-WLAN); and
the HLOS routing Internet traffic over the P-WLAN,
wherein the CF makes no decision regarding the HLOS connecting with the P-WLAN and routing the Internet traffic.

54. The method of claim 42, wherein the UE is connected to a plurality of packet data networks (PDNs), the method further comprising:
the HLOS connecting with a private WLAN (P-WLAN);
the HLOS routing Internet traffic over the P-WLAN,
wherein the CF makes no decision regarding the HLOS connecting with the P-WLAN and routing the Internet traffic; and
the CF routing an Internet Protocol Multimedia Subsystem (IMS) access point name (APN) via the P-WLAN using I-WLAN procedures by duplicating an Internet protocol (IP) context for the P-WLAN in the CF.

55. The method of claim 42, wherein unknown to the HLOS, the CF is connected to an evolved packet core (EPC)-WLAN or a carrier WLAN (C-WLAN), the method further comprising:
the HLOS connecting with a private WLAN (P-WLAN);
the HLOS routing Internet traffic over the P-WLAN; and
the CF enforcing the HLOS connecting and routing by disconnecting from the EPC-WLAN or C-WLAN.

56. The method of claim 42, wherein unknown to the HLOS, the CF is connected to a carrier WLAN (C-WLAN), the method further comprising:
the HLOS discovering the C-WLAN; and
the HLOS connecting to the C-WLAN and routing Internet traffic over the C-WLAN.

57. A user equipment (UE) for managing a connection to at least one wireless local area network (WLAN), comprising:
means for connecting to the at least one WLAN via a high level operating system (HLOS) at an applications processor (AP); and
means for connecting to the at least one WLAN via a connectivity framework (CF) at a modem according to the HLOS, wherein the at least one WLAN comprises at least one carrier WLAN (C-WLAN) and wherein the CF, previously connected to the C-WLAN, delegates control back to the HLOS.

58. A user equipment (UE) for managing a connection to at least one wireless local area network (WLAN), comprising:
a processor;
memory in electronic communication with the processor; and
instructions stored in the memory, the instructions being executable by the processor to:
connect to the at least one WLAN via a high level operating system (HLOS) at an applications processor (AP); and
connect to the at least one WLAN via a connectivity framework (CF) at a modem according to the HLOS, wherein the at least one WLAN comprises at least one carrier WLAN (C-WLAN) and wherein the CF, previously connected to the C-WLAN, delegates control back to the HLOS.

59. A computer program product of a user equipment (UE) for managing a connection to at least one wireless local area network (WLAN), comprising:
a non-transitory computer-readable medium comprising code for:
connecting to the at least one WLAN via a high level operating system (HLOS) at an applications processor (AP); and
connecting to the at least one WLAN via a connectivity framework (CF) at a modem according to the HLOS, wherein the at least one WLAN comprises at least one carrier WLAN (C-WLAN) and wherein the CF, previously connected to the C-WLAN, delegates control back to the HLOS.

* * * * *